United States Patent
Onuma et al.

(10) Patent No.: US 8,326,488 B2
(45) Date of Patent: Dec. 4, 2012

(54) HEIGHT CONTROLLING APPARATUS

(75) Inventors: Toshio Onuma, Susono (JP); Masaaki Tabata, Chiryu (JP); Takenari Yamaguchi, Toyota (JP); Masaki Kanatani, Okazaki (JP); Atsushi Mizuta, Sunto-gun (JP); Hideki Ohashi, Chiryu (JP); Koutaro Okimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 381 days.

(21) Appl. No.: 12/656,692

(22) Filed: Feb. 12, 2010

(65) Prior Publication Data

US 2010/0152970 A1 Jun. 17, 2010

Related U.S. Application Data

(62) Division of application No. 11/298,666, filed on Dec. 12, 2005, now Pat. No. 7,761,205.

(30) Foreign Application Priority Data

Dec. 28, 2004 (JP) .................................. 2004-381910

(51) Int. Cl.
| | |
|---|---|
| B60G 17/016 | (2006.01) |
| B60G 23/00 | (2006.01) |
| B62C 3/00 | (2006.01) |
| B62K 25/00 | (2006.01) |
| G06F 7/00 | (2006.01) |
| G06F 17/00 | (2006.01) |
| G06F 19/00 | (2011.01) |

(52) U.S. Cl. ......................................................... 701/38
(58) Field of Classification Search .............. 701/36–38, 701/300; 280/6.15, 6.158
See application file for complete search history.

(56) References Cited

U.S. PATENT DOCUMENTS 5,046,754 A 9/1991 Kimura et al.
(Continued)

FOREIGN PATENT DOCUMENTS

CN 1109613 C 5/2003
(Continued)

OTHER PUBLICATIONS

Technical Document No. 2004-501500, Mar. 3, 2004, 2 pp., Japan Institute of Invention and Innovation.
(Continued)

*Primary Examiner* — Khoi Tran
*Assistant Examiner* — Harry Oh
(74) *Attorney, Agent, or Firm* — Oliff & Berridge, PLC

(57) ABSTRACT

A height controlling apparatus for controlling at least one actual height as a relative position of (a) a body of a vehicle and (b) at least one wheel of the vehicle relative to each other, the apparatus including at least one height controlling actuator which changes the at least one actual height; and an actuator control device which controls the at least one height controlling actuator so that the at least one actual height approaches at least one target height. The actuator control device includes a possibility detecting device which detects, before an absolute value of a difference of the at least one target height and the at least one actual height exceeds a reference value, whether there is a possibility that an object may be present in a direction in which the body is moved to change the at least one actual height, and a movement restraining portion which controls, when the possibility detecting device detects that there is the possibility, the at least one height controlling actuator to restrain a movement of the body in the direction.

23 Claims, 18 Drawing Sheets

U.S. PATENT DOCUMENTS

| | | | |
|---|---|---|---|
| 5,083,275 A | | 1/1992 | Kawagoe et al. |
| 6,161,845 A | * | 12/2000 | Shono et al. ............... 280/6.15 |
| 6,477,466 B1 | * | 11/2002 | Kocherscheidt et al. ..... 701/301 |
| 6,944,544 B1 | * | 9/2005 | Prakah-Asante et al. ..... 701/301 |
| 7,761,205 B2 | * | 7/2010 | Onuma et al. ................ 701/36 |

FOREIGN PATENT DOCUMENTS

| | | |
|---|---|---|
| DE | 198 41 751 A1 | 3/2000 |
| DE | 100 07 357 A1 | 8/2001 |
| DE | 100 53 316 A1 | 5/2002 |
| EP | 0 398 158 A1 | 11/1990 |
| EP | 927652 A1 * | 7/1999 |
| GB | 2 292 916 A | 3/1996 |
| JP | A-57-134312 | 8/1982 |
| JP | A-62-94413 | 4/1987 |
| JP | A-62-128815 | 6/1987 |
| JP | A-62-178413 | 8/1987 |
| JP | A-1-233111 | 9/1989 |
| JP | A-1-244941 | 9/1989 |
| JP | A-03-193519 | 8/1991 |
| JP | Y2-3-41038 | 8/1991 |
| JP | A-5-193325 | 8/1993 |
| JP | A-05-305808 | 11/1993 |
| JP | A-6-336110 | 12/1994 |
| JP | B2-8-13602 | 2/1996 |
| JP | A-11-190629 | 7/1999 |
| JP | B2-3039209 | 5/2000 |
| JP | A-2003-170721 | 6/2003 |
| WO | WO 97/46403 | 12/1997 |

OTHER PUBLICATIONS

Technical Document No. 99-2205, Apr. 1, 1999, 2 pp. Japan Institute of Invention and Innovation.

Oct. 15, 2009 Japanese Office Action in Japanese Application No. 2004-381910, with translation.

* cited by examiner

HEIGHT CONTROLLING APPARATUS

The present application is a divisional of U.S. application Ser. No. 11/298,666 filed Dec. 12, 2005, which is based on Japanese Patent Application No. 2004-381910 filed on Dec. 28, 2004, the contents of which are incorporated herein by reference.

BACKGROUND OF THE INVENTION

1. Field of the Invention

The present invention relates to a height controlling apparatus that controls a height of a vehicle by operating one or more height controlling actuators.

2. Discussion of Related Art

Patent Document 1 (Japanese Patent Application Publication No. 11-190629) discloses a height controlling apparatus wherein, when a difference of a target height and an actual height of a vehicle is greater than a reference value, an operation of a height controlling actuator is stopped. Patent Document 2 (Japanese Patent Application Publication No. 2003-170721) discloses that when a difference of a target height and an actual height of a vehicle is greater than a reference value, the target height is increased. Patent Document 3 (Japanese Patent Application Publication No. 5-193325) discloses the art of informing a driver of a state in which a height controlling operation is being performed. Patent Document 4 (Japanese Patent Application Publication No. 1-233111) discloses that a height controlling actuator is controlled according to information received from a portable controller.

SUMMARY OF THE INVENTION

It is therefore an object of the present invention to provide the art of detecting, at an early timing, that there is a possibility that an object may be present in a direction of movement of a body of a vehicle, when a height controlling operation is performed.

The above object may be achieved according to any one of the following modes of the present invention in the form of a height controlling apparatus, each of which is numbered like the appended claims and may depend from the other mode or modes, where appropriate, to indicate and clarify possible combinations of the corresponding technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without at least one of the features described with respect to the same mode.

(1) A height controlling apparatus for controlling at least one actual height as at least one relative position of (a) a body of a vehicle and (b) at least one wheel of the vehicle relative to each other, the apparatus comprising at least one height controlling actuator which changes said at least one actual height; and an actuator control device which controls said at least one height controlling actuator so that said at least one actual height approaches at least one target height, wherein the actuator control device includes a possibility detecting device which detects, before an absolute value of a difference of said at least one target height and said at least one actual height exceeds a first reference value, whether there is a possibility that an object may be present in a direction in which the body is moved to change said at least one actual height, and a movement restraining portion which controls, when the possibility detecting device detects that there is said possibility, said at least one height controlling actuator to restrain a movement of the body in said direction.

In the present height controlling apparatus, the actuator control device controls the at least one height controlling actuator so that the at least one actual height approaches at least one target height. Thus, the body of the vehicle is moved relative to the wheel thereof. However, the possibility detecting device detects whether there is a possibility that an object may be present in a direction of movement of the body. When the possibility detecting device detects that there is the possibility, the movement restraining portion controls the at least one height controlling actuator to restrain the movement of the body in that direction. More specifically described, the movement of the body in that direction is stopped, a speed of the movement of the body in that direction is decreased, the direction of the movement of the body is reversed, or the movement of the body in that direction is not started. For example, if, before a height controlling operation is started, the possibility detecting device detects that there is a possibility that an object may be present in a direction of movement of the body in the height controlling operation, the operation can be avoided from being started.

In the present mode (1), the possibility detecting device detects, before an absolute value of a difference of the at least one target height and the at least one actual height exceeds a reference value, whether there is a possibility that an object may be present. Therefore, the present height controlling apparatus can more quickly detect that there is a possibility that an object may be present in a direction of movement of the body, than the height controlling apparatus disclosed by the above-indicated Patent Document 1. Therefore, the body and/or the object can be effectively prevented from being damaged.

The above phrase of "detecting, before an absolute value of a difference of the at least one target height and the at least one actual height exceeds a reference value, whether there is a possibility that an object may be present" means—detecting whether there is a possibility that an object may be present, before the possibility is detected based on the difference of the at least one target height and the at least one actual height as taught by the prior art—. Therefore, the reference value may be one that is not actually used in the present height controlling apparatus.

The at least one height controlling actuator may be (i) a fluid-operated height controlling actuator including a fluid-flow controlling actuator that controls flows of a working fluid into, and out of, a fluid chamber provided between the body and the wheel, or (ii) a mechanical height controlling actuator including a drive device, such as an electric motor, that operates a mechanical device for changing a distance between the body and the wheel, i.e., a relative position of the two elements relative to each other. The working fluid used by the fluid-operated height controlling actuator may be either a gas or a liquid.

(2) The height controlling apparatus according to the mode (1), wherein the possibility detecting device includes a near-object detecting portion which detects whether there is the object near to the vehicle, and wherein the movement restraining portion includes a near-object-detection-dependent actuator control portion which controls, when the near-object detecting portion detects that there is the object near to the vehicle, said at least one height controlling actuator to restrain the movement of the body in said direction.

In the present height controlling apparatus, if the near-object detecting portion detects that there is an object near to the vehicle, the possibility detecting device judges that there is a possibility that an object may be present in a direction of movement of the body, and the near-object-detection-dependent actuator control portion controls the at least one height controlling actuator to restrain the movement of the body in that direction. Thus, in the present height controlling apparatus, the possibility detecting device can judge whether there is the possibility, not only before a height controlling operation is started but also during the height controlling operation.

The near-object detecting portion may be one including a getting-out detecting device that detects whether a person has got out of the vehicle or whether there is a possibility that a person may get out of the vehicle. If a person gets out of the vehicle and remains around the vehicle, it can be judged that there is a possibility that the luggage of the person may be present in the direction of movement of the vehicle's body.

A fact that a person has got out of the vehicle may be detected by detecting that a door of the vehicle has been changed from its closed state to its opened state, that a door has been kept to its opened state, or that the height of the vehicle has been increased; and a fact that there is a possibility that a person may get out of the vehicle may be detected by detecting that a seat belt of the vehicle has been unfastened, that a door lock has been unlocked, or that a seating sensor has been changed from its ON state to its OFF state.

The object detected by the near-object detecting portion and the object that may be present in the direction of movement of the body may be the same object, or may be different objects. In some cases, the near-object detecting portion may detect the same object as the object that may be present in the direction of movement of the body (e.g., it may detect a first portion of the object other than a second portion thereof that may be present in the direction of movement of the body); and in other cases, it may detect the object other than the object that may be present in the direction of movement of the body (e.g., it may detect an object present in at least one predetermined area, described below; in this case, the possibility detecting device may judge that there is a possibility that another object may be present in the direction of movement of the body).

(3) The height controlling apparatus according to the mode (2), wherein the near-object detecting portion includes an object-in-area detecting portion which detects whether there is the object in at least one area predetermined with respect to the vehicle.

In the present height controlling apparatus, the object-in-area detecting portion detects whether there is the object in at least one area predetermined with respect to the vehicle. For example, the object-in-area detecting portion may be one including an emitter that emits, e.g., a laser beam; a receiver that receives the laser beam reflected from an object; and a processing portion that detects, based on the received laser beam, whether an object is present in the predetermined area. A scope of a detection area in which the object-in-area detecting portion can detect an object is defined by the narrower one of a first area in which the emitter can emit the laser beam and a second area in which the receiver can receive the reflected laser beam. However, the above-indicated predetermined area may be the same as the detection area, or may be narrower than the detection area. It is desirable that the predetermined area be appropriate for the object-in-area detecting portion to detect, when a height controlling operation is performed, whether there is a possibility that an object may be present in a direction of movement of the body.

The emitter may be one that emits not the laser beam but a millimeter wave, or one that emits a supersonic wave. In addition, the object-in-area detecting portion may be one including an image taking device that takes an image of the predetermined area and thereby detects the presence of an object.

The object-in-area detecting portion may be one that is exclusively used for the present height controlling apparatus. However, an element such as a sensor that is employed by the vehicle for a different purpose may be utilized as the object-in-area detecting portion. For example, at least one of (a) clearance sonars that are provided in respective corners of the vehicle and each of which detects an object present in a corresponding one of predetermined areas around the corners; a back or rear sonar that is provided in a rear portion of the vehicle and detects an object present in a predetermined area in rear of the vehicle; and a front-object detecting device that is provided in a front portion of the vehicle and is used in a cruising control.

(4) The height controlling apparatus according to the mode (3), wherein the object-in-area detecting portion includes a relative-positional-relationship detecting portion which detects a relative-positional relationship between the body and the object present in said at least one area.

The relative-positional relationship between the vehicle's body and the object (more strictly described, the relative-positional relationship between the object-in-area detecting portion (or the relative-positional-relationship detecting portion) and the object may be a distance between the two elements; a direction of change of the distance (i.e., whether the two elements are approaching each other, or moving away from each other); an amount of change of the distance (i.e., a relative-movement speed of the two elements relative to each other); or an acceleration of change of the distance (i.e., a relative-movement acceleration of the two elements relative to each other). Based on the relative-positional relationship between the vehicle's body and the object, it is possible to detect a degree of possibility (i.e., a probability) that the object may be present in a direction of movement of the body.

For example, it can be judged that the degree of possibility is high, when the distance between the body and the object present in the predetermined area is small than when the distance is great (i.e., when the object is near to the body than when the object is distant from the body).

In addition, it can be judged that the degree of possibility is high, when the distance decreases than when the distance increases.

(5) The height controlling apparatus according to the mode (3) or the mode (4), wherein the object-in-area detecting portion includes an operation detecting portion which detects whether an operation is being performed by an operator with respect to the vehicle.

In the present height controlling apparatus, the operation detecting portion detects, when an operator is performing a pre-selected sort of operation with respect to the vehicle, at least one action of a series of actions related to the pre-selected operation. The operation detecting portion may be one that detects a proper action needed to achieve an aim (this action can be called a proper operation), one that detects a preparing action before the proper action (this action can be called a preparing operation), or one that detects an ending action after the proper action (this action can be called an ending operation.

If a height controlling operation is stopped upon detection of the pre-selected operation, the operation can be effectively prevented from being adversely influenced by the changing of the vehicle's height.

(6) The height controlling apparatus according to the mode (5), wherein the operation detecting portion detects at least one of an energy-source supplying operation, an oil changing operation, a roof-carrier loading operation, a roof-carrier repairing operation, and a vehicle washing operation.

The energy-source supplying operation may be an operation to supply gasoline to a vehicle having an engine as a drive source; or an operation to electrically charge a battery of a vehicle having an electric motor as a drive source, i.e., an operation to supply electric energy to the vehicle. The gasoline supplying operation can be detected by detecting whether a fuel lid opener motor is being operated, or whether an open/close switch associated with a fuel lid opener is opened or closed, or detecting an amount of fuel present in a fuel tank.

The oil changing operation may be detected by detecting, with, e.g., a switch, whether an inlet of an oil pan is in its opened state.

In a state in which a roof carrier of the vehicle is loaded with luggage, the vehicle's height (i.e., body height) decreases (i.e., lowers). Thus, the roof-carrier loading operation may be detected based on a body height detected by a body-height sensor. However, the vehicle's height changes when a person gets in, or out of, the vehicle or when a height controlling operation is performed. Therefore, when the roof-carrier loading operation is detected, it is desirable to take, into account, whether a person gets in, or out of, the vehicle and/or whether a height controlling operation is performed. Alternatively, the roof-carrier loading operation may be detected by detecting, with at least one open/close switch associated with at least one fixing jig of the roof carrier, whether the at least one fixing jig is operated.

During the vehicle washing operation, the temperature of an outer surface of the vehicle's body changes more largely, or more frequently, than the temperature of the environment, or changes to a different value than the temperature of ambient air. Therefore, the vehicle washing operation may be detected based on the temperature of the body. Alternatively, the vehicle washing operation may be detected based on a rain sensor that detects drops of rain.

When the energy-source supplying operation, the oil changing operation, or the vehicle washing operation is performed at, e.g., a known place, the operation may be detected based on information supplied from a navigation system. For example, when the vehicle is stopped at a gasoline stand or an electric-power charging stand, the energy-source supplying operation can be detected; and when vehicle is stopped at a repairing shop, the oil changing operation can be detected; and when the vehicle is stopped at a washing stand, the vehicle washing operation can be detected.

(7) The height controlling apparatus according to any of the modes (3) through (6), wherein the object-in-area detecting portion includes a loaded-luggage detecting portion which detects whether the vehicle is loaded with a luggage.

The loaded-luggage detecting portion may detect whether the vehicle is loaded with luggage, based on, e.g., the body height detected by the above-described body-height sensor, or based on whether a luggage-compartment door (i.e., an outer panel) is opened or closed.

(8) The height controlling apparatus according to any of the modes (3) through (7), wherein the object-in-area detecting portion includes a door-state detecting portion which detects at least one of (a) whether at least one door of the vehicle is opened and (b) whether at least one door of the vehicle is closed.

The door-state detecting portion may detect whether at least one door of the vehicle is opened or closed, based on, e.g., a detection signal supplied from at least one door courtesy lamp switch. When the door is changed from its closed state to its opened state, or when the door is kept to its opened state, it can be judged that there is a possibility that a person may be present around the vehicle and accordingly that luggage may be present in a direction of movement of the body. In this meaning, the door-state detecting portion can be called a getting-in-and-out detecting device that detects whether a person gets in, or out of, the vehicle.

(9) The height controlling apparatus according to any of the modes (1) through (8), wherein the possibility detecting device includes a height-change-dependent possibility detecting portion which detects whether there is said possibility, based on a change of said at least one actual height, and wherein the movement restraining portion includes a height-change-dependent actuator control portion which controls, when the height-change-dependent possibility detecting portion detects that there is said possibility, said at least one height controlling actuator to restrain the movement of the body in said direction.

In the present height controlling apparatus, the height-change-dependent possibility detecting portion detects whether there is the possibility, based on a change of the at least one actual height of the vehicle. Therefore, the possibility can be detected at an earlier timing than the case where the possibility is detected based on the at least one actual height itself.

In the present height controlling apparatus, the possibility of presence of object is detected after a height controlling operation is started, i.e., during the height controlling operation. As described above, a certain sort of operation may be detected based on the change of the at least one actual height of the vehicle, as explained above.

(10) The height controlling apparatus according to the mode (9), wherein the height-change-dependent possibility detecting portion includes a change-speed-related-amount-dependent possibility detecting portion which detects whether there is said possibility, based on a physical amount related to a speed of change of said at least one actual height.

The physical amount related to the speed of change of the at least one actual height may be the speed of change itself (i.e., an amount of change per unit time), or an n-time differentiated value ($n \geq 1$) of the speed of change. A manner in which the body height is changed can be known from a manner in which the height controlling actuator is operated. Therefore, the change-speed-related-amount-dependent possibility detecting portion can detect whether the change of the actual body height is abnormal, (i.e., whether there is a possibility that an object may be present in a direction of movement of the body), based on a nominal physical amount related to a nominal change speed of the body height, defined by the manner of operation of the height controlling actuator, and an actual physical amount related to a change speed of the actual body height.

Meanwhile, in many cases, the height controlling actuator is operated so that the body height is changed at a constant speed. In those cases, it is effective to detect the possibility of presence of object, based on the physical amount related to the change speed.

As far as the present specification is concerned, a change speed is expressed as a positive value when it is actually changed in the same direction as the direction in which it is to be changed by the operation of the height controlling actuator. Therefore, when the body height is decreased, a direction in which the body approaches the wheel is expressed as a positive direction; and when the body height is increased, a direction in which the body moves away from the wheel is expressed as a positive direction. On the other hand, in each case, a change acceleration is expressed as a positive value when the change speed increases, and is expressed as a negative value when the change speed decreases. That is, when the change speed of the body height decreases (i.e., when the body height decelerates), the change acceleration is expressed as being small. In addition, in the present specification, in the case where the body height changes in the state in which it is detected or judged that there is a possibility that an object may be present in a direction of movement of the body, the change of the body height can be expressed as being abnormal. Since, in this case, the body height changes in a manner different from a manner in which the body height changes in the case where no object is present, the change of the body height in the former case can be expressed as being not normal, i.e., abnormal.

For example, when an actual physical amount is significantly smaller than a nominal physical amount defined by the manner of operation of the height controlling actuator, it can be judged that there is a possibility that an object may be present in a direction of movement of the body. More specifically described, when, in the above-described case where the height controlling actuator is operated to change the body height at a substantially constant speed, the change speed of the body height is decreased to a speed lower than a predetermined speed (this speed is defined by the manner of operation of the height controlling actuator), the change acceleration of the body height is decreased to a negative acceleration, or when a differentiated value of the change acceleration of the body height is decreased to a negative value, it can be detected or judged that there is a possibility that an object may be present.

In addition, as will be described later, the possibility of presence of object may be detected based on not the change of the body height corresponding to the single wheel but respective changes of a plurality of body heights corresponding to a plurality of wheels of the vehicle.

(11) The height controlling apparatus according to the mode (9) or (10), wherein said at least one height controlling actuator includes at least one fluid-flow controlling actuator which controls a working fluid to flow into, and out of, at least one fluid chamber which is provided between the body (8) and at least one wheel holding device which holds said at least one wheel (4), wherein the actuator control device includes a fluid-flow control portion which controls said at least one fluid-flow controlling actuator so as to change said at least one actual height, and wherein the height-change-dependent possibility detecting portion includes a change-speed-dependent possibility detecting portion which detects that there is said possibility, when a speed of change of said at least one actual height is lower than a reference change speed determined based on at least one of a temperature of the working fluid and a pressure of the working fluid in said at least one fluid chamber.

(12) The height controlling apparatus according to the mode (11), wherein the change-speed-dependent possibility detecting portion includes an abnormal-speed-dependent possibility detecting portion which detects that there is said possibility, when the change speed of said at least one actual height is lower than the reference change speed by more than a predetermined amount.

In the mode (11), the at least one fluid-flow controlling actuator controls the working fluid to flow into, and out of, the at least one fluid chamber, and thereby controls an amount of the working fluid in the fluid chamber. Thus, the body height as the relative position between the body and the wheel is controlled. To this end, the working fluid is caused to flow from a high-pressure source as a sort of fluid-pressure source to the fluid chamber, or flow from the fluid chamber to a low-pressure source as another sort of fluid-pressure source. An amount of the working fluid flowing between the fluid chamber and the fluid-pressure source is greater when a difference of the pressure of the working fluid in the fluid chamber and the pressure of the fluid of the fluid-pressure source is great, than when the difference is small. Since generally the change of the fluid pressure in the fluid-pressure source is smaller than that in the fluid chamber, it can be speculated that the above-indicated pressure difference depends mainly on the fluid pressure in the fluid chamber. For example, when the body height is increased, the pressure difference between the fluid chamber and the high-pressure source is greater when the fluid pressure in the fluid chamber is low than when it is high, so that a greater amount of the working fluid can flow between the fluid chamber and the high-pressure source On the other hand, when the body height is decreased, the pressure difference between the fluid chamber and the low-pressure source is greater when the fluid pressure in the fluid chamber is high than when it is low, so that a greater amount of the working fluid can flow between the fluid chamber and the low-pressure source.

In addition, a speed of flow of the working fluid flowing between the fluid chamber and the fluid-pressure source is higher when a temperature of the fluid is high than when it is low.

Thus, the amount of the working fluid flowing between the fluid chamber and the fluid-pressure source is defined by at least one of the fluid pressure in the fluid chamber and the temperature of the working fluid. The change speed of the body height is higher when the flow amount is great than when it is small.

Therefore, when an actual change speed of the body height is smaller than a change speed (i.e., a reference or standard change speed) of the body height, defined by at least one of the fluid pressure in the fluid chamber and the temperature of the working fluid, it can be judged that there is a possibility that an object may be present. Moreover, when an amount obtained by subtracting the actual change speed from the reference change speed is greater than a predetermined amount, i.e., an abnormality judging amount, it can be judged that there is a possibility that an object may be present.

As will be described later, it is possible to obtain, for each of a plurality of wheels of the vehicle, an amount calculated by subtracting the actual change speed from the reference change speed, and judge the greatest one of the thus obtained amounts as being abnormal, or judge one or more significantly great amounts of the thus obtained amounts as being abnormal.

(13) The height controlling apparatus according to any of the modes (1) through (12), comprising a plurality of said height controlling actuators each of which corresponds to at least one of a plurality of said wheels of the vehicle and change at least one of a plurality of said actual heights respectively corresponding to the plurality of wheels, wherein the actuator control device includes a same-manner actuator control portion which controls, in a same manner, at least two height controlling actuators of the plurality of height controlling actuators so as to respectively change at least two actual heights of the plurality of actual heights.

Each of the plurality of height controlling actuators may correspond to a single wheel, or two or more wheels, of the vehicle. In the latter case, when the each height controlling actuator is operated, two or more body heights corresponding to the two or more wheels are controlled in a same manner. The above phrase "controls, in a same manner, at least two height controlling actuators" means, e.g., that two or more body heights corresponding to two or more wheels are controlled or changed to a same height, that the two or more body heights are changed at a same speed, or that the two or more body heights are changed at a same acceleration.

(14) The height controlling apparatus according to the mode (13), wherein the possibility detecting device includes a first relative-change-dependent possibility detecting portion which detects whether there is said possibility, based on respective changes of said at least two actual heights changed by said at least two height controlling actuators.

(15) The height controlling apparatus according to the mode (13), wherein the possibility detecting device includes a second relative-change-dependent possibility detecting portion which detects whether there is said possibility, based on respective changes of at least two physical amounts related to respective speeds of change of said at least two actual heights changed by said at least two height controlling actuators.

In the above-described case where the at least two height controlling actuators are controlled in the same manner, respective changes of at least two actual heights changed by the at least two height controlling actuators should be equal to each other. Therefore, if the respective changes of the at least two actual heights differ from each other, it can be judged that one of the respective changes of the at least two actual heights is abnormal. Thus, the possibility of presence of object can be judged based on respective changes of at least two physical amounts related to respective speeds of change of the at least two actual heights, more generally, a relative change of the at least two actual heights.

For example, when one of respective change speeds of two actual heights corresponding to two wheels is smaller than that of the other actual height by more than a predetermined amount, it can be judged that there is a possibility that an object may be present in a direction of movement of a portion of the vehicle's body that is opposed to one of the two wheels that corresponds to the one change speed.

In addition, in the case where the smallest one, $V_{min}$, of respective change speeds of four actual heights corresponding to four wheels of the vehicle is significantly smaller than the second smallest one, $V_{midL}$, of those change speeds ($V_{min} \ll V_{midL}$), it can be judged that the smallest change speed $V_{min}$ is abnormal.

Moreover, in the case where the second smallest change speed $V_{midL}$ of the respective change speeds of the four actual heights is significantly smaller than the second greatest one, $V_{midH}$, of those change speeds ($V_{midL} \ll V_{midH}$), it can be judged that there is a possibility that an object may be present in a direction of movement of each of respective portions of the vehicle's body that are opposed to the two wheels corresponding to the smallest change speed $V_{min}$ and the second smallest change speed $V_{midL}$. In this case, there is no need to compare the smallest change speed $V_{min}$ with any other change speeds because, if the second smallest change speed $V_{midL}$ is judged as being abnormal, then it is natural that the smallest change speed $V_{min}$ should be abnormal.

The respective changes of the at least two actual heights can be evaluated based on not the respective change speeds of the at least two actual heights but respective n-time differentiated values of the change speeds thereof.

For example, in the case where the smallest one, $G_{min}$, of respective change accelerations of the four actual heights is significantly smaller than the second smallest one, $G_{midL}$, of those change accelerations ($G_{min} \ll G_{midL}$), it can be judged that the smallest change acceleration $G_{min}$ is abnormal, that is, there is a possibility that an object may be present in a direction of movement of a portion of the vehicle's body that is opposed to the wheel corresponding to the smallest change acceleration $G_{min}$; and in the case where the second smallest change acceleration $G_{midL}$ is significantly smaller than the second greatest one, $G_{midH}$, of the four change acceleration ($G_{midL} \ll G_{midH}$), it can be judged that there is a possibility that an object may be present in a direction of movement of each of respective portions of the vehicle's body that are opposed to the two wheels corresponding to the smallest change acceleration $G_{min}$ and the second smallest change acceleration $G_{midL}$.

In addition, in the case where the smallest one, $dG_{min}$, of respective differentiated values of the respective change accelerations of the four actual heights is significantly smaller than the second smallest one, $dG_{midL}$, of those differentiated values ($dG_{min} \ll dG_{midL}$), it can be judged that the smallest differentiated value $dG_{min}$ is abnormal; and in the case where the second smallest differentiated value $dG_{midL}$ is significantly smaller than the second greatest differentiated value $dG_{midH}$ of those differentiated values ($dG_{midL} \ll dG_{midH}$), it can be judged that the smallest differentiated value $dG_{min}$ and the second smallest differentiated value $dG_{midL}$ are abnormal.

(16) The height controlling apparatus according to the mode (14), wherein the first relative-change-dependent possibility detecting portion includes a lowest-change-speed-dependent possibility detecting portion which detects whether there is said possibility, based on a lowest change speed of said respective change speeds of said at least two actual heights changed by said at least two height controlling actuators.

When a portion of the vehicle's body bumps on an object, a change speed of a body height corresponding to that portion is decreased. Therefore, in the case where two or more height controlling actuators are operated to change two or more body heights at a constant speed, it can be judged that there is a possibility that an object may be present in a direction of movement of a portion of the vehicle's body that is opposed to the wheel corresponding to the smallest one $V_{min}$ of the respective change speeds of the two or more body heights.

Alternatively, when the smallest change speed $V_{min}$ is equal to, or smaller than, an abnormality judging threshold value, $V_{th}$, that is defined by the manner of operation of the corresponding height controlling actuator (i.e., $V_{min} \leq V_{th}$), it can be judged that the change of the body height corresponding to the smallest change speed $V_{min}$ is abnormal.

Otherwise, the possibility of presence of object may be detected based on the smallest one of the respective change speeds of two or more body heights and one of the other change speeds. For example, when an absolute value of a difference of the smallest change speed and the second smallest change speed ($|V_{midL} - V_{min}|$) is equal to, or greater than, an abnormality judging threshold value, $\Delta V_{th}$ (i.e., $|V_{midL} - V_{min}| \geq \Delta V_{th}$), or when the greatest change speed, $V_{max}$, is equal to, or greater than, a normality judging threshold value, $V_{thn}$ (i.e., $V_{max} \geq \Delta V_{thn}$), and simultaneously the smallest change speed $V_{min}$ is equal to, or smaller than, an abnormality judging threshold value, $V_{th}$ (i.e., $V_{min} \leq V_{th}$), it can be judged that the change of the body height corresponding to the smallest change speed $V_{min}$ is abnormal.

(17) The height controlling apparatus according to the mode (14) or the mode (16), wherein the first relative-change-dependent possibility detecting portion includes a next-speed-dependent possibility detecting portion which detects that there is said possibility, when an absolute value of a difference of two next change speeds out of said respective change speeds of said at least two actual heights changed by said at least two height controlling actuators is greater than a second reference value, said two next change speeds being next to each other in an order of magnitude of said respective change speeds of said at least two actual heights.

When the absolute value of the difference of the two next change speeds is greater than the reference value, the smaller one of the two next change speeds is significantly smaller than the greater change speed, and accordingly it can be judged that the smaller change speed and one or more change speeds smaller than the smaller change speed are abnormal.

(18) The height controlling apparatus according to any of the modes (14, (16), and (17), wherein the first relative-change-dependent possibility detecting portion detects that there is said possibility, when at least a highest change speed of said respective change speeds of said at least two actual heights changed by said at least two height controlling actuators is higher than a first predetermined speed and an other change speed of said respective change speeds of said at least two actual heights is lower than a second predetermined speed lower than the first predetermined speed.

When at least the highest change speed $V_{max}$ is higher than the first predetermined speed, i.e., a normality judging threshold $V_{thn}$, it can be judged that a current height controlling operation is being normally performed. However, when a change speed, $V_{ij}$, of another body height is lower than the second predetermined speed, i.e., an abnormality judging threshold $V_{th}$ (i.e., $V_{max} \geq V_{thn}$ and $V_{th} \geq V_{ij}$), it can be judged that a current height controlling operation is abnormal.

(19) The height controlling apparatus according to the mode (15), wherein the second relative-change-dependent possibility detecting portion includes a lowest-change-acceleration-dependent possibility detecting portion which detects whether there is said possibility, based on a lowest change acceleration of respective accelerations of change of said at least two actual heights changed by said at least two height controlling actuators.

(20) The height controlling apparatus according to the mode (15) or the mode (19), wherein the second relative-change-dependent possibility detecting portion includes a next-acceleration-dependent possibility detecting portion which detects that there is said possibility, when an absolute value of a difference of two next change accelerations out of respective accelerations of change of said at least two actual heights changed by said at least two height controlling actuators is greater than a third reference value, said two next change accelerations being next to each other in an order of magnitude of said respective change accelerations of said at least two actual heights.

(21) The height controlling apparatus according to any of the modes (15), (19), and (20), wherein the second relative-change-dependent possibility detecting portion detects that there is said possibility, when at least a highest change acceleration of respective accelerations of change of said at least two actual heights changed by said at least two height controlling actuators is higher than a first predetermined acceleration and an other change acceleration of said respective change accelerations of said at least two actual heights is lower than a second predetermined acceleration lower than the first predetermined acceleration.

When a portion of the vehicle's body bumps on an object, a change acceleration of a body height corresponding to that portion is decreased to a value smaller than zero. Therefore, based on the respective change accelerations of two or more body heights, it can be judged that there is a possibility that an object may be present. In addition, the possibility of presence of object can be detected at an earlier timing than a timing when the possibility is detected based on the respective change speeds of the two or more body heights.

However, the possibility of presence of object can be detected at a still earlier timing based on respective n-time differentiated values of the respective change accelerations of the two or more body heights.

(22) The height controlling apparatus according to any of the modes (15) and (19) through (21), wherein the second relative-change-dependent possibility detecting portion includes a smallest-differentiated-value-dependent possibility detecting portion which detects whether there is said possibility, based on a smallest differentiated value of respective differentiated values of respective accelerations of change of said at least two actual heights changed by said at least two height controlling actuators.

In each of the above-described modes (13) through (21), change speeds V may be replaced with respective differentiated values of change accelerations G. For example, when the smallest differentiated value $dG_{min}$ is equal to, or smaller than, an abnormality judging threshold value $dG_{th}$ (i.e., $dG_{min} \leq dG_{th}$), or when an absolute value of a difference of the smallest differentiated value and the second smallest differentiated value $dG_{midL}$ is equal to, or greater than, an abnormality judging threshold value $\Delta dG_{th}$ (i.e., $|dG_{midL} - dG_{min}| \geq \Delta dG_{th}$), it can be judged that the change of the body height corresponding to the smallest differentiated value $dG_{min}$ is abnormal.

Alternatively, when the greatest differentiated value $dG_{max}$ is equal to, or greater than, a normality judging threshold value $dG_{thn}$ equal to, e.g., zero, and simultaneously the smallest differentiated value $dG_{min}$ is equal to, or smaller than, an abnormality judging threshold value $dG_{th}$ smaller than zero, it can be judged that the change of the body height corresponding to the smallest differentiated value $dG_{min}$ is abnormal (i.e., $dG_{max} \geq 0$ and $dG_{min} \leq dG_{th}$).

(23) The height controlling apparatus according to any of the modes (9) through (22), comprising a plurality of said height controlling actuators including a plurality of fluid-flow controlling actuators, respectively, each of which controls a working fluid to flow into, and out of, at least one of a plurality of fluid chambers which are provided between the body and a plurality of wheel holding devices which hold a plurality of said wheels of the vehicle, respectively, wherein the actuator control device includes a fluid-flow control portion which controls the fluid-flow control actuators so as to change a plurality of said actual heights, respectively, which correspond to the wheels, respectively, and wherein the height-change-dependent possibility detecting portion includes a change-speed-dependent possibility detecting portion which detects whether there is said possibility, based on at least two absolute values of respective absolute values of respective differences between respective speeds of change of the actual heights and respective reference change speeds each of which is determined based on at least one of a temperature of the working fluid and a pressure of the working fluid in a corresponding one of the fluid chambers.

For example, the change-speed-dependent possibility detecting portion may obtain, for each of four wheels of the vehicle, a value, $\Delta V$, calculated by subtracting the change speed of the actual body height from the reference change speed and, if a value ($\Delta V_{max} - \Delta V_{midH}$) calculated by subtracting, from the greatest one, $\Delta V_{max}$, of the thus obtained four values $\Delta V$, the second greatest value, $\Delta V_{midH}$, is equal to, or greater than, an abnormality judging threshold value, $\Delta V_{th}$ (i.e., $\Delta V_{max} - \Delta V_{midH} \geq \Delta V_{th}$), it can be judged that there is a possibility that an object may be present in a direction of movement of a portion of the vehicle's body that is opposed to the wheel corresponding to the greatest value $\Delta V_{max}$.

Alternatively, when a difference of the second greatest value $\Delta V_{midH}$ and the second smallest value, $\Delta V_{midL}$, is equal to, or greater than, an abnormality judging threshold value $\Delta V_{th}$ (i.e., $\Delta V_{midH} - \Delta V_{midL} \geq \Delta V_{th}$), it can be judged that the greatest change speed $\Delta V_{max}$ and the second greatest change speed $\Delta V_{midH}$ are abnormal.

In each of the above-described modes (14) through (18), change speeds V may be replaced with respective values obtained by subtracting respective actual change speeds from respective reference change speeds, so that the mode (23) can be applied to the each mode (14) through (18).

(24) The height controlling apparatus according to any of the modes (9) through (23), wherein the height-change-dependent possibility detecting portion includes a posture-change-dependent possibility detecting portion which detects whether there is said possibility, based on at least one of (a) a change of a posture of the body and (b) a physical amount related to a speed of change of the posture.

In the present height controlling apparatus, the possibility of presence of object is detected based on, e.g. an amount of change of the posture of the vehicle's body. From the manner of operation of the at least one height controlling actuator, a posture of the body during a height controlling operation (i.e., after a height controlling operation is started) can determined. In this case, if a change of a posture of the body during a height controlling operation, from a posture of the body before the operation, differs from a posture change defined by the manner of operation of the height controlling actuator, it can be judged that there is a possibility that an object may be present in a direction of movement of the vehicle's body.

For example, in the case where a plurality of height controlling actuators are operated to change a plurality of body heights, respectively, while keeping a substantially horizontal posture of the vehicle's body, the possibility of presence of object can be detected when the substantially horizontal posture of the vehicle's body when a height controlling operation is started is changed to an inclined posture, when an angle of inclination of the body exceeds a reference angle, or when a speed of increase of the inclination angle exceeds a reference speed. The posture of the vehicle's body can be expressed by a three-dimensional vector.

(25) The height controlling apparatus according to the mode (24), wherein the posture-change-dependent possibility detecting portion detects whether there is said possibility, under a condition that a road surface on which the vehicle is stopped is substantially horizontal.

(26) The height controlling apparatus according to the mode (24) or the mode (25), comprising a plurality of said height controlling actuators each of which corresponds to at least one of a plurality of said wheels of the vehicle and changes at least one of a plurality of said actual heights respectively corresponding to the plurality of wheels, wherein the actuator control device includes a posture maintaining portion which controls the plurality of height controlling actuators to change the plurality of actual heights, respectively, while maintaining a posture of the body before the actual heights are changed.

It is desirable that a change of the posture of the vehicle's body be detected under the condition that the road surface on which the vehicle is stopped is substantially horizontal. In addition, it is desirable that the plurality of height controlling actuators be operated to maintain the posture of the body.

Meanwhile, there is known a motor coach (i.e., a big bus) wherein a height of a front or rear portion of a body that corresponds to a door through which persons can get in, and out of, the coach can be decreased (that is, the coach can take a forward tiling posture or a rearward tilting posture). In this case, if the posture of the coach does not change even if one or more height controlling actuators may be operated, it can be judged that there is a possibility that an object may be present.

(27) The height controlling apparatus according to any of the modes (9) through (26), wherein the height-change-dependent possibility detecting portion includes a condition-dependent possibility detecting portion which detects that there is said possibility, when a predetermined condition with respect to the change of said at least one actual height has continued for a predetermined time duration.

In the case where the possibility of presence of object is detected based on the change of the at least one actual body height, it is preferred to make a judgment based on a plurality of detected values obtained in the predetermined time duration, to a single detected value obtained at a single timing.

(28) The height controlling apparatus according to any of the modes (1) through (27), wherein the possibility detecting device includes a stopped-state-dependent possibility detecting portion which detects whether there is said possibility, under a condition that a running speed of the vehicle is lower than a predetermined speed.

The predetermined speed may be a speed that can be regarded as being zero (i.e., zero, or a speed that is higher than zero and is defined by, e.g., a detection accuracy of a speed sensor), or an extremely low speed. A degree of possibility (i.e., a probability) that an object may be present is higher when the vehicle is in a stopped state than when it is in a running state. In addition, in the case where the possibility of presence of object is detected based on the change of the at least one actual body height, it is not needed, when the vehicle is in the stopped state, to take account of a change of the body height that is caused by the influence of running of the vehicle. This is advantageous to accurately detect the possibility. Moreover, there is known such a clearance sonar that is operated under a condition that the running speed of a vehicle is lower than a predetermined speed.

(29) The height controlling apparatus according to any of the modes (1) 1 through (28), wherein the possibility detecting device includes an environment-change-dependent possibility detecting portion which detects whether there is said possibility, based on a change of an environment around the vehicle.

(30) The height controlling apparatus according to the mode (29), wherein the environment-change-dependent possibility detecting portion includes a getting-in-and-out detecting portion which detects at least one of (a) a person who gets in the vehicle and (b) a person who gets out of the vehicle.

Whether a person gets in, or out of, the vehicle can be detected based on whether a door is opened or closed, or based on the change of the at least one actual body height.

(31) The height controlling apparatus according to any of the modes (1) through (30), wherein the possibility detecting device includes a possibility-degree detecting portion which detects each of a plurality of different degrees of said possibility.

The possibility-degree detecting portion can detect each of the different degrees of the possibility, based on, e.g., a relative-positional relationship between the vehicle's body and the object present around the vehicle, or the change of the at least one actual height.

For example, a higher degree of possibility is detected when a distance between the body and the object present around the vehicle is small than when the distance is great, or when the body and the object approach each other than when the two elements move away from each other. In addition, a higher degree of possibility is detected when a change speed of the actual body height is low than when the change speed is high, or when a differentiated value of a change acceleration of the actual body height is small than when the differentiated value is great.

(32) The height controlling apparatus according to any of the modes (1) through (31), wherein the actuator control device includes a high-speed actuator control portion which controls said at least one height controlling actuator to change said at least one actual height at a speed higher than a predetermined height-change speed; and a low-speed actuator control portion which controls said at least one height controlling actuator to change said at least one actual height at a speed not higher than the predetermined height-change speed, and wherein the possibility detecting device includes a high-speed-control-related possibility detecting portion which detects whether there is said possibility, in a case where the high-speed actuator control portion controls said at least one height controlling actuator.

It is more highly needed to detect the possibility of presence of object, when the actual body height is changed at a high speed than when it is changed at a low speed.

The high-speed-control-related possibility detecting portion detects whether there is the possibility, before or after the high-speed actuator control portion starts controlling the height controlling actuator. In the case where the possibility detecting portion detects whether there is the possibility, before the actuator control portion starts controlling the height controlling actuator, the actuator control portion may not start controlling the height controlling actuator.

(33) The height controlling apparatus according to any of the modes (1) through (32), wherein the movement restraining portion includes at least one of (a) a movement-stopping control portion which controls, when the possibility detecting device detects that there is said possibility, said at least one height controlling actuator to stop the movement of the body, and (b) a direction-reversing control portion which reverses, when the possibility detecting device detects that there is said possibility, said direction of the movement of the body so that the body is moved in a reversed direction.

When the possibility of presence of object is detected, the height controlling actuator is controlled to stop the movement of the vehicle's body, or reverse the direction of the movement of the body so that the body is moved in the reversed direction. In the former case, the operation of the height controlling actuator may be stopped, or the height controlling actuator may be operated to move the body in a reverse direction. If the body is moved in the reverse direction, the movement of the body can be quickly stopped against the inertia of the body.

(34) The height controlling apparatus according to the mode (33), wherein the movement restraining portion includes (b) the direction reversing portion, and wherein the direction reversing portion includes a maximum-speed control portion which reverses said direction of the movement of the body so that the body is moved at a maximum speed in the reversed direction.

When the possibility of presence of object is detected, it is preferred to reverse the direction of the movement of the body and quickly move the body in the reversed direction. In the case where the height controlling actuator includes an electric motor, the maximum-speed control portion controls an electric current supplied to the electric motor so that the electric motor produces a maximum output; and in the case where the height controlling actuator includes a fluid-flow controlling actuator, the maximum-speed control portion controls a fluid flow so that a maximum amount of the working fluid flows into, or out of, a fluid chamber. More specifically described, in the case where the present height controlling apparatus includes a fluid chamber provided between the body and the wheel; a fluid-pressure source; and a control valve provided between the fluid-pressure source and the fluid chamber, the actual body height can be increased by opening the control valve by a maximum amount (when the control valve is operated under a duty-cycle control, the duty cycle or ratio (=(duty time)/(duty time+off-duty time) is selected at 1) and causing a maximum amount of working fluid to flow from the fluid-pressure source to the fluid chamber.

(35) The height controlling apparatus according to any of the modes (1) through (34), wherein the movement restraining portion includes a speed-decrease control portion which controls, when the possibility detecting device detects that there is said possibility, said at least one height controlling actuator to decrease a speed of the movement of the body in said direction.

It is reasonable that when the possibility of presence of object is detected, the speed of the movement of the vehicle's body is decreased.

(36) The height controlling apparatus according to any of the modes (1) through (35), wherein the possibility detecting device includes a possibility-degree detecting portion which detects each of a plurality of different degrees of said possibility, and wherein the movement restraining portion includes a possibility-degree-dependent actuator control portion which controls said at least one height controlling actuator in each of a plurality of different manners corresponding to the plurality of different degrees of said possibility, respectively.

Since the possibility-degree-dependent actuator control portion controls the height controlling actuator according to the detected degree of the possibility, a frequency at which the height controlling actuator is uselessly operated can be reduced as compared with the case where the height controlling actuator is operated independent of degrees of the possibility.

(37) The height controlling apparatus according to the mode (36), wherein the possibility-degree-dependent actuator control portion controls, when the degree of said possibility detected by the possibility-degree detecting portion is higher than a predetermined degree, the at least one height controlling actuator to reverse said direction of the movement of the body so that the body is moved in a reversed direction, and controls, when the detected degree of said possibility is not higher than the predetermined degree, said at least one height controlling actuator to stop the movement of the body in said direction.

(38) The height controlling apparatus according to the mode (36), wherein the possibility-degree-dependent actuator control portion controls, when the degree of said possibility detected by the possibility-degree detecting portion is higher than a predetermined degree, said at least one height controlling actuator to reverse said direction of the movement of the body so that the body is moved in a reversed direction, and controls, when the detected degree of said possibility is not higher than the predetermined degree, said at least one height controlling actuator to decrease a speed of the movement of the body in said direction.

In the case where three or more degrees of the possibility are detected, the direction of the movement of the body may be reversed according to the highest degree; the movement of the body may be stopped according to the medium degree; and the speed of the movement of the body may be decreased according to the lowest degree.

Alternatively, the possibility-degree-dependent actuator control portion may control, when the degree of the possibility is higher than a predetermined degree, the height controlling actuator to stop the movement of the body and controls, when the degree of the possibility is not higher than the predetermined degree, the height controlling actuator to decrease the speed of the movement of the body in the direction.

(39) The height controlling apparatus according to any of the modes (36) through (38), wherein the possibility-degree-dependent actuator control portion includes a speed control portion which controls said at least one height controlling actuator to control a speed of the movement of the body such that the higher the degree of said possibility detected by the possibility-degree detecting portion is, the lower the speed of the movement of the body is.

It is less needed to decrease the speed of the movement of the body, when the degree of the possibility is low than when the degree of the possibility is high. Therefore, it is desirable that the height controlling actuator be operated to control the speed of the movement of the body such that the higher the degree is, the lower the speed is. Alternatively, the height controlling actuator may be operated such that when the degree of the possibility is higher than a first predetermined degree, the movement of the body is stopped; and when the degree of the possibility is lower than a second predetermined degree lower than the first degree, the movement of the body is not stopped, i.e., is continued (i.e., an amount of decreasing of the speed is zero). The stopping of the movement of the body means that an amount of decreasing of the speed is maximum.

(40) The height controlling apparatus according to any of the modes (1) through (39), wherein the actuator control portion includes an operation resuming portion which resumes, when at least one predetermined resuming condition including a condition that the movement of the body in said direction has been stopped by said at least one height controlling actuator under control of the movement restraining portion and at least one door of the vehicle has been changed from an opened state thereof to a closed state thereof, is met, an operation of said at least one height controlling actuator so as to change said at least one actual height.

(41) The height controlling apparatus according to the mode (40), wherein the operation resuming portion judges, when a time duration in which said at least one door of the vehicle has been kept in the opened state thereof is shorter than a predetermined time duration, that said at least one predetermined resuming condition has been met, and resumes the operation of said at least one height controlling actuator.

When one of the doors of the vehicle has been changed from its opened state to its closed state, it can be judged that there is a high degree of possibility that a person may have got out of the vehicle and an object such as luggage may be present around the vehicle. In this case, however, if the time duration in which the door has been kept to its opened state is short, it can be judged that there is a low degree of possibility that a person may have got out of the vehicle and an object may be present around the vehicle.

Hence, it is reasonable that when the at least one predetermined resuming condition including the condition that the door has been changed from the opened state to the closed state is met, the operation of the height controlling actuator is resumed.

However, the present mode (41) may be applied to only the case where the possibility detecting device detects the possibility of presence of object, because the door has been changed from the opened state to the closed state, and accordingly the movement restraining portion stops changing the actual body height. In addition, a higher degree of the possibility that an object may be present around the vehicle may be detected when the time duration in which the door has been kept to its opened state is long than when it is short.

(42) The height controlling apparatus according to the mode (40) or the mode (41), wherein the operation resuming portion resumes the operation of said at least one height controlling actuator in a different manner than a manner in which the actuator control portion has controlled said at least one height controlling actuator before the operation thereof is resumed.

For example, it is desirable that when the operation of the height controlling actuator is resumed, the speed of the movement of the vehicle's body be decreased. In addition, after the resumption of the operation, the body can be moved at a lower speed when the time duration in which the door has been kept to its opened state is long than when it is short.

(43) The height controlling apparatus according to any of the modes (1) through (42), wherein the actuator control device includes a high-speed actuator control portion which controls said at least one height controlling actuator to change said at least one actual height at a speed higher than a predetermined height-change speed; a low-speed actuator control portion which controls said at least one height controlling actuator to change said at least one actual height at a speed not higher than the predetermined height-change speed; and a high-speed-control-related actuator control portion which controls, when the high-speed actuator control portion controls said at least one height controlling actuator and the possibility detecting device detects that there is said possibility, said at least one height controlling actuator to restrain the movement of the body in said direction and which does not control, when the low-speed actuator control portion controls said at least one height controlling actuator and the possibility detecting device detects that there is said possibility, said at least one height controlling actuator to restrain the movement of the body in said direction.

If the possibility that an object may be present in a direction of movement of the vehicle's body is detected when the high-speed actuator control portion controls the height controlling actuator, the movement of the body in that direction is restrained; but even if the possibility of presence of object may be detected when the low-speed actuator control portion controls the height controlling actuator, the movement of the body in that direction is not restrained.

(44) The height controlling apparatus according to the mode (43), wherein the high-speed actuator control portion includes a high-speed-control-request-dependent actuator control portion which controls, in response to a predetermined high-speed height-change request, said at least one height controlling actuator to change said at least one actual height at the speed higher than the predetermined height-change speed.

When the predetermined high-speed height-change request or need is detected or recognized, the height controlling actuator is operated to change the actual body height at the high speed. For example, a high-speed height-change request or need to quickly change the body height to a target height is detected or recognized (a) when the body height is changed to a height suitable for a person to get in the vehicle, (b) when the body height is changed, after a person has got in the vehicle, to a height suitable for the vehicle to run, or (c) when the body height is changed to a height suitable for a person to get out of the vehicle.

(45) The height controlling apparatus according to any of the modes (1) through (44), comprising a plurality of said height controlling actuators each of which corresponds to at least one of a plurality of said wheels of the vehicle and changes at least one of a plurality of said actual heights each of which is defined as a relative position of a corresponding one of a plurality of portions of the body that respectively correspond to the plurality of wheels, and a corresponding one of the wheels, wherein the possibility detecting device includes a plurality of individual height-change detecting portions which detect respective changes of the actual heights; and a plurality of individual height-change-dependent possibility detecting portions each of which detects, based on the change of a corresponding one of the actual heights that is detected by a corresponding one of the individual height-change detecting portions, whether there is the possibility that the object may be present in the direction in a corresponding one of the portions of the body is moved to change said corresponding actual height, and wherein the movement restraining portion includes at least one of (a) a partly stopping portion which does not control, when at least one individual height-change-dependent possibility detecting portion as a part of the individual height-change-dependent possibility detecting portions detects that there is the possibility that the object may be present in the direction in which a corresponding one of the portions of the body is moved, at least a corresponding one of the height controlling actuators so as not to change a corresponding one of the actual heights, and (b) a fully stopping portion which does not control, when at least one individual height-change-dependent possibility detecting portion as a part of the individual height-change-dependent possibility detecting portions detects that there is the possibility that the object may be present in the direction in which a corresponding one of the portions of the body is moved, each of the height controlling actuators so as not to change any of the actual heights.

If the at least one individual height-change-dependent possibility detecting portion as a part of the individual height-change-dependent possibility detecting portions detects that there is the possibility that an object may be present in the direction in which front left and right portions (or rear left and right portions) of the vehicle's body are moved, the height controlling actuators corresponding to the front left and right wheels (or the rear left and right wheels) are not operated to change the corresponding actual body heights. In this case, if the height controlling actuators corresponding to the two remaining wheels are operated to change the corresponding actual body heights, a height of a lengthwise end portion of the body that is located in front (or rear) of the two front wheels (or the two rear wheels) is changed in a direction opposite to the direction in which the two actual body heights are changed by the two height controlling actuators corresponding to the two remaining wheels. Thus, in this case, it is not needed to control the two height controlling actuators corresponding to the above-indicated front left and right wheels (or the above-indicated rear left and right wheels) so as to reverse the direction in which the corresponding body heights are changed. Alternatively, if the possibility of presence of object is detected in a direction of movement of a portion of the body that corresponds to only one of the two front (or rear) wheels, the two height controlling actuators corresponding to both the two front (or rear) wheels may not be operated.

On the other hand, if the possibility of presence of object is detected in a direction of movement of each of two portions of the body that are located on a diagonal line of the body, all the four height controlling actuators corresponding to the four wheels may not be operated. In this case, the balance of the four body heights can be prevented from being broken.

(46) The height controlling apparatus according to any of the modes (1) through (45), wherein the actuator control portion includes an informing device which informs, when the actuator control portion controls said at least one height controlling actuator and the possibility detecting portion detects that there may be said possibility, at least one of (a) that said at least one actual height is controlled and (b) that there is said possibility.

The informing device informs a person (e.g., a driver) of at least one of (a) that the at least one actual height is controlled and (b) that there is the possibility of presence of object. In addition, the informing device may include at least one of a device that outputs the information in a visible manner and a device that outputs the information in an audible manner. Moreover, the informing device may include at least one of a device that outputs the information toward a person inside the vehicle and a device that outputs the information toward a person outside the vehicle.

The informing device may be a device that is exclusively used for achieving the above-indicated aim, or a device that is mainly used for achieving a different aim. In the latter case, an outside lamp provided outside the vehicle, such as a head lamp, a fog lamp, a cornering lamp, a turn signal lamp, or a stop lamp; an inside lamp provided on an instrument panel, such as a hazard lamp; a horn that produces sounds toward a person outside the vehicle; or a speaker of an audio device or a navigation device.

In the case where the informing device can be additionally used to inform a person of a fact that the vehicle has a failure, it is desirable that when the informing device is used to inform at least one of (a) that the at least one actual height is controlled and (b) that there is the possibility of presence of object, the informing device be operated in a manner distinguishable from the manner in which it is used to inform that the vehicle has a failure.

(47) The height controlling apparatus according to the mode (46), wherein the possibility detecting device includes a possibility-degree detecting portion which detects each of a plurality of different degrees of said possibility, and wherein the informing device operates in each of a plurality of different manners corresponding to the plurality of different degrees of said possibility, respectively.

In the present height controlling apparatus, the informing device can inform a person of the detected degree of the possibility of presence of object.

For example, in the case where the informing device includes a first device (e.g., a lamp or a display) that outputs the information in a visible manner and a second device (e.g., a horn or a speaker) that outputs the information in an audible manner, both the first and second devices may be operated to output the information, when the degree of the possibility is high; and either one of the first and second devices may be operated to output the information, when the degree of the possibility is low. In addition, in the case where the informing device includes a third device that outputs the information toward a person inside the vehicle and a fourth device that outputs the information toward a person outside the vehicle, both the third and fourth devices may be operated to output the information, when the degree of the possibility is high; and either one of the third and fourth devices may be operated to output the information, when the degree of the possibility is low.

(48) The height controlling apparatus according to any of the modes (1) through (47), wherein the actuator control portion includes an in-emergency stopping portion which stops the movement of the body in said direction, in response to an in-emergency stopping command.

In the present height controlling apparatus, the in-emergency stopping portion can stop the movement of the body, for example, in response to recognition of a person's voice; detection of bumping of the vehicle's body against an object; information received from a portable controller worn by, e.g., a driver; or operation of an in-emergency operable member. If a person contacts the body, then an electric current flowing through the body is grounded. Thus, a fact that a person has contacted the body can be detected by detecting the electric current flowing through the body. In each case, the vehicle's body and/or the object can be prevented from being damaged, or the damage can be minimized.

Alternatively, the actuator control portion may control the height controlling actuator to reverse the direction of the movement of the vehicle's body, in response to an in-emergency control command.

(49) The height controlling apparatus according to any of the modes (1) through (48), wherein said at least one height controlling actuator includes at least one fluid-flow control actuator which controls a working fluid to flow into, and out of, at least one fluid chamber which is provided between the body and at least one wheel holding device which holds said at least one wheel, wherein the apparatus further comprises:

an accumulator which stores the working fluid in a pressurized state and can supply the pressurized working fluid to said at least one fluid chamber;

a pumping device which supplies, to the accumulator, the working fluid in the pressurized state; and a pumping-device control portion which controls, after an ignition switch is switched from an ON state thereof to an OFF state thereof, the pumping device so that a pressure of the working fluid stored by the accumulator is kept higher than a predetermined pressure.

In the present height controlling apparatus, after the ignition switch is switched from its ON state to its OFF state, the pumping device is operated so that the pressure of the working fluid in the accumulator is kept higher than the predetermined pressure. Therefore, even if a high-pressure fluid may be needed in the state in which the ignition switch is in the OFF state, the accumulator can quickly supply the high-pressure fluid to the fluid chamber.

In the state in which the ignition switch is in the ON state, too, the pumping-device control portion controls the pumping device so that the pressure of the working fluid in the accumulator may fall within a predetermined pressure range higher than the predetermined pressure value.

(50) A height controlling apparatus for controlling at least one actual height as a relative position of a body of a vehicle and at least one wheel of the vehicle, the apparatus comprising:

at least one height controlling actuator which changes said at least one actual height;

a height-control judging device which judges whether it is desirable to control said at least one actual height; and an actuator control device which controls said at least one height controlling actuator according to a judgment made by the height-control judging device.

In the present height controlling apparatus, the actuator control device controls, according to the judgment made by the height-control judging device, the height controlling actuator to change the speed of the changing of the actual body height, stop the changing of the actual body height, or change the direction of the changing of the actual body height, or not to start the changing of the actual body height.

Whether it is desirable to control the actual body height can be judged based on a current condition of the vehicle or an environment around the vehicle.

The height controlling apparatus in accordance with the present mode (50) may be combined with the technical feature in accordance with any of the modes (1) through (49).

(51) A height controlling apparatus for controlling at least one actual height as a relative position of a body of a vehicle and at least one wheel of the vehicle, the apparatus comprising:

at least one height controlling actuator which changes said at least one actual height;

an operation detecting device detects whether at least one operation out of an energy-source supplying operation, an oil changing operation, a roof-carrier loading operation, a roof-carrier repairing operation, and a vehicle washing operation is being performed; and a height-control inhibiting portion which inhibits, when the operation detecting device detects that said at least one operation is being performed, said at least one height controlling actuator from changing said at least one actual height.

Since at least one of the energy-source supplying operation, the oil changing operation, the roof-carrier loading operation, the roof-carrier repairing operation, and the vehicle washing operation is detected, the height controlling actuator is inhibited from changing the actual body height. Therefore, the at least one operation can be prevented from being adversely influenced by the changing of the body height. If the at least one operation is detected before the changing of the body height is started, then the changing of the body height is not started; and if the at least one operation is detected after the changing of the body height is started, then the changing of the body height is stopped or aborted.

The height controlling apparatus in accordance with the present mode (51) may be combined with the technical feature in accordance with any of the modes (1) through (50).

(52) A height controlling apparatus for controlling at least one actual height as a relative position of at least one portion of a body of a vehicle that corresponds to at least one wheel of the vehicle, and said at least one wheel, the apparatus comprising:

at least one fluid chamber which is provided between said at least one portion of the body and at least one wheel holding device which holds said at least one wheel;

at least one fluid-flow control actuator which controls a working fluid to flow into, and out of, said at least one fluid chamber so as to change said at least one actual height;

an accumulator which stores the working fluid in a pressurized state and can supply the pressurized working fluid to said at least one fluid chamber;

a pumping device which supplies, to the accumulator, the working fluid in the pressurized state; and a pumping-device control portion which controls, after an ignition switch is switched from an ON state thereof to an OFF state thereof, the pumping device so that a pressure of the working fluid stored by the accumulator is kept higher than a predetermined pressure.

The height controlling apparatus in accordance with the present mode (52) may be combined with the technical feature in accordance with any of the modes (1) through (51).

(53) A height controlling apparatus for controlling at least one actual height as a relative position of at least one portion of a body of a vehicle that corresponds to at least one wheel of the vehicle, and said at least one wheel, the apparatus comprising:

at least one fluid chamber which is provided between said at least one portion of the body and at least one wheel holding device which holds said at least one wheel;

at least one fluid-flow control actuator which controls a working fluid to flow into, and out of, said at least one fluid chamber so as to change said at least one actual height;

an accumulator which stores the working fluid in a pressurized state and can supply the pressurized working fluid to said at least one fluid chamber;

a pumping device which supplies, to the accumulator, the working fluid in the pressurized state; and a pumping-device control portion which controls, when an ignition switch is in an OFF state thereof, the pumping device so that a pressure of the working fluid stored by the accumulator falls within a predetermined pressure range.

The height controlling apparatus in accordance with the present mode (51) may be combined with the technical feature in accordance with any of the modes (1) through (50).

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a vehicle's suspension system employing a height controlling apparatus to which the present invention is applied. The suspension system is a four-wheel independent suspension system that is employed by a four-wheel-drive vehicle, and is common to all embodiments of the height controlling apparatus that will be described in detail later.

Figure 1:
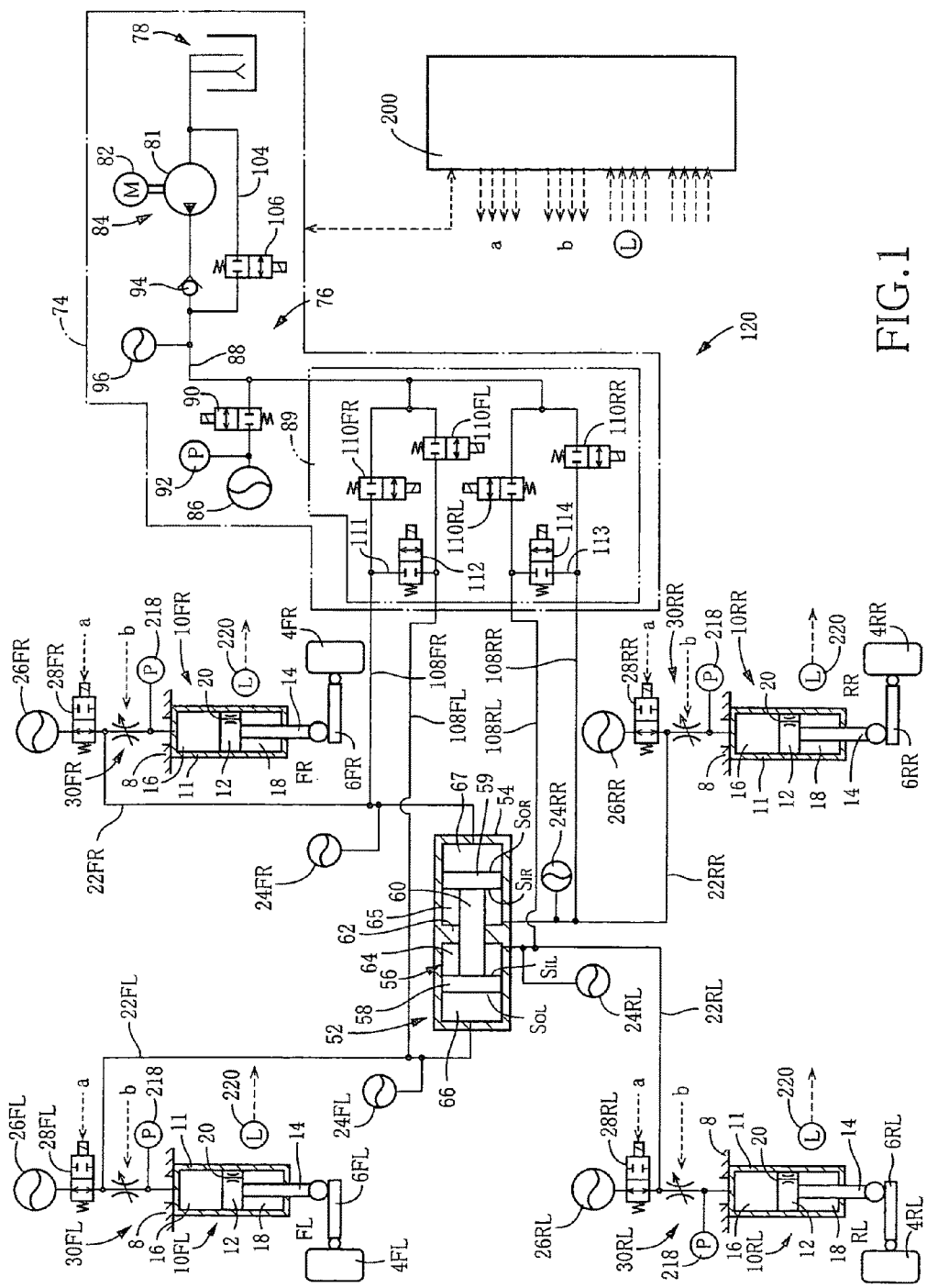
FIG. 1 is a schematic view of a suspension system employing a height controlling apparatus to which the present invention is applied.

As shown in FIG. 1, the suspension system includes four suspension cylinders 10 (10FL, 10FR, 10RL, 10RR) and corresponding suspension springs, not shown, that are provided between four wheel holding devices 6 (6FL, 6FR, 6RL, 6RR) and a vehicle's body 8, respectively. The four wheel holding devices 6 (6FL, 6FR, 6RL, 6RR) hold four wheels 4 (i.e., a front left wheel 4FL, a front right wheel 4FR, a rear left wheel 4RL, and a rear right wheel 4RR), respectively.

The four suspension cylinders 10 have an identical construction, and each suspension cylinder 10 includes a housing 11; a piston 12 that fits in an inner space of the housing 11 such that the piston 12 is movable relative to the housing 11; and a piston rod 14. The piston rod 14 is connected to a corresponding one of the four wheel holding devices 6, such that the piston rod 14 is not movable relative to the corresponding wheel holding device 6 in a vertical direction, and the housing 11 is connected to the vehicle's body 8 such that the housing 11 is not movable relative to the body 8 in the vertical direction.

The piston 12 divides the inner space of the housing 11 into two liquid chambers 16, 18, and has a communication passage 20 with an invariable restrictor. When the piston 12 is moved relative to the housing 11 by a movement of a corresponding one of the four wheels 4 relative to the vehicle's body 8, a working liquid as a sort of working fluid moves between the two liquid chambers 16, 18 through the communication passage 20. Thus, the communication passage 20 with the restrictor produces a damping force, and each suspension cylinder 10 functions as a shock absorber.

The respective first liquid chambers 16 of the four suspension cylinders 10 (10FL, 10FR, 10RL, 10RR) are communicated with four individual passages 22 (22FL, 22FR, 22RL, 22RR), respectively, that are communicated, in parallel, with four high-pressure accumulators 24 (24FL, 24FR, 24RL, 24RR), respectively, and with four low-pressure accumulators 26 (26FL, 26FR, 26RL, 26RR), respectively, that correspond to the four suspension cylinders 10 (10FL, 10FR, 10RL, 10RR), respectively. Four spring-constant switching valves 28 (28FL, 28FR, 28RL, 28RR) are provided between the four suspension cylinders 10 (10FL, 10FR, 10RL, 10RR) and the four low-pressure accumulators 26 (26FL, 26FR, 26RL, 26RR), respectively.

Each of the accumulators 24, 26 functions as a spring. For example, each accumulator 24, 26 includes a housing and a partition member that divides an inner space of the housing into two volume-changeable chambers one of which is communicated with the corresponding individual passage 22 and the other of which is filled with an elastic body. As the volume of one of the two chambers is increased, the volume of the other chamber is decreased, so that the each accumulator 24, 26 produces an elastic force. Each accumulator 24, 26 may be of a bellows type, of a bladder type, or of a piston type.

In the present embodiment, each high-pressure accumulator 24 has a spring constant greater than that of each low-pressure accumulator 26, as described above. Thus, each accumulator 24 is called the high-pressure accumulator, and each accumulator 26 is called the low-pressure accumulator. Each of the spring-constant switching valves 28 is a solenoid-operated open/close valve that is normally open.

The four individual passages 22 (22FL, 22FR, 22RL, 22RR) have respective variable restrictors 30 (30FL, 30FR, 30RL, 30RR). As described above, when each of the four wheels 4 is moved relative to the body 8 in the vertical direction, the working liquid flows into, or out of, the first liquid chamber 16 of the corresponding suspension cylinder 10. Each of the four variable restrictors 30 controls a flow area (i.e., a transverse cross-section area) of the corresponding individual passage 22 and thereby controls the damping force produced by the corresponding suspension cylinder 10. Thus, in the present embodiment, each variable restrictor 30 constitutes a damping-force controlling device.

The four suspension cylinders 10FL, 10FR, 10RL, 10RR are connected to a center cylinder 52 via the respective individual passages 22FL, 22FR, 22RL, 22RR.

The center cylinder 52 includes a housing 54 and a control piston 56 that fits in an inner space of the housing 54 such that the control piston 56 is slideable on an inner circumferential surface of the housing 54. The control piston 56 includes two end pistons 58, 59 and a connection member 60 connecting between the two end pistons 58, 59. The connection member 60 passes through a partition wall 62 that cooperates with the two end pistons 58, 59 to divide the inner space of the housing 54 into four liquid chambers 64, 65, 66, 67. More specifically described, the four liquid chambers 64, 65, 66, 67 include two inner liquid chambers 64, 65 that are defined by the partition wall 62 and the two end pistons 58, 59; and two outer liquid chambers 66, 67 that are defined by the two end pistons 58, 59 and two opposite end walls of the housing 54. The first outer liquid chamber 66 is connected to the suspension cylinder 10FL corresponding to the front left wheel 4FL; the second outer liquid chamber 67 is connected to the suspension cylinder 10FR corresponding to the front right wheel 4FR; the first inner liquid chamber 64 is connected to the suspension cylinder 10RL corresponding to the rear left wheel 4RL; and the second inner liquid chamber 65 is connected to the suspension cylinder 10RR corresponding to the rear right wheel 4RR.

In the following description, when it is needed to discriminate the four suspension cylinders 10, the four high-pressure accumulators 24, the four low-pressure accumulators 26, and so on, from each other, symbols FL, FR, RL, RR representing the corresponding positions in the vehicle are added to the reference numerals 10, 24, 26, . . . ; and when it is not, those symbols are not added.

The present suspension system employs a height controlling apparatus 74 that includes a high-pressure source 76; a reservoir 78 as a low-pressure source; and an individual valve device 89.

The high-pressure source 76 includes a pumping device 84 including a pump 81 and a pump motor 82; and a pressure storage accumulator 86. The pumping device 84 and the pressure storage accumulator 86 are communicated with a control passage 88. The pump 81 pumps up the working liquid from the reservoir 78, and outputs the pressurized working liquid, so that the pressurized working liquid is stored by the pressure storage accumulator 86. The accumulator 86 is communicated with the control passage 88 via a pressure storage control valve 90 as a solenoid-operated open/close valve that is normally closed. An accumulator pressure sensor 92 that detects a pressure of the working liquid stored by the accumulator 86, is communicated with the accumulator 86 directly, i.e., without intervention of the pressure storage control valve 90.

The control passage 88 has, on a liquid-output side of the pump 81, a check valve 94 and a noise reduction accumulator 96. A flow-out passage 104 connects between a high-pressure side and a low-pressure side of the pump 81, and has a flow-out control valve 106 as a solenoid-operated open/close valve that is normally closed.

The individual valve device 89 is associated with four individual control passages 108 (108FL, 108FR, 108RL, 108RR) each of which connects between the common control passage 88 and a corresponding one of the four individual passages 22 (22FL, 22FR, 22RL, 22RR). The four individual control passages 108 (108FL, 108FR, 108RL, 108RR) have respective individual control valves 110 (110FL, 110FR, 110RL, 110RR). In addition, the two individual control passages 108FL, 108FR are connected to each other by a front-side communication passage 111 having a first communication valve 112; and the other, two individual control passages 108RL, 108RR are connected to each other by a rear-side communication passage 113 having a second communication valve 114.

Each of the four individual control valves 110FL, 110FR, 110RL, 110RR and the two communication valves 112, 114 is a solenoid-operated open/close valve that is normally closed. When each one of the four individual control valves 110FL, 110FR, 110RL, 110RR is controlled independent of the other individual control valves 110 in the state in which the two communication valves 112, 114 are closed, a body height with respect to a corresponding one of the four wheels 4FL, 4FR, 4RL, 4RR can be controlled independent of respective body heights with respect to the other wheels 4. In the present embodiment, a body height with respect to each one of the four wheels 4FL, 4FR, 4RL, 4RR is defined as a relative position (or a distance) between a corresponding one of the four wheels 4FL, 4FR, 4RL, 4RR (or a corresponding one of the four wheel holding devices 6FL, 6FR, 6RL, 6RR) and a corresponding one of four portions of the vehicle's body 8 to which the four suspension cylinders 10FL, 10FR, 10RL, 10RR are connected, respectively. In addition, when each one of the two communication valves 112, 114 is operated, two body heights with respect to a corresponding pair of wheels 4 out of the pair of front wheels 4FL, 4FR and the pair of rear wheels 4RL, 4RR are controlled either to a same height or to respective different heights.

In the present embodiment, respective solenoids of the four individual control valves 110, the pressure storage control valve 90, and the flow-out control valve 106, and a drive circuit that drives the pump motor 82 cooperate with each other to constitute four body-height controlling actuators 120. The four body-height controlling actuators 120 are operated to control respective amounts of the working liquid in the respective first liquid chambers 16 of the four suspension cylinders 10 and thereby move the four portions of the vehicle's body 8, respectively. The four body-height controlling actuators 120 are associated with the four wheels 4, respectively, and the respective solenoids of the pressure storage control valve 90 and the flow-out control valve 106, and the drive circuit that drives the pump motor 82 are common to the four wheels 4. For example, the body-height controlling actuator 120FL associated with the front left wheel 4FL is constituted by the respective solenoids of the individual control valve 110FL, the pressure storage control valve 90, and the flow-out control valve 106, and the drive circuit that drives the pump motor 82; and the body-height controlling actuator 120FR associated with the front right wheel 4FR is constituted by the respective solenoids of the individual control valve 110FR, the pressure storage control valve 90, and the flow-out control valve 106, and the drive circuit that drives the pump motor 82. A suspension ECU (electronic control unit) 200 that controls the four body-height controlling actuators 120 constitutes an actuator control device.

However, it can be said that the four suspension cylinders 10 constitute four body-height controlling actuators, respectively. In this case, the respective solenoids of the four individual control valves 110, the pressure storage control valve 90, and the flow-out control valve 106, and the drive circuit that drives the pump motor 82 cooperate with each other to constitute an actuator control device that controls the respective amounts of the working liquid in the respective first liquid chambers 16 of the four suspension cylinders 10 as the four body-height controlling actuators.

Figure 3:
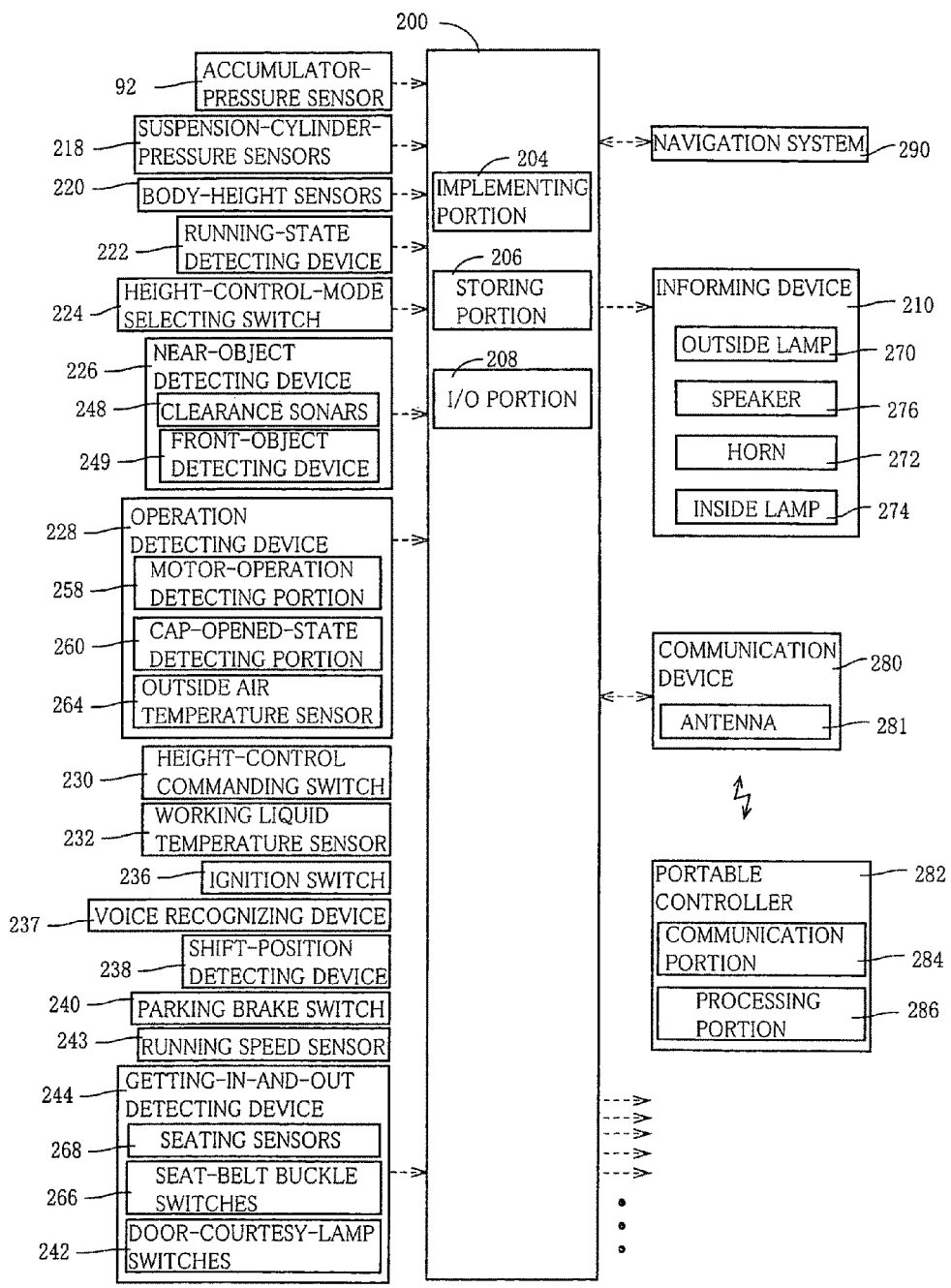
FIG. 3 is a diagrammatic view of a suspension ECU (electronic control unit) of the suspension system.

The present suspension system is controlled by the suspension ECU 200 that is essentially constituted by a computer. As shown in FIG. 3, the suspension ECU 200 includes an implementing portion 204, a storing portion 206, and an input/output (I/O) portion 208. The respective coils (or solenoids) of the four spring-constant switching valves 28, the four variable restrictors 30, the pressure storage control valve 90, the four individual control valves 110, the two communication valves 112, 114, the flow-out control valve 106, and the pump motor 81, all shown in FIG. 1, are connected to the I/O portion 208 via respective drive circuits, not shown. In addition, an informing device 210, shown in FIG. 3, and the accumulator-pressure sensor 92 are connected to the I/O portion 208. Other elements that are connected to the I/O portion 208 are as follows: four suspension-cylinder-pressure sensors 218 that detect respective pressures of the working liquid in the respective first liquid chambers 16 of the four suspension cylinders 10; four body-height sensors 220 that are associated with the four wheels 4, respectively, and detect respective heights of the four portions of the vehicle's body 8 that correspond to the four wheels 4, respectively; a running-state detecting device 222 that detects a running state of the vehicle; a height-controlling-mode selecting switch 224 that is operable to select one of a plurality of height controlling modes; a near-object detecting device 226 that detects an object near to the vehicle; an operation detecting device 228 that detects an operation; a height-control commanding switch 230; a working-liquid-temperature sensor 232 that detects a temperature of the working liquid; an ignition switch 236; a voice recognizing device 237; a shift-position detecting device 238; a parking-brake switch 240; four door-courtesy-lamp switches 242 that are associated with four doors 254 of the vehicle; a running-speed sensor 243 that detects a running speed of the vehicle; and a getting-in-and-out detecting device 244.

The running-state detecting device 222 that detects the running state of the vehicle may be one including a longitudinal-direction acceleration sensor that detects a braking or driving state of the vehicle (i.e., a decelerating or accelerating state of the vehicle); or one including a lateral-direction acceleration sensor that detects a turning state of the vehicle. However, the turning state of the vehicle may be detected by a yaw-rate sensor, a steering-angle sensor, or the running-speed sensor 243.

The height-controlling-mode selecting switch 224 is operable by a driver to select a desired one of an automatic mode and a manual mode. In a state in which the automatic mode is selected, the body heights are automatically changed when a predetermined condition is met, according to the predetermined condition met; and in a state in which the manual mode is selected, the body heights are changed according to a target height position indicated by the height-control commanding switch 230.

Figures 2A, 2B:
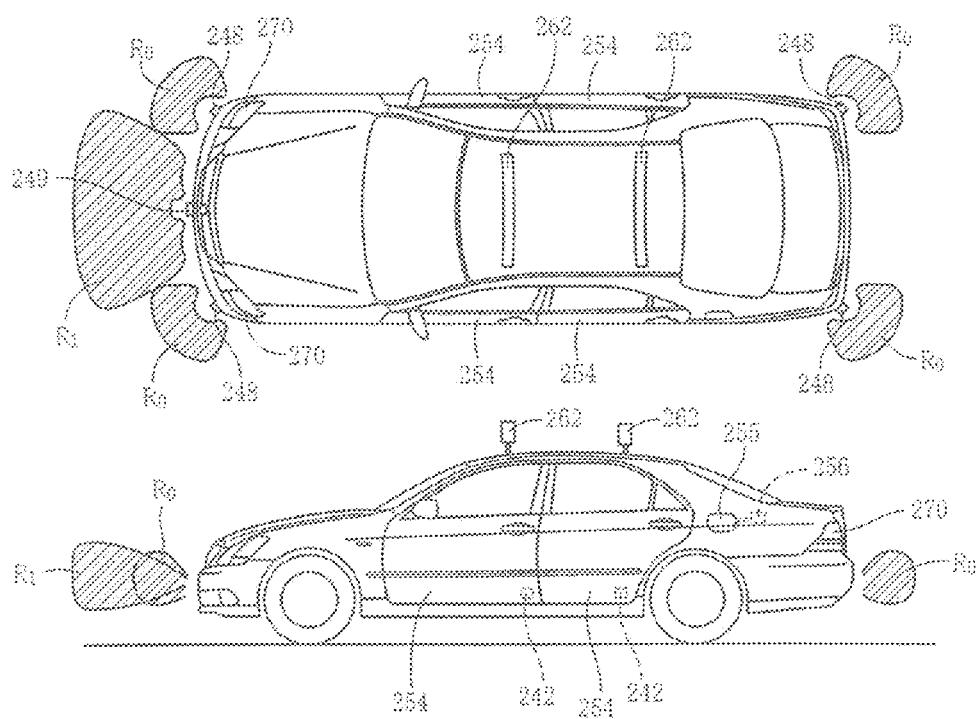
FIG. 2A is a plan view of a vehicle including the suspension system.
FIG. 2B is a side elevation view of the vehicle.

The near-object detecting device 226 detects whether an object (e.g., luggage) is present in at least one predetermined area near to the vehicle. In the present embodiment, the near-object detecting device 226 includes four clearance sonars 248 and a front-object detecting device 249, as shown in FIGS. 2A and 2B.

The four clearance sonars 248 are provided in four corner portions of the vehicle, and each of the clearance sonars 248 utilizes a supersonic wave. Each of the clearance sonars 248 includes an emitter that emits a supersonic wave and a receiver that receives the supersonic wave reflected from an object, and detects, based on the received supersonic wave, a relative-positional relationship between the vehicle's body 8 and the object, for example, judges whether an object is present in a corresponding one of four predetermined areas, R0, shown in FIG. 2A, detects a distance between a detected object and the each sonar 248 itself, and/or detects time-wise changes of the detected distance.

The front-object detecting device 249 utilizes a laser beam or a millimeter wave, includes an emitter that emits a laser beam or the like and a receiver that receives the laser beam reflected from an object, and detects, e.g., whether an object is present in a predetermined area, R1. The front-object detecting device 249 may be one that is used in, e.g. a cruising control known in the art. In this case, the front-object detecting device 249 can detect an object present in an area wider than the predetermined area R1 shown in FIG. 2A. However, in the present embodiment, the area R1 is so predetermined as to be able to detect whether an object is present in a direction in which the body 8 is moved in a body-height controlling operation.

Alternatively, the near-object detecting device 226 may be one including a back or rear sonar that is provided in a rear portion of the vehicle.

Otherwise, the near-object detecting device 226 may be one including the four door-courtesy-lamp switches 242 each of which detects opening and closing of a corresponding one of the four doors 254. When each of the doors 254 is opened or closed, a corresponding one of the switches 242 changes its state. For example, when each door 254 is opened, a corresponding courtesy lamp, not shown, is turned on, and the corresponding switch 242 is switched to an ON state thereof. When each door 254 is switched from a closed state thereof to an opened state thereof, or when each door 254 is kept at the opened state, it can be judged that there is a possibility that an object may be present near to the vehicle, because a person may get in, or out of, the vehicle through the opened door 254.

Moreover, the near-object detecting device 226 may be one including door-lock sensors. When one of door locks is unlocked, it can be judged that there is a possibility that an object may be present near to the vehicle because a person may get in, or out of, the vehicle. In this case, however, a degree of possibility, i.e., a probability that an object may be present near to the vehicle is lower than that in the above-described case where opening or closing of one of the four doors 254 is detected.

The front-object detecting device 249 may not be one that is used in the cruising control, but may be a sensor that can detect whether an object is present in the predetermined area R1 in front of the vehicle.

The operation detecting device 228 detects whether an operation is being performed by a person. In the present embodiment, the operation detecting device 228 detects at least one of a gasoline feeding operation as a sort of energy-source supplying operation, an oil changing operation, a roof loading operation, a roof repairing operation, and a vehicle washing operation. The gasoline feeding operation can be detected by detecting an operation of a fuel-lid opener motor 256 that opens and closes a fuel lid 255. The operation of the fuel-lid opener motor 256 is detected by a motor-operation detecting portion 258 that detects whether an electric current is being supplied to the opener motor 256.

The oil changing operation is detected by detecting whether a cap of an oil pan for an engine, not shown, is in an opened state. This is detected by a cap-opened-state detecting portion 260.

When a roof carrier 262 is loaded with luggage, the body heights are more or less decreased. Therefore, the roof loading operation can be detected based on respective values detected by the four body-height sensors 220. Meanwhile, the respective values detected by the body-height sensors 220 change not only when the body heights are controlled, but also when a person gets in, or out of, the vehicle. Therefore, in the present embodiment, it is possible to judge that there is a possibility that the roof loading operation is being performed, if actual changes of the body heights do not correspond to respective changes of the body heights to be caused by respective operations of the four body-height controlling actuators 120 under a condition that no person who gets in, or out of, the vehicle is detected. Whether a person gets in, or out of, the vehicle can be detected by the getting-in-and-out detecting device 244.

When the vehicle is washed, a liquid (e.g., water) is applied to the vehicle, so that a temperature of the vehicle is changed. This temperature change is greater than natural temperature changes caused by changes of the environment around the vehicle. In addition, since the liquid is applied to only specific portions of the vehicle, the temperature of the vehicle is frequently changed. Therefore, if the temperature change of the vehicle is greater than the natural temperature changes caused by the changes of the environment, if the temperature of the vehicle abruptly changes up or down to a certain value and then does not change from that value any more, or if the temperature of the vehicle too frequently changes, it is possible to judge that the vehicle washing operation is being performed. A temperature of an outer surface of the vehicle's body 8 is detected by an outside-air-temperature sensor 264.

Thus, in the present embodiment, the operation detecting device 228 includes at least one of the motor-operation detecting portion 258, the cap-opened-state detecting portion 260, the body-height sensors 220, and the outside-air-temperature sensor 264.

The height-control commanding switch 230 is manually operable by the driver, for selecting one of a height increasing command, a height decreasing command, and a height-control stopping command. For example, when the height-control stopping command is selected, the current height controlling operation is immediately stopped.

The getting-in-and-out detecting device 244 includes at least one of seat-belt buckle switches 266 each of which detects whether a seat belt is worn; seating sensors 268 each of which detects whether a person is seated on a seat; and the door courtesy lamp switches 242. If at least one of (a) that a detection signal outputted by each of the seat-belt buckle switches 266 does not change, (b) that a detection signal outputted by each of the seating sensors 268 does not change, and (c) that each of the doors 254 is kept closed (i.e., that no doors 254 are opened or closed) is detected, it is possible to judge that no person gets in, or out of, the vehicle.

The informing device 210 informs, when it is judged that there is a possibility that an object may be present, during, or before, a body-height controlling operation, at least one of (a) that a body-height controlling operation is performed (i.e., a body-height controlling operation is started, or a body-height controlling operation is being performed) and (b) that there is a possibility that an object may be present in a direction in which the vehicle's body 8 is moved. The informing device 210 may be one that directs the information toward outside the vehicle and/or inside the vehicle. In addition, the informing device 210 may be one that outputs the information in a visible manner and/or an audible manner. The informing device 210 that directs the information toward outside the vehicle may be an outside lamp 270 (e.g., a fog lamp, a turn signal lamp, a stop lamp, or a head lamp) that is provided on the outer surface of the vehicle's body 8, or a horn 272. The informing device 210 that directs the information toward the driver inside the vehicle may be an inside lamp 274 (e.g., a hazard lamp) that is provided on an instrument panel, or a speaker 276 of an audio device that is provided in the room of the vehicle. The informing device 210 includes at least one of the outside lamp 270, the horn 272, the inside lamp 274, and the speaker 276.

A communication device 280 is connected to the I/O portion 208 of the suspension ECU 200. The communication device 280 includes a signal transmitting and receiving antenna 281, and can communicate with a portable controller 282 worn by the driver who may be present within a predetermined area around the vehicle. The portable controller 282 includes a communication portion 284 including a signal transmitting and receiving antenna; and a processing portion 286 essentially constituted by a computer that stores identification information identifying the controller 282 itself and produces and transmits information to the communication device 280. The portable controller 282 additionally includes a plurality of operable portions each of which is manually operable to transmit, with the identification information, a corresponding one of the height increasing command and the height decreasing command.

The communication device 280 judges, when it receives information, whether the information has been transmitted from the portable controller 282 to the vehicle, based on the identification information contained by the received information. When it is judged that the information has been transmitted from the portable controller 282 to the vehicle, the suspension ECU 200 starts a body-height controlling operation corresponding to the command transmitted from the portable controller 282. However, even if the portable controller 282 may not transmit any height controlling commands, the suspension ECU 200 may start a body-height controlling operation (i.e., a body-height decreasing operation), if it is detected that the portable controller 282 has entered the predetermined area.

A navigation system 290 is also connected to the I/O portion 208. The suspension ECU 200 can detect a current position of the vehicle based on information supplied from the navigation system 290.

Figure 4:
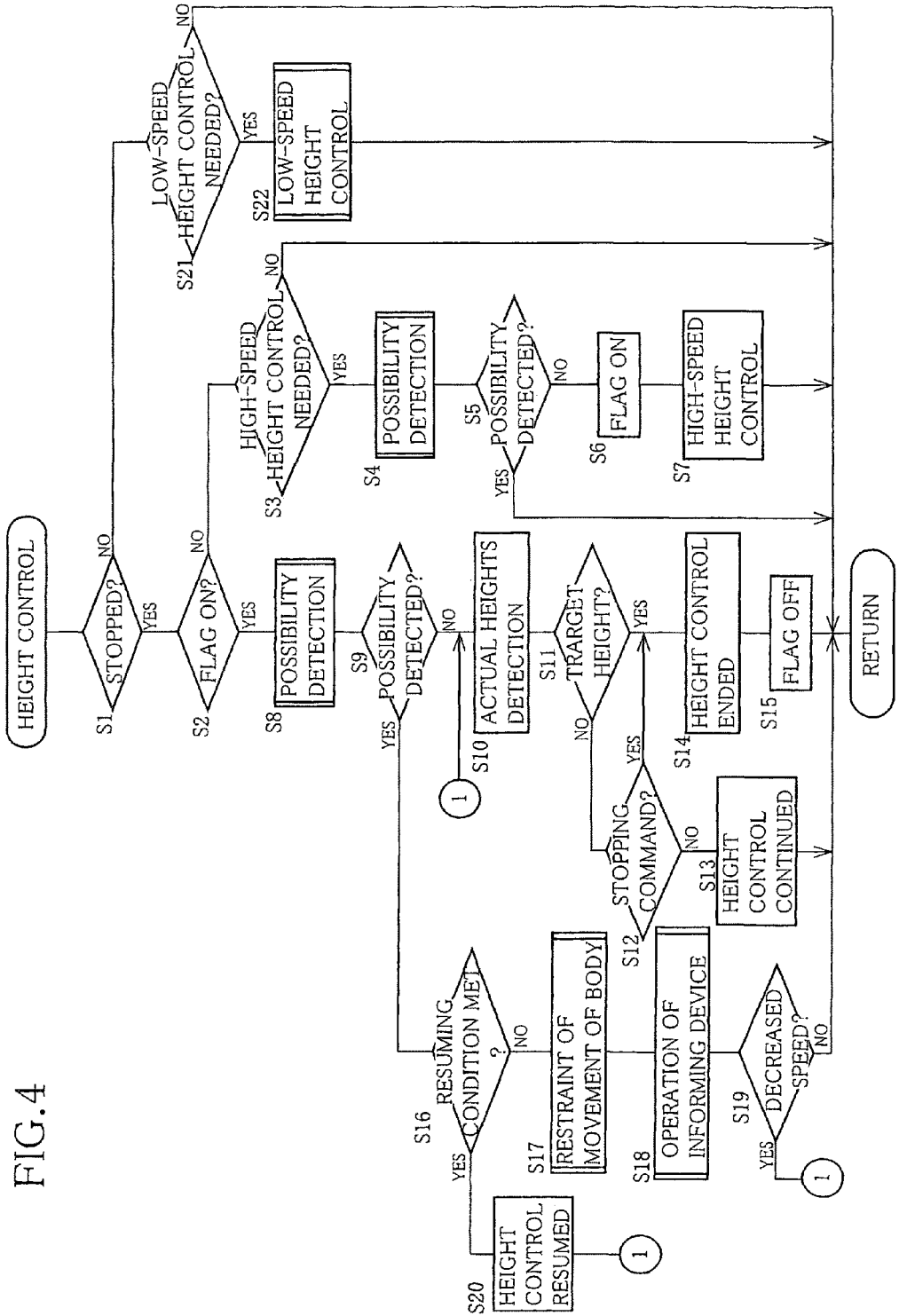
FIG. 4 is a flow chart representing a height controlling program that is stored by a storing portion of the suspension ECU.

The storing portion 206 stores various control programs including a height controlling program represented by a flow chart shown in FIG. 4.

Next, there will be described an operation of the suspension system constructed as described above.

In the center cylinder 52, the control piston 56 receives respective forces corresponding to the respective liquid pressures in the respective liquid chambers 16 of the four suspension cylinders 10 associated with the four wheels 4FL, 4FR, 4RL, 4RR. Each of the four forces is equal to the product of a corresponding one of the four liquid pressures and an area of a surface that receives the corresponding liquid pressure. In a state in which the control piston 56 is kept still, the four forces are balanced with each other.

When the vehicle's body 8 pitches, for example, when a distance between the two front wheel holding devices 6 and the body 8 increases and a distance between the two rear wheel holding devices 6 and the body 8 decreases (e.g., when the vehicle is abruptly accelerated), the respective liquid pressures in the respective liquid chambers 16 of the suspension cylinders 10FL, 10FR associated with the two front wheels 4FL, 4FR decrease, and the respective liquid pressures in the respective liquid chambers 16 of the suspension cylinders 10RL, 10RR associated with the two rear wheels 4RL, 4RR increase. Thus, the respective liquid pressures acting on respective outer pressure-receive surfaces $S_{OL}$, $S_{OR}$ of the two end pistons 58, 59 decrease, and the respective liquid pressures acting on respective inner pressure-receive surfaces $S_{IL}$, $S_{IR}$ of the two end pistons 58, 59 increase. In this case, the four forces acting on the control piston 56 remain balanced with each other, so that the movement of the control piston 56 is restrained. Thus, the four suspension cylinders 10 operate as if they were independent of each other, extremely speaking, as if the center cylinder 52 were not provided, and accordingly the pitching of the vehicle is effectively attenuated.

When the vehicle's body 8 rolls, for example, when a distance between the two left wheel holding devices 6 and the body 8 increases and a distance between the two right wheel holding devices 6 and the body 8 decreases (e.g., when the vehicle turns to the left), the respective liquid pressures in the respective liquid chambers 16 of the suspension cylinders 10FL, 10RL associated with the two left wheels 4FL, 4RL decrease, and the respective liquid pressures in the respective liquid chambers 16 of the suspension cylinders 10FR, 10RR associated with the two rear wheels 4FR, 4RR increase. Thus, the respective liquid pressures acting on the outer and inner pressure-receive surfaces $S_{OL}$, $S_{IL}$ of the end piston 58 decrease, and the respective liquid pressures acting on the outer and inner pressure-receive surfaces $S_{OR}$, $S_{IR}$ of the end piston 59 increase. If the four forces acting on the control piston 56 remain balanced with each other, the four suspension cylinders 10 operate as if they were independent of each other, and accordingly the rolling of the vehicle is effectively attenuated.

When a force is inputted from a road surface to one of the four wheels 4FL, 4FR, 4RL, 4RR, for example, when a force is inputted to the suspension cylinder 10FL corresponding to the front left wheel 4FL in a direction decrease a distance between the wheel 4FL and the body 8 (e.g., when the wheel 4FL rides on a protrusion on the road surface), the respective liquid pressures in the respective liquid chambers 16 of the suspension cylinder 10FL and the suspension cylinder 10RR diagonally opposed to the cylinder 10FL increase, and the respective liquid pressures in the respective liquid chambers 16 of the two other suspension cylinders 10FR, 10RL decrease. Thus, the respective liquid pressures acting on the outer pressure-receive surface $S_{OL}$ of the end piston 58 and the inner pressure-receive surface $S_{IR}$ of the end piston 59 increase, and the respective liquid pressures acting on the inner pressure-receive surface $S_{IL}$ of the end piston 58 and the outer pressure-receive surface $S_{OR}$ of the end piston 59 decrease. Thus, the balancing of the four forces acting on the control piston 56 is broken, and the control piston 56 is moved to the rightward direction in FIG. 1. Consequently the respective volumes of the outer liquid chamber 66 and the inner liquid chamber 65 are increased; and the respective volumes of the outer liquid chamber 67 and the inner liquid chamber 64 are decreased. Thus, the working liquid flows out of the suspension cylinders 10FL, 10RR, and flows into the suspension cylinders 10FR, 10RL. That is, the four suspension cylinders 10FL, 10FR, 10RL, 10RR operate as if the two suspension cylinders 10FL, 10RR communicated with the two suspension cylinders 10FR, 10RL via the center cylinder 52 and the working liquid flowed from the former cylinders 10FL, 10RR to the latter cylinders 10FR, 10RL.

The spring constant of each of the four suspension cylinders 10 can be changed by controlling a corresponding one of the four spring-constant switching valves 28.

When each spring-constant switching valve 28 is in a communication state thereof, the corresponding liquid chamber 16 is communicated with the corresponding two accumulators 24, 26, and accordingly the corresponding suspension cylinder 10 takes a smaller spring constant; and when each spring-constant switching valve 28 is in a shut-off state thereof, the corresponding liquid chamber 16 is communicated with the corresponding high-pressure accumulator 24 only and is shut off from the corresponding low-pressure accumulator 26, and accordingly the corresponding suspension cylinder 10 takes a greater spring constant.

When the suspension cylinder 10 takes the smaller spring constant, the working liquid more easily flows into, and out of, the cylinder 10, so that the cylinder 10 can more effectively damp a high-frequency vibration and thereby improve a riding quality of the vehicle. On the other hand, when the suspension cylinder 10 takes the greater spring constant, the center cylinder 52 can exhibit a higher degree of responsiveness.

Therefore, in the present embodiment, when the vehicle runs on a normal road surface, the suspension cylinders 10 are controlled to take the smaller spring constant; and when the four wheels are needed to grip, with a great force, a road surface, e.g., when the vehicle runs on a bad road surface, the suspension cylinders 10 are controlled to take the greater spring constant.

The damping characteristic of each of the four suspension cylinders 10 is controlled by controlling a corresponding one of the variable restrictors 30.

When the flow area of the individual passage 22 corresponding to each of the four suspension cylinders 10 is decreased by the corresponding variable restrictor 30, the each suspension cylinder 10 becomes "hard" (i.e., the damping force produced by the each suspension cylinder 10 is increased under a condition that a relative movement speed of the corresponding wheel 4 and the body 8 relative to each other in a vertical direction is not changed); and when the flow area of the individual passage 22 is increased by the corresponding variable restrictor 30, the each suspension cylinder 10 becomes "soft" (i.e., the damping force of the each suspension cylinder 10 is decreased). The respective hardness of the four suspension cylinders 10 are controlled according to a current state of a mode selecting switch that is operable by the driver. However, it is possible to control the respective hardness of the four suspension cylinders 10 based on a running condition of the vehicle. In the present embodiment, when the vehicle is turning, or when the vehicle is being braked or driven (i.e., decelerated or accelerated), the four suspension cylinders 10 are controlled to be hard, so that the running stability of the vehicle can be prevented from being lowered.

When each of the four suspension cylinders 10 takes the greater spring constant, the working liquid less easily flows into, and out of, the cylinder 10. In this case, therefore, the changing of the damping characteristic of the each suspension cylinder 10 is less effective. Thus, in the present embodiment, when each of the suspension cylinders 10 takes the smaller spring constant, a corresponding one of the variable restrictors 30 is controlled.

In the present embodiment, the four heights of the vehicle's body 8 relative to the four wheels 4 can be individually controlled by the height controlling device 74.

When the body height corresponding to the front left wheel 4FL is controlled, the corresponding body-height controlling actuator 120FL is controlled. When the body height corresponding to the front left wheel 4FL, i.e., a distance between the front left wheel FL and a portion of the body 8 that corresponds to the wheel 4FL is increased, the pressure storage control valve 90 is opened and the individual control valve 110FL is also opened, so that the working liquid is supplied from the pressure storage accumulator 86 to the suspension cylinder 10FL. If an actual body height becomes equal to a target body height, the individual control valve 110FL is closed. On the other hand, in the case where the pressure storage accumulator 86 does not store a sufficient amount of the working liquid, the pumping device 84 is operated, so that the working liquid outputted by the pump 81 is supplied to the suspension cylinder 10FL.

When the body height corresponding to the front left wheel 4FL is decreased, the individual control valve 110FL is opened and the flow-out control valve 106 is also opened, so that the working liquid flows from the suspension cylinder 10FL to the reservoir 78. If the actual body height becomes equal to the target value, the individual control valve 110FL is closed and the flow-out control valve 106 is also closed.

When the ignition switch 236 is in an ON state thereof, the pumping device 84 is controlled such that the pressure of the working liquid stored by the pressure storage accumulator 86 falls in a predetermined range.

In addition, when the body height corresponding to the front left wheel 4FL is controlled, the corresponding spring-constant switching valve 28FL is closed, so that the working liquid cannot flow between the individual passage 22FL and the low-pressure accumulator 26FL. Thus, the body-height controlling operation can be performed in a shorter time duration as compared with a state in which the spring-constant switching valve 28FL is open.

A body-height controlling operation can be performed at a high speed (i.e., a rate of change of a body height is high; hereinafter, referred to as the high-speed body-height controlling operation) or a low speed (i.e., a rate of change of a body height is low; hereinafter, referred to as the low-speed body-height controlling operation). When the running speed of the vehicle is lower than a reference speed at which the vehicle can be regarded as being stopped, and simultaneously when a predetermined high-speed-control needing condition is met, the high-speed body-height controlling operation is performed. It is judged that the predetermined high-speed-control needing condition has been met, (a) if the communication device 280 has received information from the portable controller 282, (b) if the height-control commanding switch 230 has been operated in the manual mode, or (c) a predetermined condition has been met in the automatic mode.

When the high-speed body-height controlling operation is performed to increase the body heights, the individual control valves 110 are opened (i.e., a duty ratio (=(duty time)/(duty time+off-duty time)) is equal to 1); and when the high-speed body-height controlling operation is performed to decrease the body heights, the individual control valves 110 are opened (i.e., a duty ratio is equal to 1) and the flow-out control valve 106 is also opened (i.e., a duty ratio is equal to 1). When the high-speed body-height controlling operation is performed, the pressure storage control valve 90 is opened and, optionally, the pumping device 84 is operated.

When the low-speed body-height controlling operation is performed, the individual control valves 110 may be subjected to a duty control (i.e., a duty ratio is smaller than 1), or both the individual control valves 110 and the flow-out control valve 106 may be subjected to the duty control.

When the ignition switch 236 is in an OFF state thereof, generally, the body heights are controlled to a standard body height so that the vehicle may have a good appearance. However, since it is more or less difficult for a person to get in the vehicle in the state in which the body heights are kept to the standard height, the body heights are automatically decreased when the communication device 280 receives, from the portable controller 282, the information representing the body-height decreasing command. That is, the body 8 is moved in a direction to approach the wheel holding devices 6. Since the body heights are decreased at the high speed, the body-height controlling (i.e., decreasing) operation can be started when the communication device 280 has surely received the information from the portable controller 282 (i.e., when the driver having the portable controller 282 approaches closer to the vehicle). This body-height control can be called a "welcome" control.

When the height-control commanding switch 230 is operated, in the manual mode, to a position corresponding to the body-height decreasing command, the body heights are decreased. In this case, it is desirable to decrease the body heights as quickly as possible, so that the body heights can approach the target height according to the driver's intension.

If at least one of (a) a predetermined condition that the vehicle is stopped after running and then a parking brake is operated and (b) a predetermined condition that a shift lever has been moved from a driving position to a parking position is met in the automatic mode, the body heights are automatically decreased because it can be judged that there is a possibility that a person may get out of the vehicle. Since the body heights are kept to the standard height when the vehicle is running, the body heights need to be decreased to such a height assuring that a person can easily get out of the vehicle. In this case, too, it is desirable to decrease the body heights as quickly as possible. Even if the above-indicated condition may not be met within a predetermined time duration following stopping of the vehicle after running, the body heights are automatically decreased.

On the other hand, when the communication device 280 receives, from the portable controller 282, the information representing the body-height increasing command, or when the height-control commanding switch 230 is operated, in the manual mode, to a position corresponding to the body-height increasing command, the body heights are increased. That is, the body 8 is moved in a direction away from the wheel holding devices 6. If at least one of (a) a predetermined condition that the ignition switch 236 has been switched from the OFF state to the ON state and (b) a predetermined condition that the shift lever has been moved from the parking position to the driving position is met in the automatic mode, the body heights are automatically increased at the high speed. That is, when a person gets in the vehicle, the body heights are once decreased, but before the vehicle starts running, the body heights are increased to the standard height.

Thus, it is desirable to increase the body heights as quickly as possible. If the switching of the ignition switch 236 and/or the shifting of the shift lever are/is not detected within a predetermined time duration after the body heights are decreased under the above-described welcome control and the opening and closing of the door(s) 254 are detected, then the body heights are automatically increased.

However, if a possibility that an object may be present in a direction of movement of the vehicle's body 8 is detected during a body-height controlling operation, the body-height controlling operation may be stopped from further moving the body 8 in that direction, or may be performed at a decreased speed, or the body 8 may be moved in a direction opposite to that direction. Alternatively, if the above-indicated possibility is detected before a body-height controlling operation is started, the body-height controlling operation may not be started. Thus, the body 8 or the object (e.g., luggage) can be prevented from being damaged.

The manner in which a possibility that an object may be present in a direction of movement of the vehicle's body 8 is detected will be described later. Here, it is noted that a possibility that an object may be present in a direction of movement of the body 8 may be simply referred to as the "possibility of presence of object", in the following description.

The height controlling program, shown in FIG. 4, is implemented at a predetermined periodic cycle.

First, at Step S1, the suspension ECU 200 judges, based on the signal supplied from the running-speed sensor 243, whether the running speed of the vehicle is lower than a reference speed at which the vehicle can be regarded as being stopped. If a positive judgment is made at Step S1, the control of the ECU 200 goes to Step S2 to judge whether a high-speed body-height control flag is set at an ON state thereof. If a negative judgment is made at Step S2, the control of the ECU 200 goes to Step S3 to judge whether there is a need to control the body heights at the high speed, as described above. If a positive judgment is made at Step S3, the control goes to Step S4 to detect a possibility that an object may be present in a direction of movement of the vehicle's body 8. Step S4 is followed by Step S5 to judge whether the possibility has been detected.

If a negative judgment is made at Step S5, the control goes to Step S6 to set the high-speed body-height control flag to its ON state, and then to Step S7 to start a body-height controlling operation at the high speed. Thus, the ECU 200 controls the body-height controlling actuators 120 so that actual body heights approach a target body height. The actual body heights are increased in some cases and are decreased in other cases. On the other hand, if a positive judgment is made at Step S5, that is, if the possibility has been detected, the ECU 200 skips Steps S6 and S7, i.e., does not start a body-height controlling operation.

On the other hand, if a negative judgment is made at Step S3, that is, if there is no need to control the body heights at the high speed, the ECU 200 repeats Steps S1 through S3. Even if a positive judgment may be made at Step S3, the ECU 200 repeats Steps S1 through S5, if a positive judgment is made at Step S5, i.e., if the possibility has been detected. In either case, the ECU 200 does not start a body-height controlling operation.

On the other hand, if a positive judgment is made at Step S2, that is, if the high-speed body-height control flag is set at its ON state, the control goes to Steps S8 and S9 that are identical with Steps S4 and S5, respectively. At Step S8, the ECU 200 detect a possibility that an object may be present in a direction of movement of the vehicle's body 8, and Step S8 is followed by Step S9 to judge whether the possibility has been detected.

If a negative judgment is made at Step S9, the control goes to Step S10 to detect actual body heights, and then to Step S11 to judge whether the actual body heights have reached the target body height. If a negative judgment is made at Step S11, the control goes to Step S12 to judge whether the ECU 200 has received the height-control stopping command. If a negative judgment is made at Step S12, the control goes to Step S13 to continue the current body-height controlling operation.

However, even if a negative judge may be made at Step S9, i.e., there may be no possibility of presence of object, the current body-height controlling operation is stopped if the height-control stopping command is received from the height-control commanding switch 230. That is, if the driver operates the switch 230 in an emergency, the current body-height controlling operation can be immediately stopped.

Meanwhile, if a positive judgment is made at Step S11, the control goes to Step S14 to control the body-height controlling actuator 120 to end the current body-height controlling operation, and then to Step S15 to reset the high-speed body-height control flag to an OFF state thereof.

If a positive judgment is made at Step S9, i.e., if it is judged that there is the possibility of presence of object, the control goes to Step S16 to judge whether an operation resuming condition has been met. The operation resuming condition is met if, in the case where a positive judgment is made at Step S9 because one door 254 is switched from the closed state to the opened state, the door 254 is switched from the opened state to the closed state before a predetermined time duration has elapsed. If an actual time duration in which one door 254 is kept opened is shorter than the predetermined time duration, a degree of possibility that a person may get in, or out of, the vehicle is considerably low. In this case, therefore, it can be judged that no objects are present around the vehicle and accordingly the body-height controlling operation can be started again.

If a negative judgment is made at Step S16, the control goes to Step S17 to restrain the movement of the vehicle's body 8. As will be described later, the ECU 200 controls the body-height controlling actuators 120 to stop the current body-height controlling operation (i.e., stop the movement of the vehicle's body 8), reverse the direction of the current body-height controlling operation (i.e., reverse the direction of movement of the body 8), or lower the speed of the current body-height controlling operation (i.e., lower the speed of movement of the body 8).

For example, when the body heights are decreased at the high speed and, in this case, the direction of movement of the body 8 is reversed, it is preferred that the individual control valves 110 be opened, the pressure storage control valve 90 be opened, and the pumping device 84 be operated such that the pump 81 outputs a maximum amount of the working liquid. Consequently the direction of the current body-height controlling operation can be reversed quickly, and the body heights can be increased quickly.

In addition, when the body heights are decreased at the high speed and, in this case, the current body-height controlling operation (i.e., the movement of the body 8) is stopped, it is preferred that the individual control valves 110 be switched to the closed state. However, if, in a state in which the individual control valves 110 are kept opened, the pumping device 84 is operated, or the pressure storage control valve 90 is switched to the opened state, for a predetermined time duration, the decreasing of the body height can be stopped quickly. In the latter case, after the predetermined time duration has elapsed, the individual control valves 110 are each switched to the closed state.

Decreasing of the speed of the body-height controlling operation can be done by controlling the duty ratio of the individual control valves 110.

Step S17 is followed by Step S18 to operate the informing device 210, and then by Step S19 to judge whether the body-height controlling operation is being performed at a decreased speed. If a positive judgment is made at Step S19, the control goes to Step S10.

Meanwhile, if a positive judgment is made at Step S16, the control goes to Step S20 to resume the body-height controlling operation at the decreased speed. In the present embodiment, the body-height controlling operation is resumed at the same speed as a low speed at which the low-speed body-height controlling operation is performed at Step S22, described later. To this end, the ECU 200 controls the duty ratio of the individual control valves 110. Since Step S20 is carried out in the state in which the high-speed body-height control flag is in the ON state, the body-height controlling operation resumed at the decreased speed at Step S20 can be distinguished from the low-speed body-height controlling operation performed at Step S22 when it is judged, at Step S21, that there is a need to control the body height at the low speed.

However, it is possible to perform the movement restraining control at Step S17 and/or the operation resuming control at Step S20, such that the body-height controlling operation is performed at a decreased speed different from the low speed at which the low-speed body-height controlling operation is performed at Step S22.

Once the high-speed body-height controlling operation is started, Steps S1, S2, and S8 through S15 are carried out if there is no possibility of presence of object, and Steps S1, S2, and S8 through S20 are carried out if there is the possibility of presence of object.

On the other hand, if a positive judgment is made at Step S1, that is, if the running speed of the vehicle is not lower than the reference speed and the vehicle cannot be regarded as being stopped, the control of the ECU 200 goes to Step S21 to judge whether there is a need to control the body heights at the low speed. For example, in the case where the speed at which the vehicle is running on, e.g., an expressway is not lower than the reference speed, a body-height controlling operation is performed to decrease the body heights. This body-height controlling operation is performed at the low speed.

In the present embodiment, a portion of the suspension ECU 200 that stores and carries out Steps S2, S3, S6, S7, S14, and S15 constitutes a high-speed height control portion; and a portion of the suspension ECU 200 that stores and carries out Steps S21 and S22 constitutes a low-speed height control portion.

The height-control commanding switch 230 may be provided on the portable controller 282. In addition, Step S12 may be modified such that the ECU 200 judges whether the ECU 200 (or the voice recognizing device 237) has detected a voice meaning the height-control stopping command. In this modified embodiment, if a positive judgment is made at Step S12, the current body-height controlling operation is ended at Step S14. Moreover, Step S12 may be modified such that the ECU 200 judges whether the vehicle's body 8 has contacted an object. In this modified embodiment, if a positive judgment is made at Step S12, the current body-height controlling operation is ended at Step S14. Furthermore, it is possible to employ, in addition to the height-control commanding switch 230, an exclusive switch that can be used in an emergency to stop the current body-height controlling operation.

The above-described height controlling program may be implemented in any of various manners employed by the following embodiments.

Embodiment 1

In this embodiment, at each of Steps S4 and S8, the near-object detecting device 226 detects an object that may be present in the predetermined areas R0, R1 around the vehicle. Thus, the near-object detecting device 226 can detect the possibility of presence of object, not only before (Step S4), but also after (Step S8), a body-height controlling operation is started. However, in Embodiment 1, Steps S16 and S20 are omitted. That is, the suspension ECU 200 does not detect or judge whether the operation resuming condition has been met.

If, before a body-height controlling operation is started, the near-object detecting device 226 detects an object present in the predetermined areas R0, R1 around the vehicle, the ECU 200 judges that there is a possibility that an object may be present in a direction of movement of the vehicle's body 8. Thus, a positive judgment is made at Step S5, and accordingly Steps S6 and S7 are not carried out, i.e., the body-height controlling operation is not started.

If, after a body-height controlling operation is started, the near-object detecting device 226 detects an object present in the predetermined areas R0, R1 around the vehicle, a positive judgment is made at Step S9, and the control of the ECU 200 goes to Step S17 to immediately stop the current body-height controlling operation. However, if, in the state in which the current body-height controlling operation is stopped, the near-object detecting device 226 has changed not to detect any objects in the areas R0, R1, the positive judgment made at Step S9 changes to a negative judgment and accordingly the control of the ECU 200 goes to Step S10 and the following steps. At Step S13, the current body-height controlling operation is continued and, if the actual body heights reach the target body height, i.e., if a positive judgment is made at Step S11, then the current body-height controlling operation is ended at Step S14.

In Embodiment 1, if, after the current body-height controlling operation is stopped, the near-object detecting device 226 has changed not to detect any objects in the areas R0, R1, then the current body-height controlling operation is continued as it is. However, Embodiment 1 may be modified such that once the current body-height controlling operation is stopped, the operation is not continued any more even if the near-object detecting device 226 may change not to detect any objects in the areas R0, R1.

Alternatively, Embodiment 1 may be modified such that when Step S13 is carried out because, after the current body-height controlling operation is stopped, the near-object detecting device 226 changes not to detect any objects in the areas R0, R1, the current body-height controlling operation is continued at a decreased speed.

Alternatively, Embodiment 1 may be modified such that before a predetermined time duration (i.e., a time limit) has elapsed since a high-speed body-height controlling operation is started at Step S7, the body-height controlling actuators 120 are controlled depending upon whether there is the possibility of presence of object but, if a positive judgment is made at Step S9 after the predetermined time duration has elapsed, the high-speed body-height controlling operation is unconditionally ended at Step S14. In this modified embodiment, the predetermined time duration, i.e., the time limit is employed because it is not desirable to continue the high-speed body-height controlling operation for too long a time duration.

In Embodiment 1, when the near-object detecting device 226 detects an object in the areas R0, R1, the body-height controlling operation is stopped. However, it is possible to detect a relative-positional relationship between an object in the areas R0, R1 and the vehicle's body 8 and controls, based on the detected relationship, the body-height controlling actuators 120.

For example, it is possible to detect a distance between an object and the vehicle's body 8 (e.g., a main portion of each of the clearance sonars 248 or a main portion of the front-object detecting device 249) and controls, based on the detected distance, an appropriate one or ones of the body-height controlling actuators 120. More specifically described, (i) since it can be judged that a probability that an object may be present in a direction of movement of the body 8 is lower when the detected distance is great than when the detected distance is small, Step S17 may be carried out such that a body-height controlling operation is performed at a lower speed when the probability is high than when the probability is low; and (ii) if the detected distance, D, is equal to, or smaller than, a reference distance, Ds (i.e., D≦Ds) and accordingly it can be judged that a probability that an object may be present is high, a direction of a body-height controlling operation may be reversed and, if the detected distance D is greater than the reference distance Ds (i.e., D>Ds) and accordingly it can be judged that the probability is low, a body-height controlling operation may be stopped.

Alternatively, it is possible to detect a direction of change of a distance between an object and the body 8 and controls, based on the detected direction, an appropriate one or ones of the body-height controlling actuators 120. For example, each body-height controlling actuator 120 may be controlled in three different manners corresponding to a first case where the distance between the object and the body 8 decreases (i.e., the object approaches the body 8), a second case where the distance increases (i.e., the object moves away from the body 8), and a third case where the distance does not substantially change.

Figure 5:
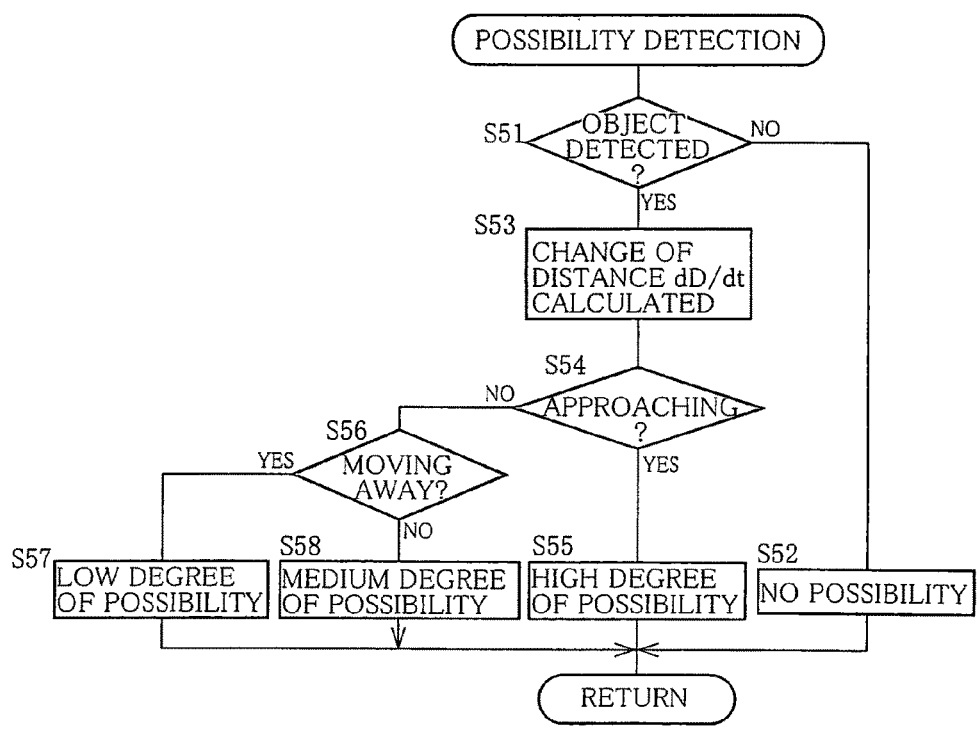
FIG. 5 is a flow chart representing a portion of the height controlling program.

FIG. 5 shows a flow chart representing an object-presence-possibility detecting routine that may be implemented at each of Steps S4 and S8 of FIG. 4. First, at Step S51, the suspension ECU 200 judges whether the near-object detecting device 226 has detected an object present in the predetermined areas R0, R1 around the vehicle. If a negative judgment is made at Step S51, the control of the ECU 200 goes to Step S52 to judge that there is no possibility of presence of object. On the other hand, if a positive judgment is made at Step S51, the control goes to Step S53 to determine a time-wise change, dD/dt, of the distance D between the detected object and the vehicle's body 8. Step S53 is followed by Step S54 to judge whether the detected object is approaching the body 8. If the determined change dD/dt is smaller than zero, i.e., dD/dt<0, i.e., if the distance is decreasing, a positive judgment is made at Step S54 and accordingly the control goes to Step S55 to judge that a degree of possibility, i.e., a probability that an object may be present in a direction of movement of the body 8 is high. On the other hand, if a negative judgment is made at Step S54, the control goes to Step S56 to judge whether the detected object is moving away from the body 8. If the detected change dD/dt is greater than zero, i.e., dD/dt>0, i.e., if the distance is increasing, a positive judgment is made at Step S56 and accordingly the control goes to Step S57 to judge that the probability is low. On the other hand, if a negative judgment is made at Step S56, the control goes to Step S58 to judge that the probability is medium.

Figure 6:
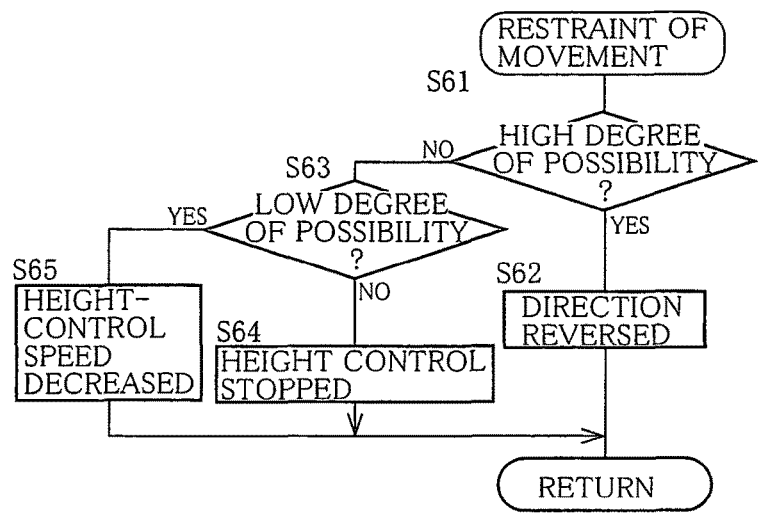
FIG. 6 is a flow chart representing another portion of the height controlling program.

FIG. 6 shows a flow chart representing a body-movement restraining routine that may be implemented at Step S17 of FIG. 4. First, at Step S61, the suspension ECU 200 judges whether the probability that an object may be present in the direction of movement of the body 8 is high. If a positive judgment is made at Step S61, the control goes to Step S62 to control the body-height controlling actuators 120 to reverse a direction of the current body-height controlling operation, so that the body 8 is moved away from the detected object. If a negative judgment is made at Step S61, the control goes to Step S63 to judge whether the probability is low. If a negative judgment is made at Step S63, the control goes to Step S64 to control the body-height controlling actuators 120 to stop the current body-height controlling operation, so that the body 8 is not moved any more. If a positive judgment is made at Step S63, the control goes to Step S65 to control the body-height controlling actuators 120 to perform the current body-height controlling operation at a decreased speed, so that the body 8 is moved at the decreased speed. In the last case, the speed of the current high-speed body-height controlling operation is decreased to the same speed (i.e., a predetermined speed) as the low speed at which the low-speed body-height controlling operation is performed at Step S22.

The informing device 210 may be operated in three different manners corresponding to the three different probabilities, i.e., three different degrees of possibility of presence of object.

Figure 7:
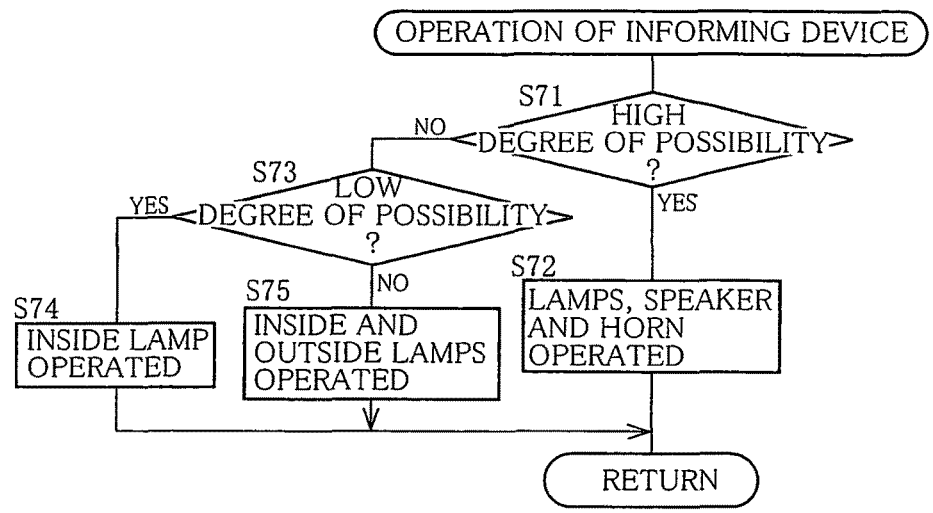
FIG. 7 is a flow chart representing another portion of the height controlling program.

FIG. 7 shows a flow chart representing an informing-device operating routine that may be implemented at Step S18 of FIG. 4. First, at Step S71, the suspension ECU 200 judges whether the probability that an object may be present in the direction of movement of the body 8 is high. If a positive judgment is made at Step S71, the control goes to Step S72 to control the inside and outside lamps 274, 270 to flicker and additionally control the speaker 276 and the horn 272 to generate sounds. That is, the informing device 210 can inform not only one or more persons inside the vehicle but also one or more persons outside the vehicle, of the fact that the probability is high. Thus, the driver can operate the height-control commanding switch 230 so as to stop the body-height controlling operation. If a person is present outside the vehicle, that person can move the object away from the vehicle.

On the other hand, if a negative judgment is made at Step S71, the control goes to Step S73 to judge whether the probability is low. If a positive judgment is made at Step S73, the control goes to Step S74 to control only the inside lamp 274 to flicker and thereby inform the driver of the fact that the probability is low. When the probability is low, it is not so highly needed to inform a person outside the vehicle, of the fact. On the other hand, if a negative judgment is made at Step S73, i.e., if the probability is medium, the control goes to Step S75 to control the lamps 270, 274 to flicker but not to control the speaker 276 or the horn 272. That is, the informing device 210 informs respective persons inside and outside the vehicle, of the fact, in the visible manner only. Since the informing device 210 is operated in the different manners corresponding to the different degrees of possibility of presence of object, the driver inside the vehicle and/or one or more persons outside the vehicle can be informed, as needed, of the possibility of presence of object.

The informing device 210 may be operated when the vehicle has failed. Therefore, when the informing device 210 is operated at Step S18, it is desirable that the device 210 be operated in a different manner than the manner in which the device 210 is operated upon failure of the vehicle.

The manner in which the possibility of presence of object is detected at Step S4 and the manner in which the possibility is detected at Step S8 may differ from each other. For example, at Step S4, whether an object is present in the predetermined areas R0, R1 may be detected and, at Step S8, a degree of possibility of presence of an object may be detected based on a relative-positional relationship between the object and the vehicle's body 8. Alternatively, at Step S4, it may be judged that there is no possibility of presence of an object, if the object is moving away from the body 8. When an object is moving away from the body 8, it can be judged that a body-height controlling operation can be safely started.

Otherwise, the body-height controlling actuators 120 may be controlled based on an amount of change of the distance between the vehicle's body 8 and an object, i.e., a speed of relative movement between the body 8 and the object.

Figure 8:
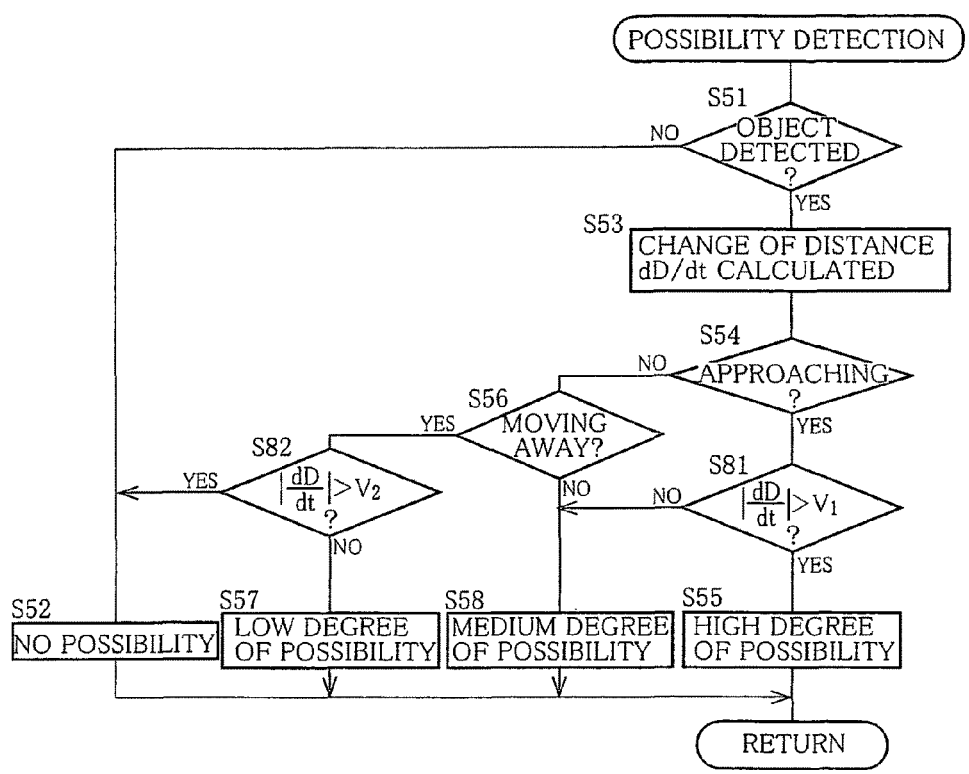
FIG. 8 is a flow chart representing a portion of another height controlling program that may be stored by the storing portion of the suspension ECU.

FIG. 8 shows a flow chart representing another object-presence-possibility detecting routine that may be implemented at each of Steps S4 and S8 of FIG. 4. The flow chart of FIG. 8 includes, in addition to Steps S51 through S58 of FIG. 5, Steps S81 and S82. If a positive judgment is made at Step S54, the control of the suspension ECU 200 goes to Step S81 to judge whether an absolute value of the speed, |dD/dt|, at which the object is approaching the body 8 is higher than a reference speed, $V_1$. If a positive judgment is made at Step S81 (i.e., |dD/dt|>$V_1$), the control goes to Step S55 to judge that a probability that an object may be present is high. On the other hand, if a negative judgment is made at Step S81 (i.e., |dD/dt|≦$V_1$), or if a negative judgment is made at Step S56, i.e., the object is not approaching the body 8 or moving away from the same 8 (i.e., dD/dt≈0), the control goes to Step S55 to judge that the probability is medium. On the other hand, if a positive judgment is made at Step S56, the control goes to Step S82 to judge whether the speed |dD/dt| at which the object is moving away from the body 8 is higher than a reference speed, $V_2$. If a positive judgment is made at Step S82 (i.e., |dD/dt|>$V_2$), the control goes to Step S52 to judge that there is no possibility of presence of object. On the other hand, if a negative judgment is made at Step S82, the control goes to Step S57 to judge that the probability is low.

In this modified embodiment, the probability or degree of possibility of presence of object can be more finely detected.

The reference speeds $V_1$, $V_2$, employed at Steps S81 and S82, may be equal to, or different from, each other.

Otherwise, two or more of the distance between the body 8 and the object, the direction of change of the distance, and the amount of change of the distance may be used in combination so as to detect the possibility of presence of object and control, based on the detected possibility, the body-height controlling actuators 120 and/or the informing device 210. Moreover, the possibility may be detected based on a value obtained by differentiating, n times (n≧1), the amount of change of the distance (i.e., the speed of relative movement between the body 8 and the object).

Otherwise, it is possible to obtain an object-presence-possibility value, X, based on a relative-positional relationship between the vehicle's body 8 and an object present in the predetermined areas R0, R1 and control, based on the obtained possibility value X, the body-height controlling actuators 120. The possibility value X may be defined by the following expression, i.e., mathematical function:

$X = f(L, V, Z, α)$ where L is the distance between the object present in the areas R0, R1 and the body 8; V is a speed of movement of the object; Z is a value indicating whether the object is approaching, or moving away from, the body 8 (e.g., Z=1 indicates that the object is approaching and Z=0 indicates that the object is moving away); and α is one or more other parameters.

A greater possibility value X indicates that a probability that an object may be present in a direction of movement of the body 8 is higher, than a smaller probability value X. The possibility value X is greater when the distance L is small than when the distance L is great, and the possibility value X is greater when the object is approaching than when the object is moving away.

Thus, at each of Steps S4 and S8, the suspension ECU 200 may detect the possibility of presence of object, if the possibility value X is greater than a judging threshold, W, (i.e., X>W), and may judge that there is no possibility of presence of object, if the value X is not greater than the judging threshold W (i.e. X≦W).

Possibility values X may be classified into three or more ranges, so as to evaluate a degree of possibility of presence of object.

For example, at each of Steps S4 and S8, it can be judged that when the possibility value X is greater than a first judging threshold, $W_1$, (i.e., X>$W_1$), a degree of possibility of presence of object is high, that when the possibility value X is not greater than the first judging threshold $W_1$ (i.e., X≦$W_1$) and is greater than a second judging threshold, $W_2$, smaller than the first threshold $W_1$ (i.e., X>$W_2$), the degree of possibility, i.e., probability is medium, and that when the possibility value X is not greater than the second judging threshold $W_2$ (i.e., X≦$W_2$), the probability is low.

At Step S17, the body-height controlling actuators 120 may be operated in different manners corresponding to the different degrees of possibility of presence of object; and at Step S18, the informing device 210 may be operated in different manners corresponding to the different degrees of possibility of presence of object.

Possibility values X may not be used as they are. For example, a degree of necessity to stop a current body-height controlling operation and/or a degree of necessity to change a manner in which a current body-height controlling operation is performed, may be evaluated based on one or more possibility values X.

In Embodiment 1, the near-object detecting device 226 and a portion of the suspension ECU 200 that stores and implements Steps S4 and S8 of the body-height controlling program cooperate with each other to constitute a near-object detecting portion as a possibility detecting device; and a portion of the ECU 200 that stores and implements Step S17 and additionally Step S5 (more specifically described, the manner in which when a positive judgment is made at Step S5, Steps S6 and S7 are not implemented) constitutes a near-object-detection-related actuator control portion as a movement restraining portion.

The near-object detecting portion also functions as an object-in-area detecting portion, a relative-positional-relationship detecting portion, or a possibility-degree detecting portion. A portion of the near-object detecting portion that stores and implements Steps S53 through S58 constitutes the possibility-degree detecting portion. A portion of the near-object-detection-related actuator control portion that stores and implements Step S64 constitutes a height-control stopping portion; a portion of the near-object-detection-related actuator control portion that stores and implements Step S62 constitutes a direction reversing portion; a portion of the near-object-detection-related actuator control portion that stores and implements Step S65 constitutes a height-controlspeed decreasing portion; and a portion of the near-object-detection-related actuator control portion that stores and implements Steps S61 through S65 constitutes a possibility-degree-dependent actuator control portion. The height-control stopping portion also functions as a high-speed-height-control stopping portion.

Embodiment 2

In this embodiment, at each of Steps S4 and S8, the operation detecting device 228 detects the possibility of presence of object. When the operation detecting device 228 detects a pre-selected sort of operation, it can be judged that there is a possibility that an object may be present in a direction of movement of the vehicle's body 8. Therefore, if the operation detecting device 228 detects a pre-selected operation before a body-height controlling operation is started, a positive judgment is made at Step S5 and accordingly the body-height controlling operation is not started. Meanwhile, if the operation detecting device 228 detects a pre-selected operation after a body-height controlling operation is started, a positive judgment is made at Step S9 and accordingly the current body-height controlling operation is stopped. In the latter case, the detected pre-selected operation can be prevented from being adversely influenced by the changing of the body heights. In Embodiment 2, too, Steps S16 and S20 are omitted, i.e., whether the operation resuming condition has been met is not judged by the suspension ECU 200.

For example, when the fuel lid opener motor 256 is operated to open the fuel lid 255, the suspension ECU 200 judges that a preparing operation for a fueling operation is being performed; and if, thereafter, the motor 256 is not operated, the ECU 200 judges that the fueling operation is being performed. Meanwhile, when the motor 256 is operated to close the fuel lid 255, the ECU 200 judges that an ending operation for the fueling operation is being performed.

Regarding a vehicle which does not employ the fuel lid opener motor 256, it is possible to provide the fuel lid 255 with a contact switch, so as to detect whether the fuel lid 255 is open or closed, and thereby detect whether the fueling operation is being performed. Alternatively, it is possible to judge that the fueling operation is being performed, when an amount of the fuel present in a fuel tank is increasing.

When the cap of the oil pan is changed from the closed state to the opened state, the ECU 200 judges that an oil changing operation has been started; when the cap is kept opened, the ECU 200 judges that the oil changing operation is being performed; and when the cap is changed from the opened state to the closed state, the ECU 200 judges that the oil changing operation has been ended.

In a state in which the get-in-and-out detecting device 224 does not detect any persons who get in, or out of, the vehicle and a body-height controlling operation is not performed, the suspension ECU 200 can judge that a roof-carrier loading operation is being performed, if the body-height sensors 220 detect that the body heights have decreased by more than a predetermined amount and/or that the body heights are kept to the decreased height. The roof-carrier loading operation is an operation to load the roof carrier 262 with luggage.

During a body-height controlling operation, the suspension ECU 200 may judge that the roof-carrier loading operation is being performed, if actual body heights significantly differ from a nominal body height corresponding to a specific manner in which the body-height controlling actuators 120 are controlled, or if a mode (e.g., a rate) of change of actual body heights significantly differ from a mode of change of a nominal body height corresponding to a specific manner of controlling of the body-height controlling actuators 120.

However, the roof-carrier loading operation may be detected without using the respective values detected by the body-height sensors 220. For example, it is possible to provide fixing jigs of the roof carrier 262 with contact switches and detect, based on respective changes of respective detection signals produced by the contact switches, whether the roof carrier 262 is loaded with luggage.

When the outside air temperature has changed by more than a usual change amount, or when the temperature changes significantly frequently, the suspension ECU 200 judges that a vehicle washing operation is being performed.

When a pre-selected operation is performed at an exclusive place, the suspension ECU 200 can judge that the pre-selected operation is being performed, based on information supplied from the navigation system 290. For example, when the navigation system 290 detects that the vehicle is now stopped at a gasoline stand, then the ECU 200 can judge that a fueling operation is being performed; when the navigation system 290 detects that the vehicle is stopped at a repair shop or a dealer shop, then the ECU 200 can judge that an oil changing operation is being performed; and when the navigation system 290 detects that the vehicle is stopped at a washing place, then the ECU 200 can judge that a vehicle washing operation is being performed.

In Embodiment 2, the operation detecting device 228 and a portion of the suspension ECU 200 that stores and implements Steps S4 and S8 cooperate with each other to constitute an operation detecting portion.

Embodiment 3

In this embodiment, at each of Steps S4 and S8, the suspension ECU 200 detects whether there is a possibility that an object may be present, based on whether each one of the four doors 254 is opened or closed, i.e., the respective detection signals supplied from the four door courtesy lamp switches 242. When any one of the doors 254 is changed from its closed state to its opened state, or when any door 254 is kept to the opened state, it can be judged that a person may get out of, or in, the vehicle and accordingly an object such as luggage may be present around the vehicle. If the above-indicated possibility is detected before a body-height controlling operation is started, the operation is not started; and if the possibility is detected after the operation is started, the current operation is stopped at Step S17.

Meanwhile, when any door 254 is changed from its opened state to its closed state after the door 254 is kept to the opened state for a time duration shorter than a predetermined time duration, the ECU 200 judges, at Step S16, a positive judgment, i.e., that the operation resuming condition has been met. Since the time duration in which the door 254 is kept to the opened state before it is changed to the closed state is sufficiently short, it can be judged that a probability that a person may get out of the vehicle is considerably low.

If a positive judgment is made at Step S16, the control of the ECU 200 goes to Step S20 to resume the body-height controlling operation, but, at a speed lower than a speed before the resumption, because a possibility that an object may be present in a direction of movement of the body 8 cannot completely be negated.

A predetermined conditions that are employed, at each of Steps S4 and S8, to judge that any door 254 has been changed to its opened state may additionally include a condition that the position of the shift lever, detected by the shift-position detecting device 238, is changed from the driving (D) position to the parking (P) position and/or a condition that the parking brake switch 240 is changed from its OFF state to its ON state. If those conditions are met, a probability that a person may get out of the vehicle after the vehicle is changed from its running state to its parking state is increased. Those conditions may additionally include a condition that the ignition switch 236 is changed from its ON state to its OFF state.

When a negative judgment is made at Step S16, e.g., the time duration in which the door 254 is kept to its opened state is not shorter than the predetermined time duration, it can be judged that a probability that an object may be present is higher than that when the time duration is shorter. That is, when the time duration in which the door 254 is kept to its opened state is sufficiently short, a probability that no person has got in, or out of, the vehicle is high; but when the time duration is long, a probability that a person has got in, or out of, the vehicle is high.

However, Step S20 may be modified such that the body-height controlling operation is resumed at the same speed as that before the resumption.

In Embodiment 3, the door courtesy lamp switches 242 and a portion of the suspension ECU 200 that stores and implements Steps S4 and S8 constitutes a door-state detecting portion; and a portion of the suspension ECU 200 that stores and implements Steps S16 and S20 constitutes an operation resuming portion.

The suspension ECU 200 may detect the possibility of presence of object, based on the respective detection results of two or more of the near-object detecting device 226, the operation detecting device 228, and the door courtesy lamp switches 242. For example, when the near-object detecting device 226 detects that an object is present in the predetermined areas R0, R1 and simultaneously when the operation detecting device 228 detects that a pre-selected operation is being performed and/or when at least one of the door courtesy lamp switches 242 detects that a corresponding one of the doors 254 is in its opened state, the ECU 200 may judge that there is a possibility that an object may be present in a direction of movement of the body 8.

Alternatively, when at least two conditions out of (a) a first condition that the near-object detecting device 226 detects that an object is present in the areas R0, R1, (b) a second condition that the operation detecting device 228 detects that a pre-selected operation is being performed, and (c) a third condition that at least one of the door courtesy lamp switches 242 detects that a corresponding one of the doors 254 is in its opened state are met, the suspension ECU 200 may judge that a probability that an object may be present is high; and when only one of the three conditions (a), (b), (c) is met, the ECU 200 may judge that the probability is low. For example, when the first condition (a) and the second and/or third conditions (b), (c) are met, the ECU 200 may judge that the probability is high; and when only the first condition (a) is met, the ECU 200 may judge that the probability is low.

Otherwise, when at least one of the above-described three conditions (a), (b), (c) is met, the suspension ECU 200 may judge that there is a possibility that an object may be present in a direction of movement of the body 8. In the last case, even if the operation detected by the operation detecting device 228 may have been finished, a positive judgment is made at Step S5 or Step S9 so long as the near-object detecting device 226 detects that an object is present in the areas R0, R1.

In each of Embodiments 1, 2, and 3, the suspension ECU 200 judges, when an object is present near to the vehicle, that there is a possibility that an object may be present in a direction of movement of the body 8, and thereby restrains a body-height controlling operation. However, as will be described below, the ECU 200 may detect, based on respective changes of respective relative-positional relationships between the body 8 and the four wheels 4, i.e., respective changes of the four body heights, whether there is a possibility that an object may be present in a direction of movement of the body 8, and thereby restrains a body-height controlling operation. In each of Embodiments 1, 2, and 3, the ECU 200 detects the possibility of presence of object, both before and after a body-height controlling operation is started. On the other hand, in each of the following embodiments, the ECU 200 cannot detect the possibility before a body-height controlling operation is started. Thus, Steps S4 and S5 are omitted from the flow chart of FIG. 4. In addition, Steps S16 and S20 are omitted since the ECU 200 does not judge that the operation resuming condition has been met.

Embodiment 4

When a body-height controlling operation is performed, basically, the four body-height controlling actuators 120 are controlled to change, at a same speed, the four body heights, respectively. For example, when a high-speed body-height controlling operation is performed, the four body heights are changed at a predetermined high speed, $V_H$. To this end, each of the four individual control valves 110 is kept to its opened state, so that an acceleration of change of a corresponding one of the four body heights may be equal to zero.

Hence, in Embodiment 4, at Step S8, the suspension ECU 200 judges whether a speed, V, of change of at least one of the four body heights corresponding to the four wheels 4 is lower than an abnormality judging threshold value, $V_{th}$. The four body heights are detected by the four body-height sensors 220, respectively.

When the change speed V is smaller than the threshold value $V_{th}$ (i.e., $V < V_{th}$), the ECU 200 makes, at step S9, a positive judgment, i.e., that there is a possibility that an object may be present in a direction of movement of the vehicle's body 8.

When a positive judgment is made at Step S9, the control of the ECU 200 goes to Step S17 to stop the current body-height controlling operation, reverse the direction of the body-height controlling operation, i.e., the direction of movement of the body 8, or decrease the speed of the body-height controlling operation, i.e., the speed of movement of the body 8.

The abnormality judging threshold value $V_{th}$ may be a value smaller than the predetermined high speed $V_H$ by more than a predetermined amount, or a value obtained by multiplying the high speed $V_H$ by a value smaller than 1. A common value as the high speed $V_H$ may be used both in the case where the body heights are increased and in the case where the body heights are decreased, or different values as the high speed $V_H$ may be used in the two cases, respectively.

At Step S8, the suspension ECU 200 may judge whether an acceleration, G, of change of at least one of the four body heights is smaller than a predetermined acceleration value (i.e., whether the change acceleration G has changed from 0 to a value smaller than the predetermined acceleration value).

When the change acceleration G is smaller than an abnormality judging threshold value, $G_{th}$ (i.e., $G < G_{th}$), the ECU 200 makes, at step S9, a positive judgment, i.e., that there is a possibility that an object may be present.

Alternatively, at Step S8, the suspension ECU 200 may judge whether the change speed V is lower than the abnormality judging threshold speed $V_{th}$ and simultaneously judge whether the change acceleration G is smaller than the abnormality judging threshold acceleration $G_{th}$. In this case, if the following conditions: $V < V_{th}$ and $G < G_{th}$ are met, then the ECU 200 makes, at step S9, a positive judgment, i.e., that there is a possibility that an object may be present.

Otherwise, at Step S8, the suspension ECU 200 may judge whether a differentiated value, dG, of the change acceleration G is smaller than an abnormality judging threshold value, $dG_{th}$. In this case, if the following condition: $dG<dG_{th}$ is met, then the ECU 200 makes, at step S9, that there is a possibility that an object may be present.

Based on the differentiated value dG of the change acceleration G, the ECU 200 can detect the possibility of presence of object more quickly than based on the change speed V or the change acceleration G.

In Embodiment 4, the body-height sensors 220 and a portion of the suspension ECU 200 that stores and implements Step S8 constitutes a height-change-dependent possibility detecting portion; and a portion of the suspension ECU 200 that stores and implements Step S17 constitutes a height-change-dependent actuator control portion. The height-change-dependent possibility detecting portion also functions as a change-speed-related-amount-dependent possibility detecting portion.

Embodiment 5

When a body-height controlling operation is performed, all the four individual control valves 110 corresponding to the four wheels 4, respectively, are controlled in a same manner. Therefore, the suspension ECU 200 can detect whether there is a possibility that an object may be present, by comparing respective relative-positional relationships between the body 8 and the four wheels 4, with each other.

In Embodiment 5, at Step S8, the suspension ECU 200 obtains respective differentiated values dG of the respective change accelerations G of the four body heights corresponding to the four wheels 4. The four body heights are detected by the four body-height sensors 220, respectively. The thus obtained four differentiated values dG include the smallest value, $dG_{min}$, the second smallest value, $dG_{midL}$, the second greatest value, $dG_{midH}$, and the greatest value, $dG_{max}$. When an absolute value, $|\Delta dG|$, of a difference, $(dG_{min}-dG_{midL})$, of the smallest value $dG_{min}$ and the second smallest value $dG_{midL}$ is equal to, or greater than, an abnormality judging threshold value, $\Delta dGs$ (i.e., $|\Delta dG| \geq \Delta dGs$), the ECU 200 makes, at step S9, that there is a possibility that an object may be present. The abnormality judging threshold value $\Delta dGs$ may be a default value, or a value determined based on the smallest value $dG_{min}$ (i.e., $\Delta dGs = N \cdot \Delta dGs$; N is a coefficient).

In this case, the ECU 200 can judge, with respect to each one of the four wheels 4, that there is a possibility that an object may be present in a direction of movement of the body 8, or can judge that there is a possibility that an object may be present in a direction of movement of a portion of the body 8 that is opposed to the wheel 4 corresponding to the smallest value $dG_{min}$.

Figure 9A:
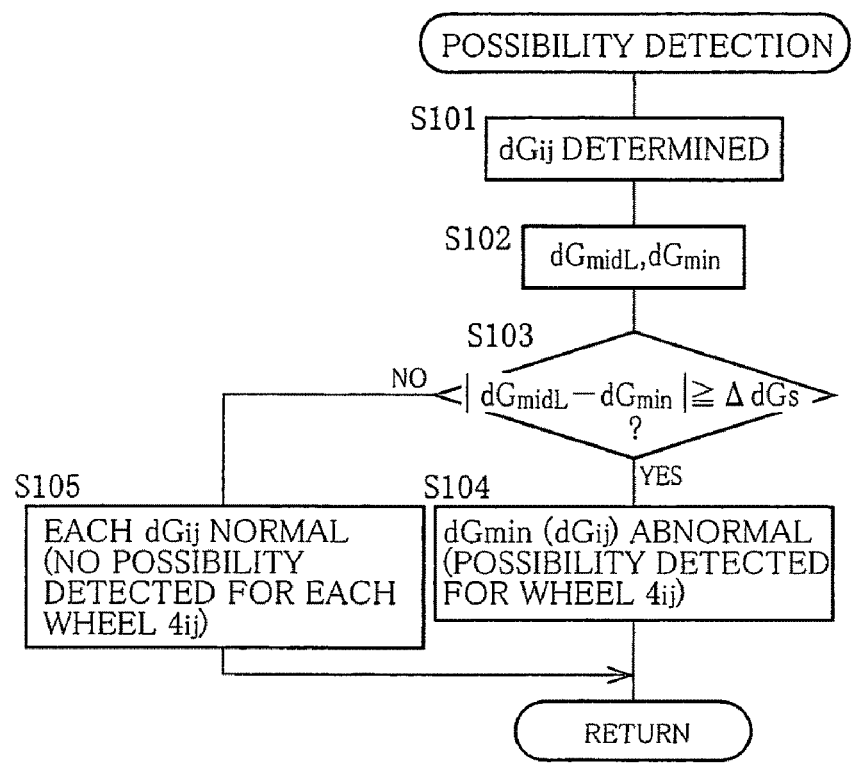
FIG. 9A is a flow chart representing a portion of another height controlling program that may be stored by the storing portion of the suspension ECU.

FIG. 9 shows a flow chart representing an object-presence-possibility detecting routine that is implemented at Step S8.

At Step S101, the suspension ECU 200 obtains, with respect to each of the four wheels 4 (4FL, 4FR, 4RL, 4RR), a differentiated value $dG_{ij}$ (i=F, R, j=L, R) of the change acceleration G of a corresponding one of the four body heights. Then, at Step S102, the ECU 200 selects, from the thus obtained four differentiated values dG, the smallest value $dG_{min}$ and the second smallest value $dG_{midL}$. Subsequently, at Step S103, the ECU 200 judges whether an absolute value $|\Delta dG|$ of a difference $(dG_{min}-dG_{midL})$ of the smallest value $dG_{min}$ and the second smallest value $dG_{midL}$ is equal to, or greater than, an abnormality judging threshold value $\Delta dGs$.

If a positive judgment is made at Step S103 (i.e., $|\Delta dG| \geq \Delta dGs$), the control of the ECU 200 goes to Step S104 to judge that there is a possibility that an object may be present in a direction of movement of a portion of the body 8 that is opposed to the wheel 4 corresponding to the smallest value $dG_{min}$. On the other hand, if a negative judgment is made at Step S103 (i.e., $|\Delta dG| < \Delta dGs$), the control goes to Step S105 to judge that all the four differentiated values dG corresponding to the four wheels 4 are normal, i.e., that there is no possibility that an object may be present. Since the smallest value $dG_{min}$ is normal, it can be judged that all the differentiated values dG are normal.

In a modified form of Embodiment 5, at Step S102, the ECU 200 selects the second smallest value $dG_{midL}$ and the second greatest value $dG_{midH}$ and, at Step S103, the ECU 200 judges whether an absolute value $|\Delta dG|$ of a difference $(dG_{midL}-dG_{midH})$ of the second smallest value $dG_{midL}$ and the second greatest value $dG_{midH}$ is equal to, or greater than, an abnormality judging threshold value $\Delta dGs$.

In this modified form, if a positive judgment is made at Step S103, the control goes to Step S104 to judge that there is a possibility that an object may be present in a direction of movement of each of two portions of the body 8 that are opposed to the two wheels 4 corresponding to the smallest value $dG_{min}$ and the second smallest value $dG_{midL}$. Though the smallest value $dG_{min}$ is not compared with any threshold values, it can be judged that there is a possibility that an object may be present in a direction of movement of a portion of the body 8 that is opposed to the wheel 4 corresponding to the smallest value $dG_{min}$. In this modified form, the abnormality judging threshold value $\Delta dGs$ may be a default value, or a value determined based on the second smallest value $dG_{midL}$ ($\Delta dGs = N \cdot \Delta dGs$; N is a coefficient).

In general, if two or more of the four differentiated values dG are abnormal, it can be speculated that the smallest value $dG_{min}$ and the second smallest value $dG_{midL}$ would be abnormal. In this case, if the smallest value $dG_{min}$ and the second smallest value $dG_{midL}$ are compared with each other, a difference of the two values $dG_{min}$, $dG_{midL}$ would be so small and accordingly each of the two values would be judged as being normal. To avoid this, it is possible to judge whether a difference of two next values of the four differentiated values dG ($dG_{min}$, $dG_{midL}$, $dG_{midH}$, $dG_{max}$) is equal to, or greater than, an abnormality judging threshold value $\Delta dGs$. In this case, if it is judged that the difference is smaller than the threshold value $\Delta dGs$, then it can be judged that the value or all the values dG that is or are not greater than the smaller one of the two next values is or are abnormal.

In Embodiment 5, a portion of the suspension ECU 200 that stores and implements Steps S101 through S105 constitutes a differentiated-acceleration-dependent possibility detecting portion.

Figure 9B:
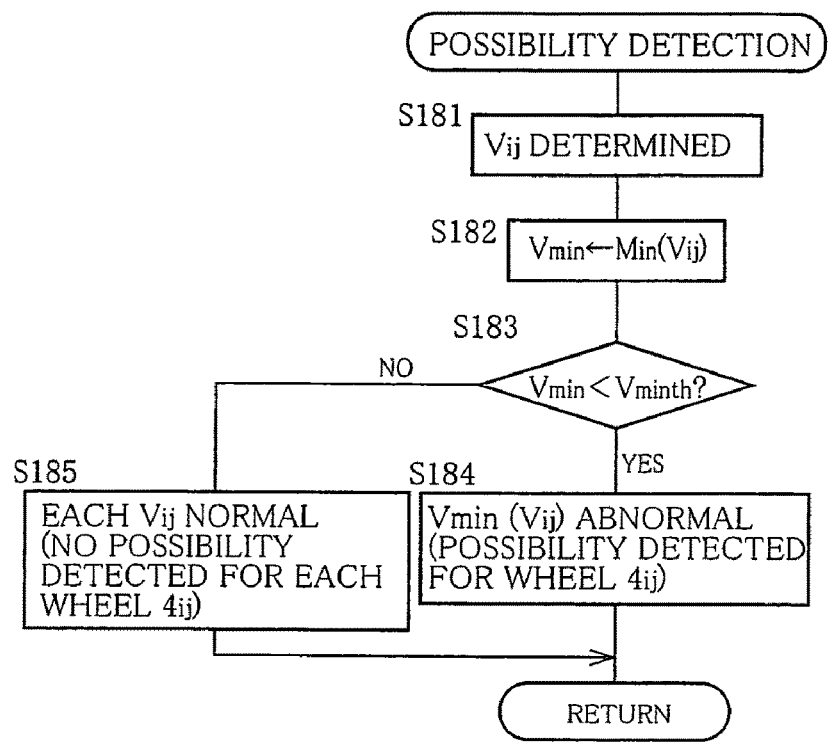
FIG. 9B is a flow chart representing a portion of another height controlling program that may be stored by the storing portion of the suspension ECU.

In another modified form of Embodiment 5, the suspension ECU 200 judges, with respect to each of the four wheels 4 (4FL, 4FR, 4RL, 4RR), the possibility of presence of object, based on a change speed $V_{ij}$ (i=F, R, j=L, R) of a corresponding one of the four body heights, according to a flow chart shown in FIG. 9B. More specifically described, at Step S181, the ECU 200 obtains, with respect to each of the four wheels 4, a change speed $V_{ij}$ of a corresponding one of the four body heights. Then, at Step S182, the ECU 200 selects, from the thus obtained four change speed values V, the smallest value $V_{min}$. Subsequently, at Step S183, the ECU 200 judges whether the smallest value $V_{min}$ is smaller than an abnormality judging threshold value, $V_{minth}$. If a positive judgment is made at Step S183, the control of the ECU 200 goes to Step S184 to judge that there is a possibility that an object may be present in a direction of movement of a portion of the body 8 that is opposed to the wheel 4 corresponding to the smallest value V. On the other hand, if a negative judgment is made at Step S183, the control goes to Step S185 to judge that all the four speed values V corresponding to the four wheels 4 are normal, i.e., that there is no possibility that an object may be present. Since the smallest value $V_{min}$ is normal, it can be judged that all the speed values V are normal.

Figure 9C:
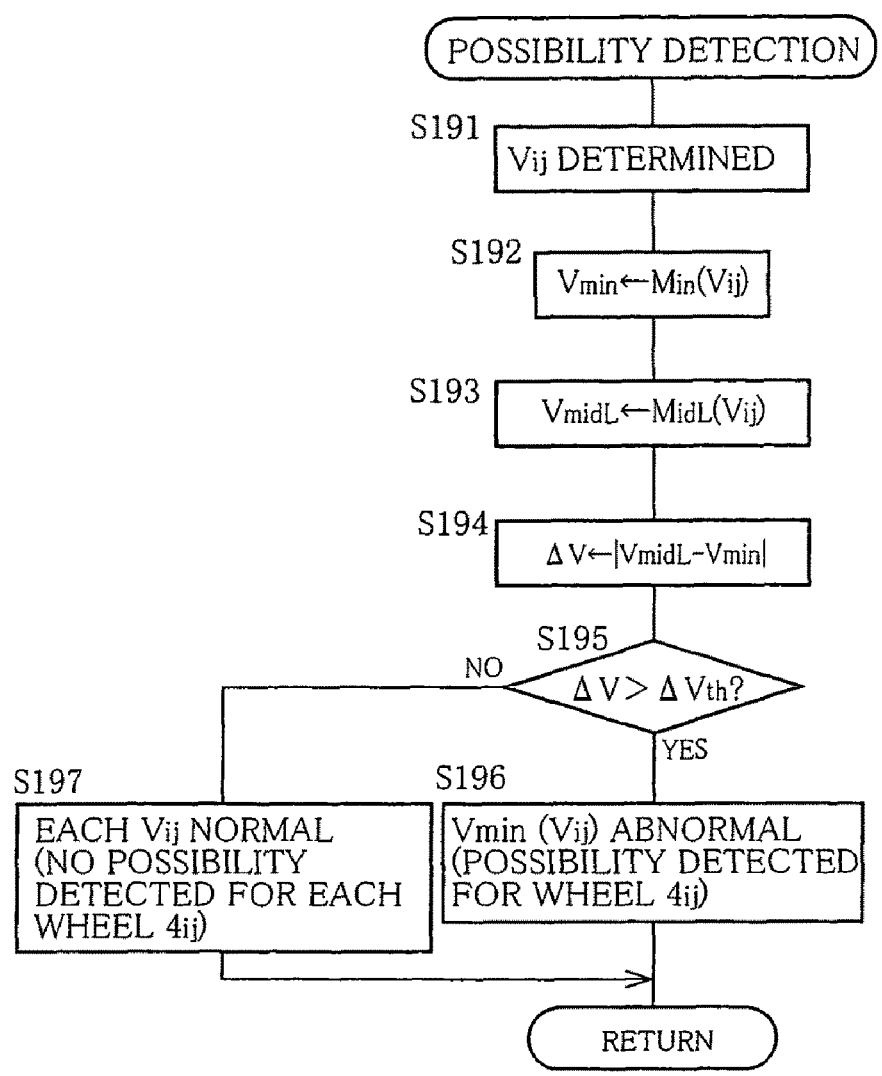
FIG. 9C is a flow chart representing a portion of another height controlling program that may be stored by the storing portion of the suspension ECU.

In another modified form of Embodiment 5, at Step S191 of FIG. 9C, the suspension ECU 200 obtains, with respect to each of the four wheels 4, a change speed $V_{ij}$ of a corresponding one of the four body heights. Then, at Steps S192 and S193, the ECU 200 selects, from the thus obtained four change speed values V, the smallest value $V_{min}$ and the second smallest value $V_{midL}$ and, at Steps S194 and S195, the ECU 200 judges whether an absolute value ΔV of a difference $(V_{min} - V_{midL})$ of the smallest value $V_{min}$ and the second smallest value $V_{midL}$ is greater than an abnormality judging threshold value, $\Delta V_{th}$. If a positive judgment is made at Step S195, the control goes to Step S196 to judge that there is a possibility that an object may be present in a direction of movement of a portion of the body 8 that is opposed to the wheel 4 corresponding to the smallest value $dG_{min}$. On the other hand, if a negative judgment is made at Step S195, the control goes to Step S197 to judge that all the four speed values V corresponding to the four wheels 4 are normal, i.e., that there is no possibility that an object may be present. Since the smallest value $V_{min}$ is normal, it can be judged that all the speed values V are normal.

In another modified form of Embodiment 5, the respective change acceleration values $G_{ij}$ of the four body heights are used by the suspension ECU 200, in place of the respective change speed values $V_{ij}$ of the four body heights, according to the flow chart shown in FIG. 9B.

In yet another modified form of Embodiment 5, the respective change acceleration values $G_{ij}$ of the four body heights are used by the suspension ECU 200, in place of the respective change speed values $V_{ij}$ of the four body heights, according to the flow chart shown in FIG. 9C.

In another modified form of Embodiment 5, at Step S8, the suspension ECU 200 may judge whether the greatest one, $G_{max}$, of the four change accelerations G is equal to, or greater than, a normality judging threshold value, $G_2$, (i.e., $G_{max} \geq G_2$), and whether the change acceleration $G_{ij}$ of each of the four body heights is equal to, or smaller than, an abnormality judging threshold value, $G_1$, (i.e., $G_{ij} \leq G_1$).

When the greatest acceleration $G_{max}$ is not smaller than the normality judging threshold value $G_2$, then it can be judged that the current body-height controlling operation is being normally performed. The normality judging threshold value $G_2$ is a value around 0, and the abnormality acceleration judging threshold value $G_1$ is a value that is smaller than the value $G_2$ and indicates that the body 8 may have been contacted with an object.

Figure 10:
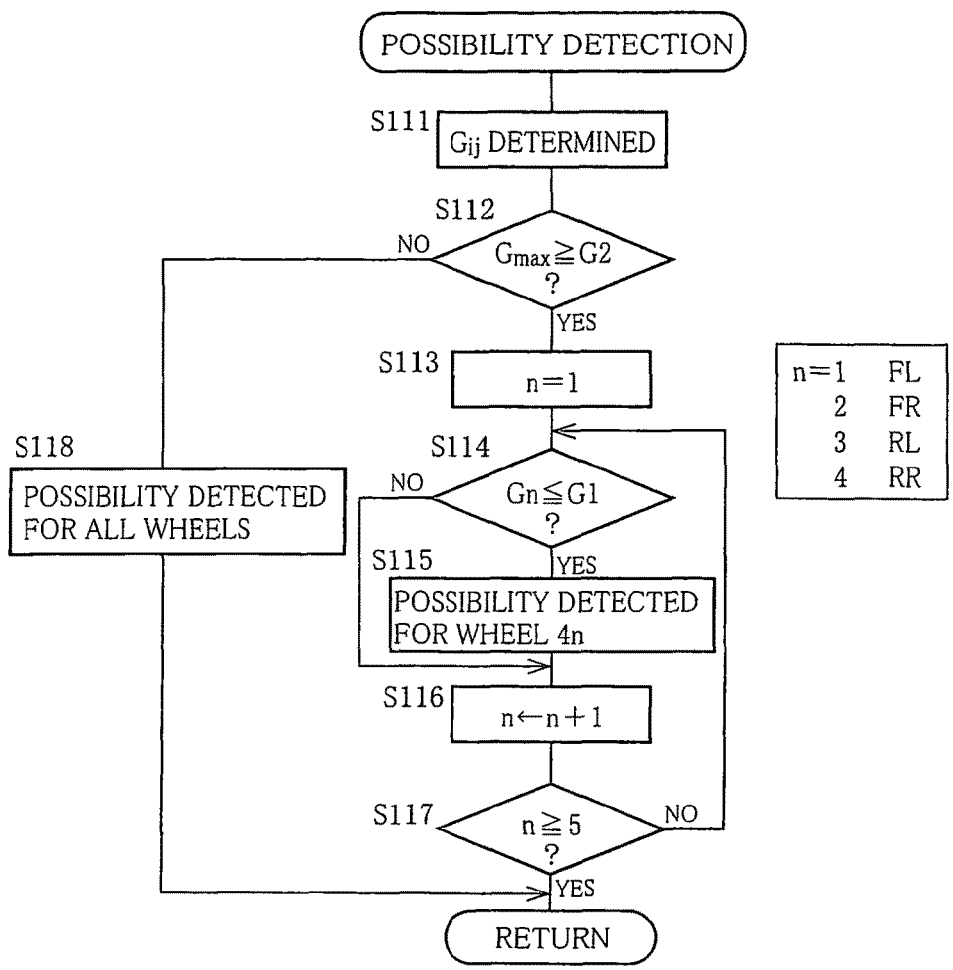
FIG. 10 is a flow chart representing a portion of another height controlling program that may be stored by the storing portion of the suspension ECU.

FIG. 10 shows a flow chart representing an object-presence-possibility detecting routine that is implemented at Step S8 in the above modified form.

At Step S111, the suspension ECU 200 obtains, with respect to each of the four wheels 4 (4FL, 4FR, 4RL, 4RR), a change acceleration $G_{ij}$ (i=F, R, j=L, R) of a corresponding one of the four body heights. Then, at Step S112, the ECU 200 judges whether the greatest one $G_{max}$ of the four change accelerations G is equal to, or greater than the normality judging threshold value $G_2$. If a positive judgment is made at Step S112, the control goes to Step S113 through S117 to judge, with respect to each of the four wheels 4, whether the change acceleration $G_{ij}$ is equal to, or smaller than, the abnormality judging threshold value $G_1$. That is, when it is judged that the greatest change acceleration $G_{max}$ is normal, the ECU 200 judges, with respect to each of the four wheels 4, whether there is a possibility that an object may be present.

More specifically described, at Step S113, a counter, n, counts one, i.e., n=1 (n is 1, 2, 3, or 4: 1 is FL; 2 is FR; 3 is RL; and 4 is RR). Then, at Step S114, the ECU 200 judges whether the change acceleration $G_n$ of the body height corresponding to the wheel n is equal to, or smaller than, the abnormality judging threshold value $G_1$ ($G_n \leq G_1$). If the change acceleration $G_n$ is not greater than the threshold value $G_1$, then it is judged at Step S115 that the change of the body height corresponding to the wheel n is abnormal. Each time a judgment is made at Step S114, the counter n is incremented by one at Step S116. Meanwhile, if the counter n counts 5, a positive judgment is made at Step S117, indicating that all the change accelerations G have been checked.

On the other hand, if it is judged at Step S112 that the greatest change acceleration $G_{max}$ is smaller than the normality judging threshold value $G_2$, the control goes to Step S118 to judge that all the respective changes of the four body heights are abnormal.

In the modified form shown in FIG. 10, the ECU 200 judges, with respect to each of the four wheels 4, whether there is a possibility that an object may be present in a direction of movement of a portion of the body 8 that corresponds to the each wheel 4.

Thus, based on the respective changes of the four body heights, i.e., the respective changes of respective relative-positional relationships between the body 8 and the four wheels 4, the suspension ECU 200 can detect, with respect to each of the four wheels 4, whether there is a possibility that an object may be present in a direction of movement of a portion of the body 8 that corresponds to the each wheel 4. In this case, the ECU 200 may stop the control of only the body height or heights whose change or changes has or have been judged as being abnormal. However, if the control of only a portion of the four body heights, i.e., one, two, or three (but not four) body heights is stopped and the control of the remaining portion of the four body heights is continued, the one, two, or three body heights may be adversely influenced by the control of the remaining portion of the body heights. Hence, in the case where with respect to each of a plurality of wheels 4, it is judged that there is a possibility that an object may be present in a direction of movement of a portion of the body 8 that corresponds to the each wheel 4, the ECU 200 may stop, based on a relative-positional relationship between the plurality of wheels 4, either the control of all the body heights corresponding to the four wheels 4, or the control of only the body heights corresponding to the plurality of wheels 4.

Figure 11:
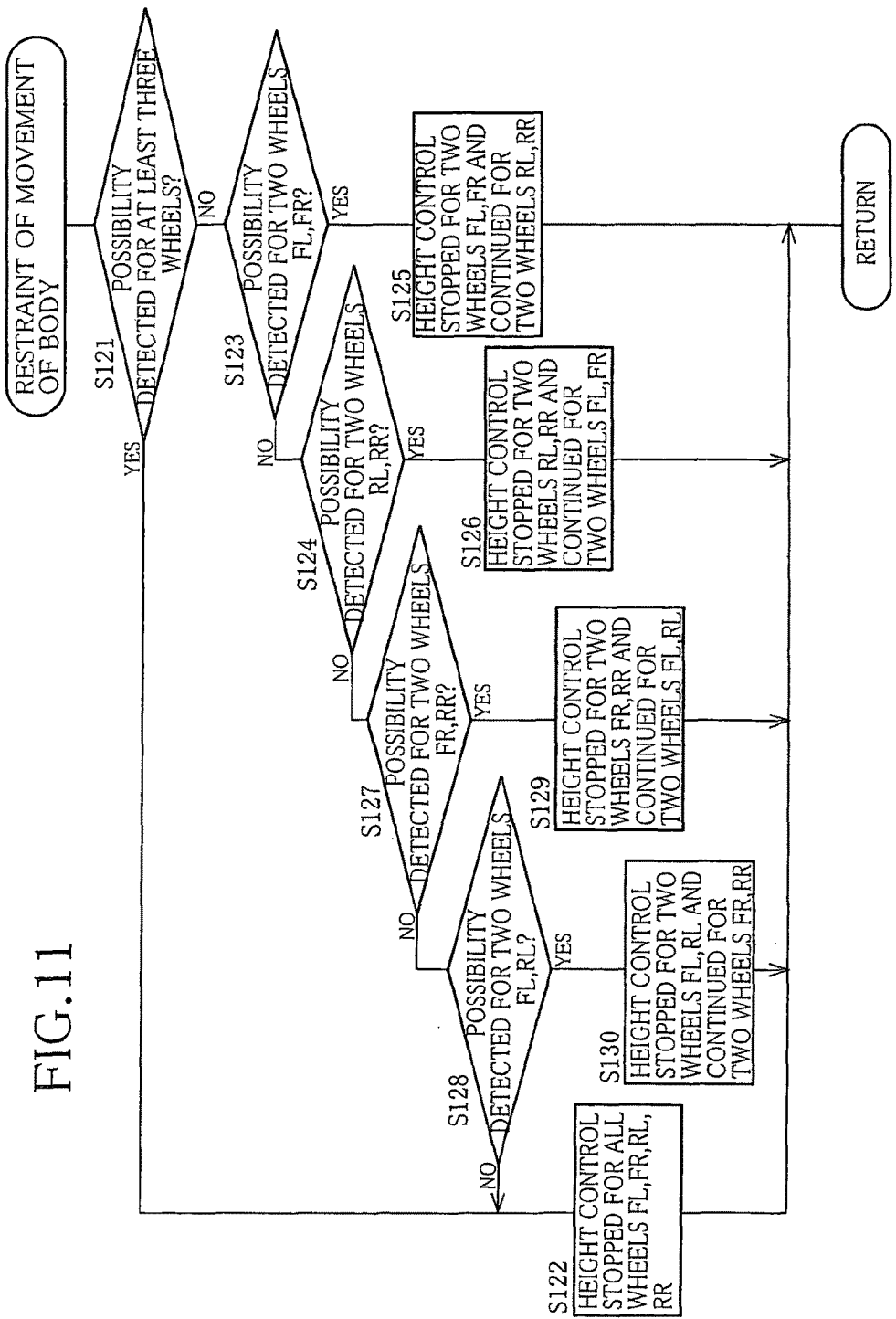
FIG. 11 is a flow chart representing another portion of the height controlling program of FIG. 10.

FIG. 11 shows a flow chart representing a body-movement restraining routine that is implemented at Step S17 in the above modified form. At Step S121, the suspension ECU 200 judges whether the respective changes of at least three body heights out of the four body heights have been judged as being abnormal at, e.g., Step S115 or S118 of FIG. 10. If a positive judgment is made at Step S121, the control goes to Step S122 to stop the control of all the four body heights corresponding to the four wheels 4, respectively.

On the other hand, if a negative judgment is made at Step S121, i.e., if the change or respective changes of one or two body heights has or have been judged as being abnormal at, e.g., Step S15, then the control goes to Step S123 to judge whether the respective changes of the two body heights corresponding to the front left and right wheels 4FL, 4FR have been judged as being abnormal. If a positive judgment is made at Step S123, the control goes to Step S125 to stop the control of the two body heights corresponding to the front left and right wheels 4FL, 4FR, and continues the control of the two body heights corresponding to the rear left and right wheels 4RL, 4RR. Consequently, a front portion of the body 8 that is located in front of the two portions of the body 8 that correspond to the two front wheels 4FL, 4FR is moved in a direction opposite to the direction in which the two portions of the body 8 that correspond to the two rear wheels 4RL, 4RR are moved, that is, the direction with respect which it has been detected that there is a possibility that an object may be present. Thus, the two portions of the body 8 that correspond to the two front wheels 4FL, 4FR can be effectively prevented from butting against the object.

On the other hand, if a negative judgment is made at Step S123, then the control goes to Step S124 to judge whether the respective changes of the two body heights corresponding to the rear left and right wheels 4RL, 4RR have been judged as being abnormal. If a positive judgment is made at Step S124, the control goes to Step S126 to stop the control of the two body heights corresponding to the rear left and right wheels 4RL, 4RR, and continues the control of the two body heights corresponding to the front left and right wheels 4FL, 4FR. Consequently, a rear portion of the body 8 that is located in rear of the two portions of the body 8 that correspond to the two rear wheels 4RL, 4RR is moved in a direction opposite to the direction in which the two portions of the body 8 that correspond to the two front wheels 4FL, 4FR are moved, that is, the direction with respect which it has been detected that there is a possibility that an object may be present. Thus, the two portions of the body 8 that correspond to the two rear wheels 4RL, 4RR can be effectively prevented from bumping against the object.

On the other hand, if a negative judgment is made at Step S124, then the control goes to Step S127 to judge whether the respective changes of the two body heights corresponding to the front and rear right wheels 4FR, 4RR have been judged as being abnormal. If a positive judgment is made at Step S127, the control goes to Step S129 to stop the control of the two body heights corresponding to the front and rear right wheels 4FR, 4RR, and continues the control of the two body heights corresponding to the front and rear left wheels 4FL, 4RL.

On the other hand, if a negative judgment is made at Step S127, then the control goes to Step S128 to judge whether the respective changes of the two body heights corresponding to the front and rear left wheels 4FL, 4RL have been judged as being abnormal. If a positive judgment is made at Step S128, the control goes to Step S130 to stop the control of the two body heights corresponding to the front and rear left wheels 4FL, 4RL, and continues the control of the two body heights corresponding to the front and rear right wheels 4FR, 4RR.

If a negative judgment is made at each of Steps S123, S124, S127, and S128, that is, if the respective changes of the two body heights corresponding to the two wheels 4 that are located on a diagonal line of the body 8 have been judged as being abnormal, or if the change of only one of the four body heights has been judged as being abnormal, then the control goes to Step S122 to stop the control of all the four body heights.

Thus, in the modified form shown in FIG. 11, the suspension ECU 200 stops, when the respective changes of the two body heights have been judged as being abnormal, either the control of all the four heights or the control of only those two body heights. Thus, the ECU 200 can prevent a useless consumption of energy.

However, if the change of only one of the four body heights has been judged as being abnormal, and the one body height corresponds to one of the two front wheels 4FL, 4FR, the ECU 200 may implement Step S125; and if the change of only one of the four body heights has been judged as being abnormal, and the one body height corresponds to one of the two rear wheels 4RL, 4RR, the ECU 200 may implement Step S126.

In Embodiment 5, if each of the above-described predetermined conditions is met once, then the ECU 200 detects that there is a possibility that an object may be present. However, the ECU 200 may be modified such that if each of the above-described predetermined conditions is met a plurality of times, e.g., if the each condition is continuously met for a predetermined time duration, then the ECU 200 detects the possibility of presence of object.

In Embodiment 5, the body-height sensors 220 and a portion of the suspension ECU 200 that stores and implements Step S111 cooperate with each other to constitute a plurality of individual height-change detecting portions; and a portion of the suspension ECU 200 that stores and implements Steps S112 through S118 constitutes a plurality of individual height-change-dependent possibility detecting portions. In addition, a portion of the suspension ECU 200 that stores and implements Steps S125, S126, S129, and S130 constitutes a partly stopping portion; and a portion of the suspension ECU 200 that stores and implements Step S122 constitutes a fully stopping portion.

Embodiment 6

In Embodiment 6, too, a height controlling operation is performed such that all the individual control valves 110 are controlled in a same manner. Therefore, the suspension ECU 200 can detect the possibility of presence of object, based on a change of a posture of the vehicle's body 8. More specifically described, at Step S8, the ECU 200 judges whether a posture of the body 8 after a height controlling operation is started has changed from a posture of the body 8 when the operation is started. If a positive judgment is made at Step S8, the ECU 200 judges, at Step S9, that there is a possibility that an object may be present. For example, in the case where the body 8 takes a substantially horizontal posture ($\theta_0 \approx 0$) immediately before a height controlling operation is started, if the body 8 takes, after the height controlling operation is started, such a tilting posture that an angle, $\theta_1$, of inclination of the posture with respect to a longitudinal or widthwise direction of the body 8 (or the vehicle) is greater than a predetermined angle, $\theta_s$, then the ECU 200 judges that there is a possibility that an object may be present. The inclination angle $\theta_1$ of the posture of the body 8 is determined by the ECU 200 based on the respective body heights detected by the four body-height sensors 220. In the present embodiment, an inclination angle of one of a forward tilting and a rearward tilting is expressed as a positive angle, and an inclination angle of the other tiling is expressed as a negative angle. At Step S9, a positive judgment is made when the following condition is met:

$\theta_0 \approx 0$ and $|\theta_1| \geq \theta_s$

Figure 12:
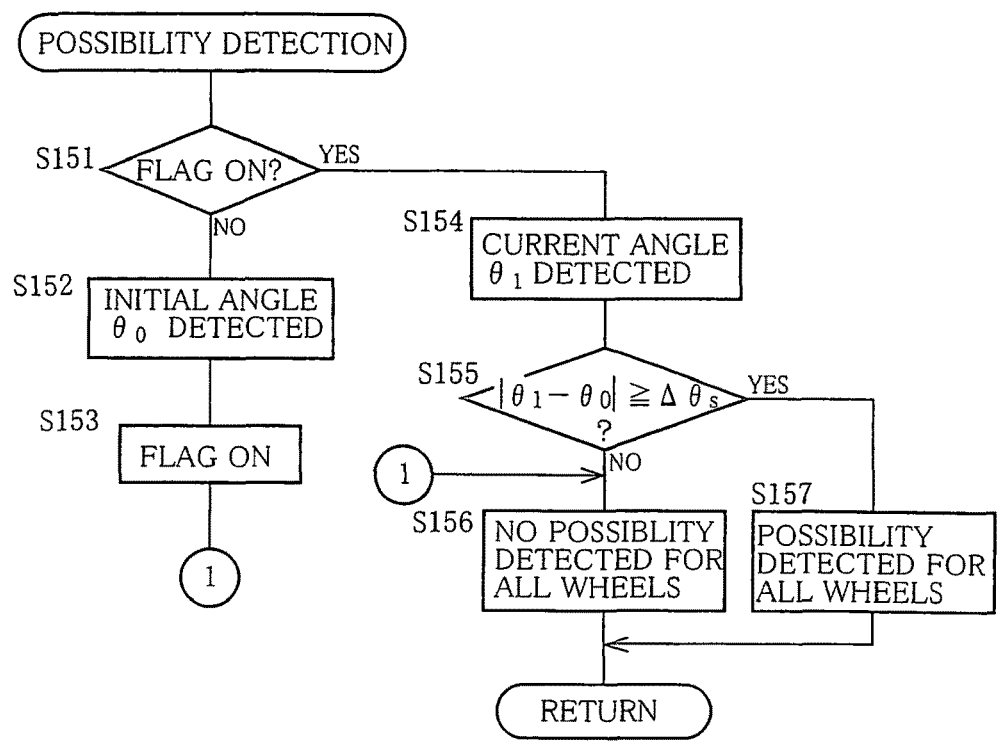
FIG. 12 is a flow chart representing a portion of another height controlling program that may be stored by the storing portion of the suspension ECU.

FIG. 12 shows an object-presence-possibility detecting routine that is implemented at Step S8. First, at Step S151, the suspension ECU 200 judges whether an initial-angle determination flag is set at an ON state thereof. Initially, a negative judgment is made at Step S151, and the control of the ECU 200 goes to Step S152 to determine an initial inclination angle $\theta_0$ of the body 8, and then to Step S153 to set the initial-angle determination flag to the ON state. In many cases, the initial inclination angle $\theta_0$ is substantially zero, i.e., the posture of the body 8 is substantially horizontal.

When Step S151 is implemented again, the initial-angle determination flag has been set at the ON state and accordingly a positive judgment is made at Step S151. Thus, the control goes to Step S154 to determine a current inclination angle $\theta_1$ of the body 8. Step S154 is followed by Step S155 to obtain an absolute value of an amount of change of the current inclination angle $\theta_1$ from the initial inclination angle $\theta_0$ and judge whether the thus obtained absolute value is equal to, or greater than, the predetermined angle $\theta_s$ as a reference value. If a negative judgment is made at Step S155, the control goes to Step S156 to judge that there is no possibility that an object may be present. On the other hand, if a positive judgment is made at Step S155, the control goes to Step S157 to judge that there is a possibility that an object may be present.

In Embodiment 6, a portion of the suspension ECU 200 that stores and implements Steps S151 through S157 constitutes a posture-change-dependent possibility detecting portion.

In place of the above-described change amount of the inclination angle $\theta$, a change acceleration of the angle $\theta$, or a differentiated value of the change acceleration of the angle $\theta$ may be used to detect the possibility of presence of object. In addition, the current inclination angle $\theta_1$ itself may be used to detect the possibility. For example, in the case where it is known, in advance, that a posture of the body 8 when a height controlling operation is started is substantially horizontal, the ECU 200 can judge that there is the possibility, if the current inclination angle $\theta_1$ of the body 8 is greater than a reference angle.

In addition, the inclination angle $\theta$ may be replaced with a difference (i.e., a relative change) of each one of the four body heights from each of the other body heights.

For example, in the case where one of the four body heights significantly largely differs from each of the other body heights, the ECU 200 can judge that there is a possibility that an object may be present in a direction of movement of a portion of the body 8 that corresponds to the wheel corresponding to the each body height.

More specifically described, for example, when a height controlling operation is performed to decrease the four body heights in a same manner, the ECU 200 can judge, at Steps S8 and S9, that there is a possibility that an object may be present, if a value obtained by subtracting, from the greatest value, $H_{max}$, of the four body heights, the second greatest body height, $H_{midH}$, is equal to, or greater than, a predetermined abnormality judging threshold value, $\Delta Hs$ ($H_{max} - H_{midH} \geq \Delta H_s$). The abnormality judging threshold value $\Delta H_s$ may be determined based on the second greatest body height $H_{midH}$ ($\Delta H_s = N \cdot H_{midH}$; N is a coefficient).

Similarly, when a height controlling operation is performed to increase the four body heights in a same manner, the ECU 200 can judge, at Steps S8 and S9, that there is a possibility that an object may be present, if a value obtained by subtracting the smallest value, $H_{min}$, of the four body heights from the second smallest body height, $H_{midL}$, is equal to, or greater than, a predetermined abnormality judging threshold value, $\Delta Hs$ ($H_{midL} - H_{min} \geq \Delta H_s$). The abnormality judging threshold value $\Delta H_s$ may be either a default value or a value determined based on the smallest body height $H_{min}$ ($\Delta H_s = N \cdot H_{min}$; N is a coefficient).

Embodiment 7

A speed of change of each of the four body heights depends on a pressure of the working liquid in the liquid chamber 16 of a corresponding one of the four suspension cylinders 10 and a temperature of the working liquid. In the case where all the four body heights are controlled in a same manner in which, e.g. the four individual control valves 110 are opened by a same degree, the working liquid flows faster when the temperature of the liquid is high than when the temperature of the liquid is low. In addition, when the four body heights are increased, the working liquid flows faster when a difference of the pressure of the working liquid in the liquid chamber 16 of a corresponding one of the four suspension cylinders 10 and the pressure of the liquid in the pressure storage accumulator 86 (or the pumping device 84) is great, than when the pressure difference is small. That is, when the pressure difference is great, a change of the pressure of the working liquid in each suspension cylinder 10 is greater than a change of the pressure of the working liquid outputted from the pumping device 84 or stored by the pressure storage accumulator 86. Thus, it can be speculated that the above-described pressure difference depends on the pressure of the working liquid in each suspension cylinder 10. Similarly, when the four body heights are decreased, the working liquid flows faster when a difference of the pressure of the working liquid in the liquid chamber 16 of a corresponding one of the four suspension cylinders 10 and the pressure of the liquid in the reservoir 78 is great than when the pressure difference is small. In the latter case, since the pressure of the liquid in the reservoir 78 is kept substantially equal to an atmospheric pressure, the above-described pressure difference depends on the pressure of the working liquid in each suspension cylinder 10.

Hence, in the present embodiment, when the four body heights are decreased, the ECU 200 judges, at Step S8, whether a value, (SV-V), obtained by subtracting an actual height-decrease speed, V, from a standard height-decrease speed, SV, estimated based on a pressure of the working liquid in the liquid chamber 16 of a corresponding one of the four suspension cylinders 10 and a temperature of the liquid is greater than an abnormality judging threshold value, $\Delta Vth$. If the following expression, SV>V, is met, then the ECU 200 judges that there is a possibility that an object may be present.

Figure 13:
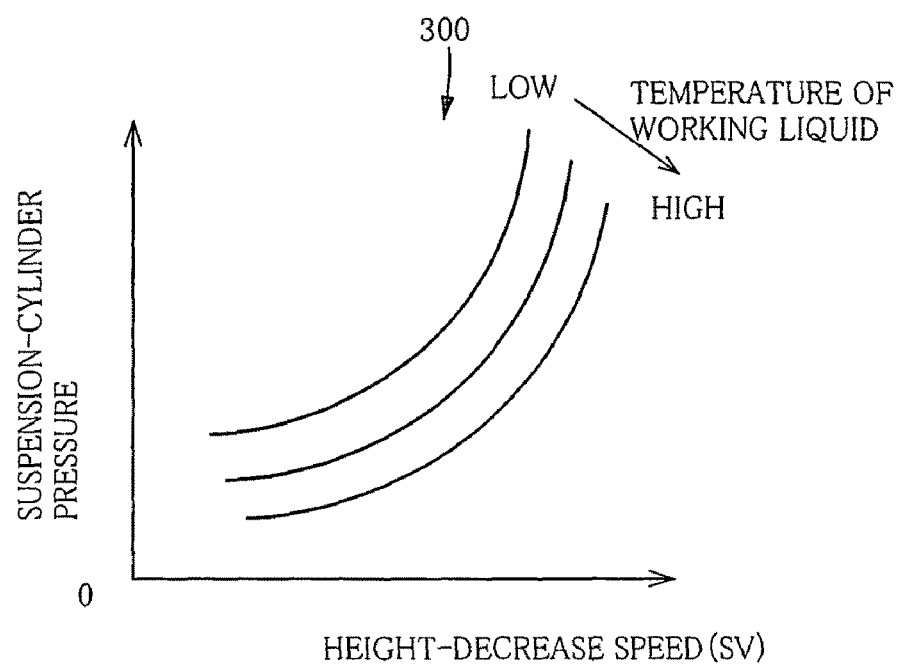
FIG. 13 is a map representing a standard-speed determining table that may be stored by the storing portion of the suspension ECU.

The standard height-decrease speed SV is determined by the ECU 200 according to a table 300 represented by a map shown in FIG. 13. Thus, in the present embodiment, the ECU 200 detects the possibility of presence of object with respect to each of the four body heights, i.e., each of the four wheels 4.

Figure 14:
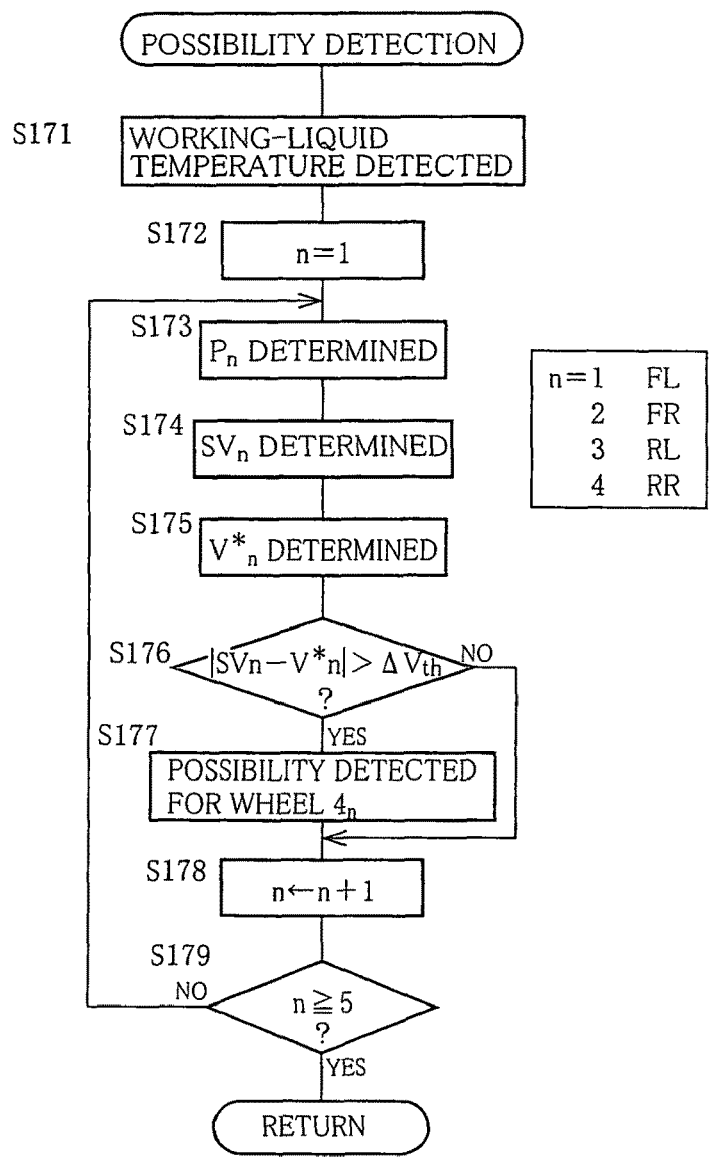
FIG. 14 is a flow chart representing a portion of another height controlling program that may be stored by the storing portion of the suspension ECU.

FIG. 14 shows a flow chart representing an object-presence-possibility detecting routine that is implemented at Step S8 in this embodiment.

First, at Step S171, the ECU 200 obtains a temperature of the working liquid, detected by the working liquid temperature sensor 232. At Step S172, a counter, n, counts one (n=1). Then, at Step S173, the ECU 200 obtains a pressure, $P_n$, of the working liquid in the liquid chamber 16 of each of the four suspension cylinders $10_n$ (n=1, 2, 3, 4; 1=FL, 2=FR, 3=R L, 4=RR), and additionally obtains, at Step S174, a standard change speed $SV_n$ according to the table 300. Subsequently, at Step S175, the ECU 200 obtains an actual change speed, $V^*_n$, from the body height values repetitively detected by a corresponding one of the body-height sensors 220. At Step S176, the ECU 200 judges whether an absolute value of a value, $\Delta V$ (=$SV_n - V^*_n$), obtained by subtracting the actual change speed $V^*_n$ from the standard change speed $SV_n$ is greater than an abnormality judging threshold value $\Delta Vth$. If a positive judgment is made at Step S176, then the control of the ECU 200 goes to Step S177 to make a judgment that the change of the body height corresponding to the suspension cylinder $10_n$ is abnormal. On the other hand, a negative judgment made at Step S176 indicates that the change of the body height is normal. Thus, the control skips Step S177 and directly goes to Step S178 where the number counted by the counter n is incremented by one. When the respective changes of the four body heights have all been checked, a positive judgment is made at Step S179.

In Embodiment 7, a portion of the suspension ECU 200 that stores and implements Steps S171 through S179 constitutes a change-speed-dependent possibility detecting portion.

However, the suspension ECU 200 may determine, with respect to each of the four body heights, a difference of an actual height-decrease speed of the each body height and a standard height-decrease speed determined therefor as described above, and judge whether the body height corresponding to the greatest one, $\Delta V_{max}$, of the thus determined four differences is abnormal by, e.g., comparing the greatest difference with an abnormality judging threshold.

In addition, like in the above-described embodiments, the suspension ECU 200 may judge, if a difference of the greatest difference $\Delta V_{max}$ and the second greatest difference, $\Delta V_{midH}$, of the above-described four differences is greater than an abnormality judging threshold, $\Delta V_{tha}$ (i.e., $\Delta V_{max} - \Delta V_{midH} > \Delta V_{tha}$), that the body height corresponding to the greatest difference $\Delta V_{max}$ is abnormal, or may judge, if a difference of the second greatest difference $\Delta V_{midH}$ and the second smallest difference, $\Delta V_{midL}$, of the four differences is greater than an abnormality judging threshold, $\Delta V_{tha}$ (i.e., $\Delta V_{midH} - \Delta V_{midL} > \Delta V_{tha}$), that the two body heights corresponding to the greatest difference $\Delta V_{max}$ and the second greatest difference $\Delta V_{midH}$ are abnormal.

Figure 15:
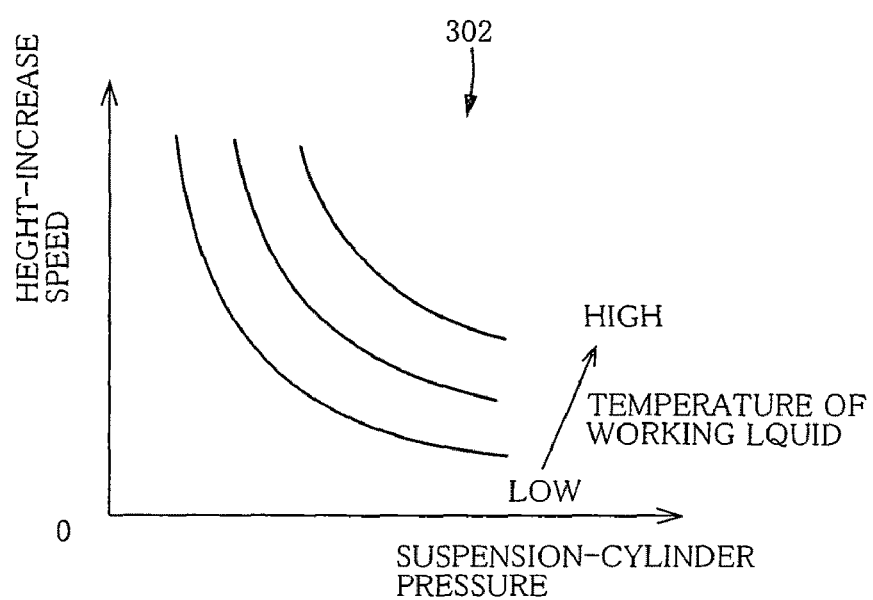
FIG. 15 is a map representing another standard-speed determining table that may be stored by the storing portion of the suspension ECU.

The above description can apply to a case where a height controlling operation is performed to increase the four body heights. In this case, as indicated by a map 302 shown in FIG. 15, the change speed V of each of the body heights is lower when the pressure of the working liquid in a corresponding one of the four suspension cylinders 10 is high than when it is low, because a difference of it and the liquid pressure in the pressure storage accumulator 86 is smaller when it is high than when it is low.

Embodiment 8

In Embodiment 8, the suspension ECU 200 uses a predetermined time duration within which a height controlling operation should be completed if the operation is normally performed, i.e., if no object is present in a direction of movement of the vehicle's body 8, and judges, at Step S8, whether the height controlling operation has been completed within the predetermined time duration, i.e., whether any of the four body heights has not reached a target body height. If a negative judgment is made at Step S8, the ECU 200 makes, at Step S9, that there is a possibility that an object may be present in a direction of movement of a portion of the body 8 that corresponds to the wheel 4 corresponding to that body height. If a height controlling operation is not completed within a predetermined time duration within which the operation should be completed, the ECU 200 can judge that the operation is abnormal.

In each of Embodiments 4 through 8, the suspension ECU 200 detects the possibility of presence of object, by using the time-wise change of each of the four body heights, i.e., one of the change speed of the each body height, the differentiated value of the change acceleration of the each body height, the comparison of the respective time-wise changes of the four body heights, the comparison of the actual change speed of the each body height and the standard change speed determined therefor, and the actual time duration needed to complete the body-height controlling operation. However, the ECU 200 can detect the possibility of presence of object, by using two or more of the above-described physical amounts or comparison results.

Alternatively, the suspension ECU 200 can detect the possibility of presence of object, based on both the judgment made in at least one of Embodiments 1 through 3 and the judgment made in at least one of Embodiments 4 through 8. For example, a) the ECU 200 may judge that there is a possibility that an object may be present in a direction of movement of the body 8, if it is judged that the time-wise change of any of the four body heights is abnormal and that an object is present near to the vehicle; b) Step S4 may be implemented in the manner employed in least one of Embodiments 1 through 3, while Step S8 is implemented in the manner employed in at least one of Embodiments 4 through 8; or c) Step S4 may be implemented in the manner employed in least one of Embodiments 1 through 3, while Step S8 is implemented in two manners, i.e., the manner employed in least one of Embodiments 1 through 3 and the manner employed in at least one of Embodiments 4 through 8.

In each of the above-described embodiments, the suspension ECU 200 controls, when the ignition switch 236 is in its ON state, the pumping device 84 such that the pressure of the working liquid in the pressure storage accumulator 86 falls within a predetermined pressure range. However, the ECU 200 may be modified such that also when the ignition switch 236 is kept in its OFF state, the ECU 200 controls the pumping device 84 so that the liquid pressure in the accumulator 86 falls within a predetermined pressure range.

Alternatively, the ECU 200 may be modified such that after the ignition switch 236 is switched from its ON state to its OFF state, the ECU 200 controls the pumping device 84 so that the liquid pressure in the pressure storage accumulator 86 is increased to a pressure not lower than a predetermined pressure.

For example, when the information transmitted from the portable controller 282 is used in decreasing the body heights, the ignition switch 236 is often in its OFF state. However, as described above, it is not desirable, when the body heights are increased during a high-speed height decreasing operation, i.e., are changed in a reversed direction, that the liquid pressure in the pressure storage accumulator 86 be lower than the predetermined pressure. Hence, in an embodiment shown in FIG. 16, the suspension ECU 200 controls the liquid pressure in the accumulator 86 so as to be not lower than the predetermined pressure, when the ignition switch 236 is switched from its ON state to its OFF state.

Figure 16:
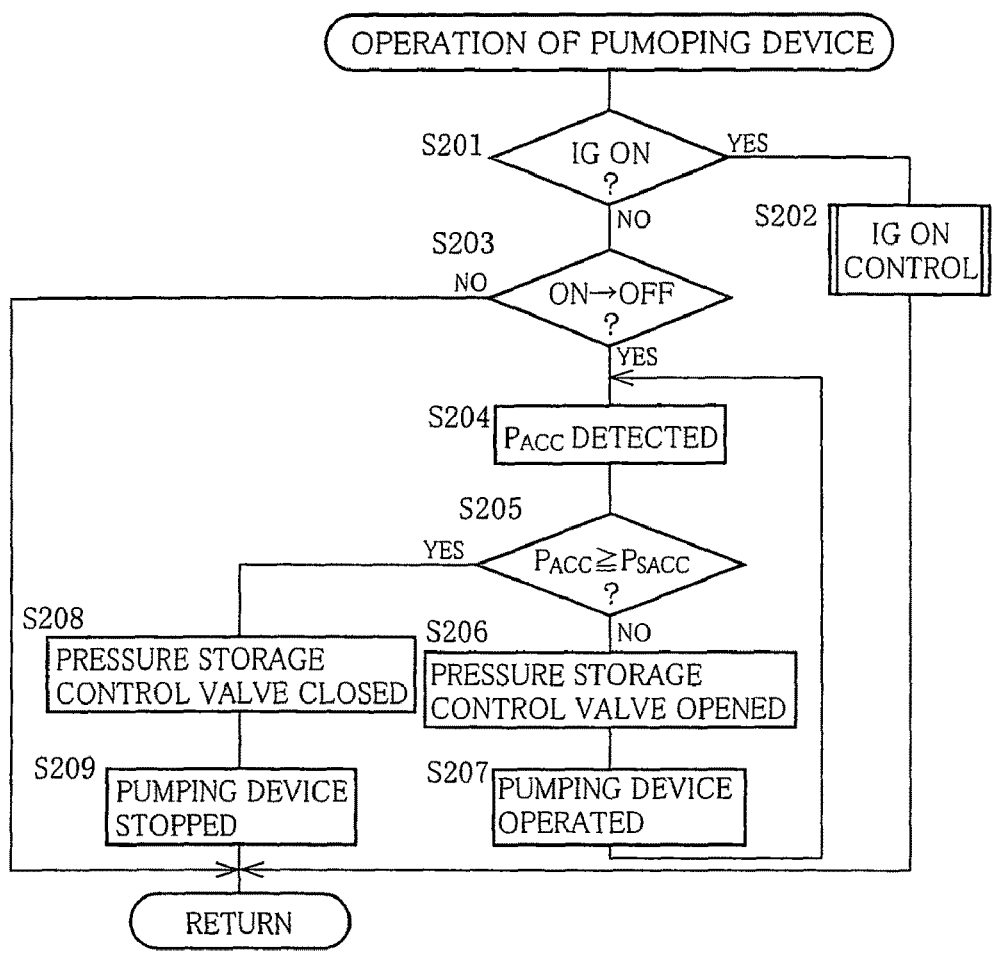
FIG. 16 is a flow chart representing a pumping-device controlling program that may be stored by the storing portion of the suspension ECU.

FIG. 16 shows a pumping-device controlling program. This program is implemented by, e.g., interception, each time a predetermined time elapses.

First, at Step S201, the suspension ECU 200 judges whether the ignition switch (IG) 236 is in its ON state. If a positive judgment is made at Step S201, the control of the ECU 200 goes to Step S202 to operate the pumping device 84 so that the liquid pressure in the pressure storage accumulator 86 is kept to the predetermined pressure range, as described above.

On the other hand, if a negative judgment is made at Step S201, i.e., if the ignition switch 236 is in its OFF state, the control goes to Step S203 to judge whether the ignition switch 236 has been switched from its ON state to the OFF state. If a positive judgment is made at Step S203, the control goes to Step S204 to read a liquid pressure, $P_{ACC}$, in the pressure storage accumulator 86 detected by the accumulator pressure sensor 92, and then goes to Step S205 to judge whether the read liquid pressure $P_{ACC}$ is equal to, or higher than a predetermined pressure, $P_{SACC}$. If a negative judgment is made at Step S205, the control goes to Step S206 to open the pressure storage control valve 90 and then goes to Step S207 to operate the pumping device 84. Meanwhile, if a positive judgment is made at Step S205, the control goes to Step S208 to close the pressure storage control valve 90 and then goes to Step S209 to stop the pumping device 84.

Thus, when the ignition switch 236 is switched from the ON state to the OFF state, the accumulator pressure $P_{ACC}$ is increased to a pressure not lower than the predetermined pressure $P_{SACC}$. Therefore, if it is occasionally needed to increase the body heights when a height controlling operation is performed to decrease the body heights, the body heights can be quickly increased owing the increased accumulator pressure $P_{ACC}$.

In the embodiment shown in FIG. 16, a portion of the suspension ECU 200 that stores and implements Steps S207 and S209 constitutes a pumping-device control portion.

In each of the above-described embodiments, the pump 81 is operated by being exclusively driven by the pump motor 82. However, the pump 81 may be operated by being driven by the engine of the vehicle. In this case, if a negative judgment is made at Step S205, then the suspension ECU 200 does not stop, at Step S207, the engine so as to be able to operate pump 81. Meanwhile, if a positive judgment is made at Step S205, then the ECU 200 stops, at Step S209, the engine.

Figure 17:
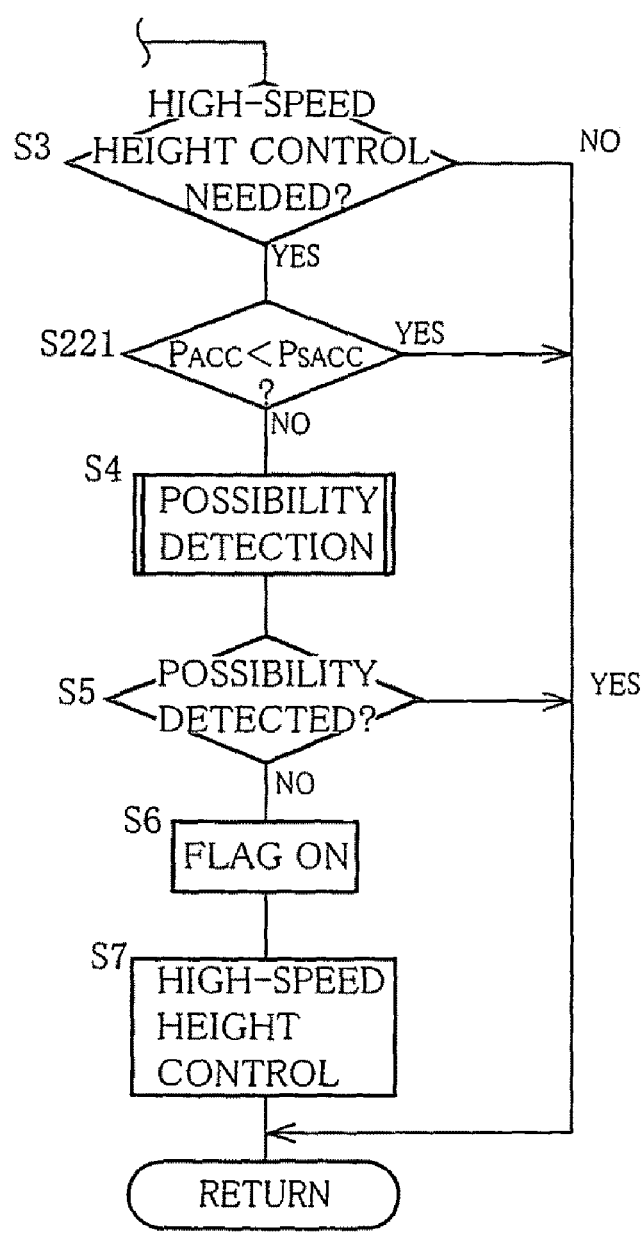
FIG. 17 is a flow chart representing a portion of another height controlling program that may be stored by the storing portion of the suspension ECU.

Otherwise, the suspension ECU 200 may be modified such that when the accumulator pressure $P_{ACC}$ is lower than the predetermined pressure $P_{SACC}$, the ECU 200 stops the current high-speed height controlling operation, according to a height controlling program represented by a flow chart shown in FIG. 17. At Step S3, the ECU 200 judges whether there is a need to perform a high-speed height controlling operation, when the ignition switch 236 is in its OFF state. If a positive judgment is made at Step S3, the control of the ECU 200 goes to Step S221 to judge whether the accumulator pressure $P_{ACC}$ is lower than the predetermined pressure $P_{SACC}$. If a negative judgment is made at Step S221, the control goes to Step S4 and the following steps, as described above, so as to detect whether there is a possibility that an object may be present. If a negative judgment is made at Step S5, the control goes to Step S6 to set the high-speed height-control flag to its ON state, and then goes to Step S7 to start the high-speed height controlling operation.

On the other hand, if a positive judgment is made at Step S221, the suspension ECU 200 quits this routine, i.e., does not implement Step 4 or any following steps. That is, the ECU 200 does not detect whether there is a possibility that an object may be present, or does not perform a height controlling operation. Thus, even if there may be no possibility that an object may be present in a direction of movement of the body 8, the ECU 200 does not start a height controlling operation.

Therefore, the present embodiment is free of the above-indicated problem that if it is occasionally needed to increase the body heights when a high-speed height controlling operation is performed to decrease the body heights, the body heights cannot be quickly increased.

Meanwhile, the suspension ECU 200 may be modified such that at Step S3, the ECU 200 judges whether it has received, from the portable controller 282, the information representing the high-speed height controlling command, since a positive judgment is often made at Step S3 when the ECU 200 (or the communication device 280) receives the information from the portable controller 282.

In each of the above-described embodiments, the suspension ECU 200 performs height controlling operations both for the purpose of increasing the body heights and for the purpose of decreasing the body heights. However, the ECU 200 may be modified to perform height controlling operations not for increasing the body heights but for decreasing the body heights.

The suspension ECU 200 may be one that can operate in the manner described with respect to at least one of Embodiments 1 through 8.

In each of the above-described embodiments, the height controlling apparatus 74 uses the working liquid. However, the height controlling apparatus may be one that uses air as another sort of working fluid. In addition, the height controlling apparatus may be employed by any other sort of suspension system than the above-described suspension system. For example, the suspension system may be one that does not include the center cylinder 52, the low-pressure accumulators 26, or the high-pressure accumulators 24.

In each of the above-described embodiments, the change of each of the four body heights is detected by a corresponding one of the four body-height sensors 220. However, the body-height sensors 220 may be replaced with vertical-direction acceleration sensors that detect, in the vertical direction, respective accelerations of four portions of the vehicle's body 8 that are opposed to the four wheels 4.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. A height controlling apparatus for controlling a plurality of actual heights each of which is defined as a relative position of (a) a corresponding one of a plurality of portions of a body of a vehicle and (b) a corresponding one of a plurality of wheels of the vehicle, the apparatus comprising:

a plurality of height controlling actuators each of which corresponds to at least one of the plurality of wheels and changes at least one of the plurality of actual heights respectively corresponding to the plurality of wheels; and an actuator control device which controls the plurality of height controlling actuators so that the plurality of actual heights respectively approach a plurality of target heights, wherein the actuator control device includes
a same-manner actuator control portion which controls, in a same manner, at least two height controlling actuators of the plurality of height controlling actuators so as to respectively change at least two actual heights of the plurality of actual heights, a possibility detecting device which detects whether there is a possibility that an object may be present in a direction in which at least one of the plurality of portions of the body is moved to change at least one of the plurality of actual heights, wherein the possibility detecting device includes a first relative-change-dependent possibility detecting portion which detects, in a state in which the vehicle is in a stopped state thereof and the same-manner actuator control portion controls, in the same manner, said at least two height controlling actuators so that said at least two actual heights respectively approach at least two target heights of the plurality of target heights, whether there is said possibility, based on a relative change of said at least two actual heights changed by said at least two height controlling actuators, and a movement restraining portion which controls, when the first relative-change-dependent possibility detecting portion detects that there is said possibility, at least one height controlling actuator of said at least two controlling actuators to restrain a movement of said at least one portion of the body in said direction.

2. The height controlling apparatus according to claim 1, wherein the possibility detecting device further includes a near-object detecting portion which detects whether there is the object near to the vehicle, and wherein the movement restraining portion includes a near-object-detection-dependent actuator control portion which controls, when the near-object detecting portion detects that there is the object near to the vehicle, said at least one height controlling actuator to restrain the movement of said at least one portion of the body in said direction.

3. The height controlling apparatus according to claim 2, wherein the near-object detecting portion includes an object-in-area detecting portion which detects whether there is the object in at least one area predetermined with respect to the vehicle.

4. The height controlling apparatus according to claim 3, wherein the object-in-area detecting portion includes a relative-positional-relationship detecting portion which detects a relative-positional relationship between the body and the object present in said at least one area.

5. The height controlling apparatus according to claim 3, wherein the object-in-area detecting portion includes an operation detecting portion which detects whether an operation is being performed by an operator with respect to the vehicle.

6. The height controlling apparatus according to claim 3, wherein the object-in-area detecting portion includes a door-state detecting portion which detects at least one of (a) whether at least one door of the vehicle is opened and (b) whether at least one door of the vehicle is closed.

7. The height controlling apparatus according to claim 1, wherein the possibility detecting device further includes a height-change-dependent possibility detecting portion which detects whether there is said possibility, based on a change of said at least one actual height, and wherein the movement restraining portion includes a height-change-dependent actuator control portion which controls, when the height-change-dependent possibility detecting portion detects that there is said possibility, said at least one height controlling actuator to restrain the movement of said at least one portion of the body in said direction.

8. The height controlling apparatus according to claim 7, wherein the height-change-dependent possibility detecting portion includes a change-speed-related-amount-dependent possibility detecting portion which detects whether there is said possibility, based on a physical amount related to a speed of change of said at least one actual height.

9. The height controlling apparatus according to claim 7, wherein the plurality of height controlling actuators include a plurality of fluid-flow controlling actuators each of which controls a working fluid to flow into, and out of, at least one fluid chamber which is provided between the body and at least one of a plurality of wheel holding devices which respectively hold the plurality of wheels, wherein the actuator control device includes a fluid-flow control portion which controls the plurality of fluid-flow controlling actuators so as to respectively change the plurality of actual heights, and wherein the height-change-dependent possibility detecting portion includes a change-speed-dependent possibility detecting portion which detects that there is said possibility, when a speed of change of said at least one actual height is lower than a reference change speed determined based on at least one of a temperature of the working fluid and a pressure of the working fluid in said at least one fluid chamber.

10. The height controlling apparatus according to claim 1, wherein the possibility detecting device further includes a second relative-change-dependent possibility detecting portion which detects whether there is said possibility, based on a relative change of respective physical amounts related to respective speeds of change of said at least two actual heights changed by said at least two height controlling actuators.

11. The height controlling apparatus according to claim 1, wherein the first relative-change-dependent possibility detecting portion includes a lowest-change-speed-dependent possibility detecting portion which detects whether there is said possibility, based on a lowest change speed of respective change speeds of said at least two actual heights changed by said at least two height controlling actuators.

12. The height controlling apparatus according to claim 10 wherein the second relative-change-dependent possibility detecting portion includes a lowest-change-acceleration-dependent possibility detecting portion which detects whether there is said possibility, based on a lowest change acceleration of respective accelerations of change of said at least two actual heights changed by said at least two height controlling actuators.

13. The height controlling apparatus according to claim 10, wherein the second relative-change-dependent possibility detecting portion includes a smallest-differentiated-value-dependent possibility detecting portion which detects whether there is said possibility, based on a smallest differentiated value of respective differentiated values of respective accelerations of change of said at least two actual heights changed by said at least two height controlling actuators.

14. The height controlling apparatus according to claim 7, wherein the height-change-dependent possibility detecting portion includes a posture-change-dependent possibility detecting portion which detects whether there is said possibility, based on at least one of (a) a change of a posture of the body and (b) a physical amount related to a speed of change of the posture.

15. The height controlling apparatus according to claim 1, wherein the possibility detecting device includes a possibility-degree detecting portion which detects each of a plurality of different degrees of said possibility.

16. The height controlling apparatus according to claim 1, wherein the movement restraining portion includes at least one of (a) a movement-stopping control portion which controls, when the possibility detecting device detects that there is said possibility, said at least one height controlling actuator to stop the movement of the body, and (b) a direction-reversing control portion which reverses, when the possibility detecting device detects that there is said possibility, said direction of the movement of the body so that the body is moved in a reversed direction.

17. The height controlling apparatus according to claim 1, wherein the movement restraining portion includes a speed-decrease control portion which controls, when the possibility detecting device detects that there is said possibility, said at least one height controlling actuator to decrease a speed of the movement of the body in said direction.

18. The height controlling apparatus according to claim 1, wherein the possibility detecting device includes a possibility-degree detecting portion which detects each of a plurality of different degrees of said possibility, and wherein the movement restraining portion includes a possibility-degree-dependent actuator control portion which controls said at least one height controlling actuator in each of a plurality of different manners corresponding to the plurality of different degrees of said possibility, respectively.

19. The height controlling apparatus according to claim 1, wherein the actuator control device includes an operation resuming portion which resumes, when at least one predetermined resuming condition including a condition that the movement of the body in said direction has been stopped by said at least one height controlling actuator under control of the movement restraining portion and at least one door of the vehicle has been changed from an opened state thereof to a closed state thereof, is met, an operation of said at least one height controlling actuator so as to change said at least one actual height.

20. The height controlling apparatus according to claim 1, wherein the actuator control device includes a high-speed actuator control portion which controls said at least one height controlling actuator to change said at least one actual height at a speed higher than a predetermined height-change speed; a low-speed actuator control portion which controls said at least one height controlling actuator to change said at least one actual height at a speed not higher than the predetermined height-change speed; and a high-speed-control-related actuator control portion which controls, when the high-speed actuator control portion controls said at least one height controlling actuator and the possibility detecting device detects that there is said possibility, said at least one height controlling actuator to restrain the movement of the body in said direction and which does not control, when the low-speed actuator control portion controls said at least one height controlling actuator and the possibility detecting device detects that there is said possibility, said at least one height controlling actuator to restrain the movement of the body in said direction.

21. The height controlling apparatus according to claim 1, wherein the possibility detecting device includes a plurality of individual change detecting portions which detect respective changes of the actual heights; and a plurality of individual possibility detecting portions each of which detects, based on the change of a corresponding one of the actual heights that is detected by a corresponding one of the individual change detecting portions, whether there is the possibility that the object may be present in the direction in which a corresponding one of the portions of the body is moved to change said corresponding actual height, and wherein the movement restraining portion includes at least one of (a) a partly stopping portion which does not control, when at least one individual possibility detecting portion as a part of the individual possibility detecting portions detects that there is the possibility that the object may be present in the direction in which a corresponding one of the portions of the body is moved, at least a corresponding one of the height controlling actuators so as not to change a corresponding one of the actual heights, and (b) a fully stopping portion which does not control, when at least one individual possibility detecting portion as a part of the individual possibility detecting portions detects that there is the possibility that the object may be present in the direction in which a corresponding one of the portions of the body is moved, each of the height controlling actuators so as not to change any of the actual heights.

22. The height controlling apparatus according to claim 1, wherein the actuator control device further includes an informing device which informs, when the same-manner actuator control portion controls said at least two height controlling actuators and the first relative-change-dependent possibility detecting portion detects that there is said possibility, at least one of (a) that said at least two actual heights are controlled and (b) that there is said possibility.

23. The height controlling apparatus according to claim 1, wherein the plurality of height controlling actuators include a plurality of fluid-flow controlling actuators each of which controls a working fluid to flow into, and out of, at least one fluid chamber which is provided between the body and at least one of a plurality of wheel holding devices which respectively hold the plurality of wheels, wherein the apparatus further comprises:

an accumulator which stores the working fluid in a pressurized state and can supply the pressurized working fluid to said at least one fluid chamber;

a pumping device which supplies, to the accumulator, the working fluid in the pressurized state; and a pumping-device control portion which controls, after an ignition switch is switched from an ON state thereof to an OFF state thereof, the pumping device so that a pressure of the working fluid stored by the accumulator is kept higher than a predetermined pressure.

* * * * *